United States Patent
Sharma et al.

(10) Patent No.: US 9,465,953 B2
(45) Date of Patent: *Oct. 11, 2016

(54) SECURE VIRTUAL FILE MANAGEMENT SYSTEM

(71) Applicant: MOBILE IRON, INC., Mountain View, CA (US)

(72) Inventors: Rahul Sharma, San Jose, CA (US); Sanjeev Krishnan, Bangalore (IN); Venkata Sastry Akella, San Jose, CA (US); John Drewry, Los Altos, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,364

(22) Filed: Nov. 9, 2015

(65) Prior Publication Data

US 2016/0063272 A1 Mar. 3, 2016

Related U.S. Application Data

(63) Continuation of application No. 14/477,808, filed on Sep. 4, 2014, now Pat. No. 9,213,858, which is a continuation of application No. 13/734,525, filed on Jan. 4, 2013, now Pat. No. 8,863,297, said application No. 14/477,808 is a continuation of application No. 13/734,545, filed on Jan. 4, 2013, now Pat. No. 8,863,298, said application No. 14/477,808 is a continuation of application No. 13/734,689, filed on Jan. 4, 2013, now Pat. No. 8,863,299.

(60) Provisional application No. 61/584,112, filed on Jan. 6, 2012, provisional application No. 61/724,966, filed on Nov. 10, 2012, provisional application No. 61/725,004, filed on Nov. 11, 2012, provisional application No. 61/725,007, filed on Nov. 11, 2012.

(51) Int. Cl.
*G06F 21/00* (2013.01)
*G06F 21/62* (2013.01)
(Continued)

(52) U.S. Cl.
CPC ..... *G06F 21/6218* (2013.01); *G06F 17/30221* (2013.01); *G06F 17/30233* (2013.01);
(Continued)

(58) Field of Classification Search
CPC ...... G06F 21/60; G06F 21/604; G06F 21/62; G06F 21/6218
See application file for complete search history.

(56) References Cited

U.S. PATENT DOCUMENTS

2011/0252071 A1* 10/2011 Cidon ............... G06F 17/30174
707/802

*Primary Examiner* — Edward Zee
(74) *Attorney, Agent, or Firm* — Van Pelt, Yi & James LLP

(57) ABSTRACT

Virtual file management is disclosed. Managed content from multiple separate storage domains is organized into a virtual file system that maintains with respect to each of at least a subset of said separate storage domains information of storage domain specific file system primitives to perform primitive operations with respect to content stored in that storage domain. Policies are determined that apply to the managed content. Each policy indicates primitive operations permitted to be performed with respect to the managed content. Information comprising the virtual file system and the policies is provided to a client application on a mobile device. The client application is configured to provide access to the managed content in the virtual file system in a manner at least in part indicated in the policies, including by allowing the permitted primitive operations to be performed using said storage domain specific file system primitives.

21 Claims, 36 Drawing Sheets

(51) Int. Cl.
*H04L 29/06* (2006.01)
*G06F 21/60* (2013.01)
*G06F 17/30* (2006.01)
*G06Q 10/10* (2012.01)
*H04W 12/02* (2009.01)
*H04W 12/08* (2009.01)
*H04L 9/08* (2006.01)

(52) U.S. Cl.
CPC ............... *G06F 21/60* (2013.01); *G06Q 10/10* (2013.01); *H04L 9/0822* (2013.01); *H04L 9/0825* (2013.01); *H04L 9/0894* (2013.01); *H04L 63/0435* (2013.01); *H04L 63/0815* (2013.01); *H04L 63/107* (2013.01); *H04W 12/02* (2013.01); *H04W 12/08* (2013.01); *G06F 2221/2111* (2013.01); *H04L 2209/76* (2013.01)

AVERAIL

Admin Portal and User Web UX

AVERAIL access.  Account Owner  averail

- Home
  - Documents (2)
  - Devices
- ☆ Favorites
- ⏱ Recent Files
- ▢ Notifications
- ⋀ Activities ADMIN
- Group Sites (1)
- Users & Groups (1)
- Policies (1)
- Account Settings ⚙ Settings

Trusted Content Mobility
Enterprise-class protection for business documents on mobile devices.

Welcome to Averail Access! Need help getting started?

Group Sites | Users & Groups | Policies | Manage Account

Terms of Service  Privacy Policy  About  Help  Support

FIG. 10

1. Account Owner Defines Group Sites

SECURE VIRTUAL FILE MANAGEMENT SYSTEM

CROSS REFERENCE TO OTHER APPLICATIONS

This application is a continuation of co-pending U.S. patent application Ser. No. 14/477,808, entitled SECURE VIRTUAL FILE MANAGEMENT SYSTEM filed Sep. 4, 2014, which is a continuation U.S. patent application Ser. No. 13/734,525, now U.S. Pat. No. 8,863,297, entitled SECURE VIRTUAL FILE MANAGEMENT SYSTEM filed Jan. 4, 2013, which claims priority to U.S. Provisional Application No. 61/584,112, entitled CLOUD CONTENT EXCHANGE SERVICE filed Jan. 6, 2012; U.S. Provisional Application No. 61/724,966, entitled SECURE VIRTUAL DOCUMENT MANAGEMENT SYSTEM filed Nov. 10, 2012; U.S. Provisional Application No. 61/725,004, entitled USER INTERFACE FOR SECURE VIRTUAL DOCUMENT MANAGEMENT SYSTEM filed Nov. 11, 2012; and U.S. Provisional Application No. 61/725,007, entitled SECURE VIRTUAL DOCUMENT MANAGEMENT SYSTEM filed Nov. 11, 2012, all of which are incorporated herein by reference for all purposes.

U.S. patent application Ser. No. 14/477,808, is also a continuation of U.S. patent application Ser. No. 13/734,545, now U.S. Pat. No. 8,863,298, entitled SECURE VIRTUAL FILE MANAGEMENT SYSTEM filed on Jan. 4, 2013, which claims priority to U.S. Provisional Application No. 61/584,112, entitled CLOUD CONTENT EXCHANGE SERVICE filed Jan. 6, 2012; U.S. Provisional Application No. 61/724,966, entitled SECURE VIRTUAL DOCUMENT MANAGEMENT SYSTEM filed Nov. 10, 2012; U.S. Provisional Application No. 61/725,004, entitled USER INTERFACE FOR SECURE VIRTUAL DOCUMENT MANAGEMENT SYSTEM filed Nov. 11, 2012; and U.S. Provisional Application No. 61/725,007, entitled SECURE VIRTUAL DOCUMENT MANAGEMENT SYSTEM filed Nov. 11, 2012, all of which are incorporated herein by reference for all purposes.

U.S. patent application Ser. No. 14/477,808, is also a continuation of U.S. patent application Ser. No. 13/734,689, now U.S. Pat. No. 8,863,299, SECURE VIRTUAL FILE MANAGEMENT SYSTEM filed on Jan. 4, 2013, which claims priority to U.S. Provisional Application No. 61/584,112, entitled CLOUD CONTENT EXCHANGE SERVICE filed Jan. 6, 2012; U.S. Provisional Application No. 61/724,966, entitled SECURE VIRTUAL DOCUMENT MANAGEMENT SYSTEM filed Nov. 10, 2012; U.S. Provisional Application No. 61/725,004, entitled USER INTERFACE FOR SECURE VIRTUAL DOCUMENT MANAGEMENT SYSTEM filed Nov. 11, 2012; and U.S. Provisional Application No. 61/725,007, entitled SECURE VIRTUAL DOCUMENT MANAGEMENT SYSTEM filed Nov. 11, 2012, all of which are incorporated herein by reference for all purposes.

TECHNICAL FIELD

The embodiments described herein relate generally to the control of enterprise content across and among a plurality of communication storage locations including on-premise content management systems, cloud based enterprise content management systems, and cloud based storage services. The embodiments described herein provide secure access from mobile devices to content across these endpoints while enforcing policies and monitoring/tracking/controlling mobile device use of managed content.

BACKGROUND OF THE INVENTION

Users and organizations are increasingly adopting a bring-your-own-device plan in the enterprise environment (BYOD). A BYOD plan comprises enterprise accommodation of personal mobile device operation (including smart phones and tablets) within the enterprise. These devices are either managed by company Information Technology (IT) personnel using Mobile Device Management (MDM) solutions or remain unmanaged. In the IT managed scenario, managed devices a) are securely provisioned in the enterprise environment, b) receive IT-approved configurations for enterprise Wi-Fi including authentication, access, password protections and other enterprise configuration settings, c) are subject to monitoring for compliance with IT policies, and d) may be remotely wiped and locked. When mobile devices are unmanaged, the onus falls on the user to configure settings on the device and support it.

In either the managed or unmanaged scenario, mobile devices are typically deemed "second class" and/or unsecure devices and are not granted similar permissions to other computing endpoints within an organization. Mobile device users may receive access to email, contacts and calendar through Microsoft Exchange and Active Sync, but that's it. Obviously, as the number of newer, full featured mobile devices continues to grow inside organizations, there will be increasing pressure from employees to access more content and more services within the enterprise. The Averail system described herein focuses specifically on delivering a key building block to empower mobile device users with access to enterprise content while maintaining necessary security and control for organizations.

In a typical enterprise environment users, both managed and unmanaged mobile devices enjoy less access to enterprise content (e.g. files, documents) contained in on-premise ECM systems than IT approved desktop/laptops. The limitations become more obvious as users bring in iOS and Android devices to Windows-dominant IT environments using SharePoint and Active Directory. In some cases, users are explicitly blocked from accessing enterprise content. For example, IT may block mobile devices from access to enterprise content rather than granting selective access under right policies and permissions. System configurations and device or server-specific issues may further limit accessibility, hamper ease of use or reduce functionality. For example, users without single sign-on capabilities have to repeatedly enter different credentials to access separate systems (if they can even get to them). Technologies like ActiveX controls that are widely used in browser based interfaces for SharePoint are not supported on iOS and Android. Additionally, user interfaces designed for access from web browsers on PCs do not map easily to the newer, touch based UIs prevalent on mobile devices. To address these problems, many end users take matters into their own hands and manually manage and copy content between their notebook or desktop PC and their mobile devices. This creates unnecessary work for end users, and puts the burden on them to manage synchronization to ensure possession of the right files at the right time. The end result of all of these challenges is that mobile device users receive a degraded experience and level of service on their mobile devices.

While users get frustrated at their degraded level of service, IT has its own headaches. For example, users who take things under their control to bypass IT/enterprise policies create new problems in terms of governance and information security. When users bypass approved processes and systems, they compromise business governance, compliance, auditing requirements, record management policies and information confidentiality and privacy. These problems become worse as users get more experience with a multitude of consumer-centric tools and services ranging from mobile applications ("apps") to cloud services like Box, Dropbox, iCloud. The boundary between a user's personal content and enterprise information is becoming increasingly blurry. There is a need to balance improved user experience (UX) and choice of cloud services, against enterprise requirements to enforce information security, policy compliance and confidentiality.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

Various embodiments of the invention are disclosed in the following detailed description and the accompanying drawings.

FIG. 10 is an example of a policy/service management console under an embodiment.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Averail Cloud Content Exchange ("CloudXchange" or "ACXS") service, also referred to herein as Averail or the Averail system, is a cloud-hosted service that provides secure access from mobile devices (smartphones and tablets) to an aggregated set of on-premise Enterprise Content Management ("ECM") and/or storage systems and cloud storage services. These ECM and cloud storage services can include on-premise SharePoint, Office 365 with SharePoint Online, Dropbox, iCloud, Google Docs and Box.Net.

Figure 1:
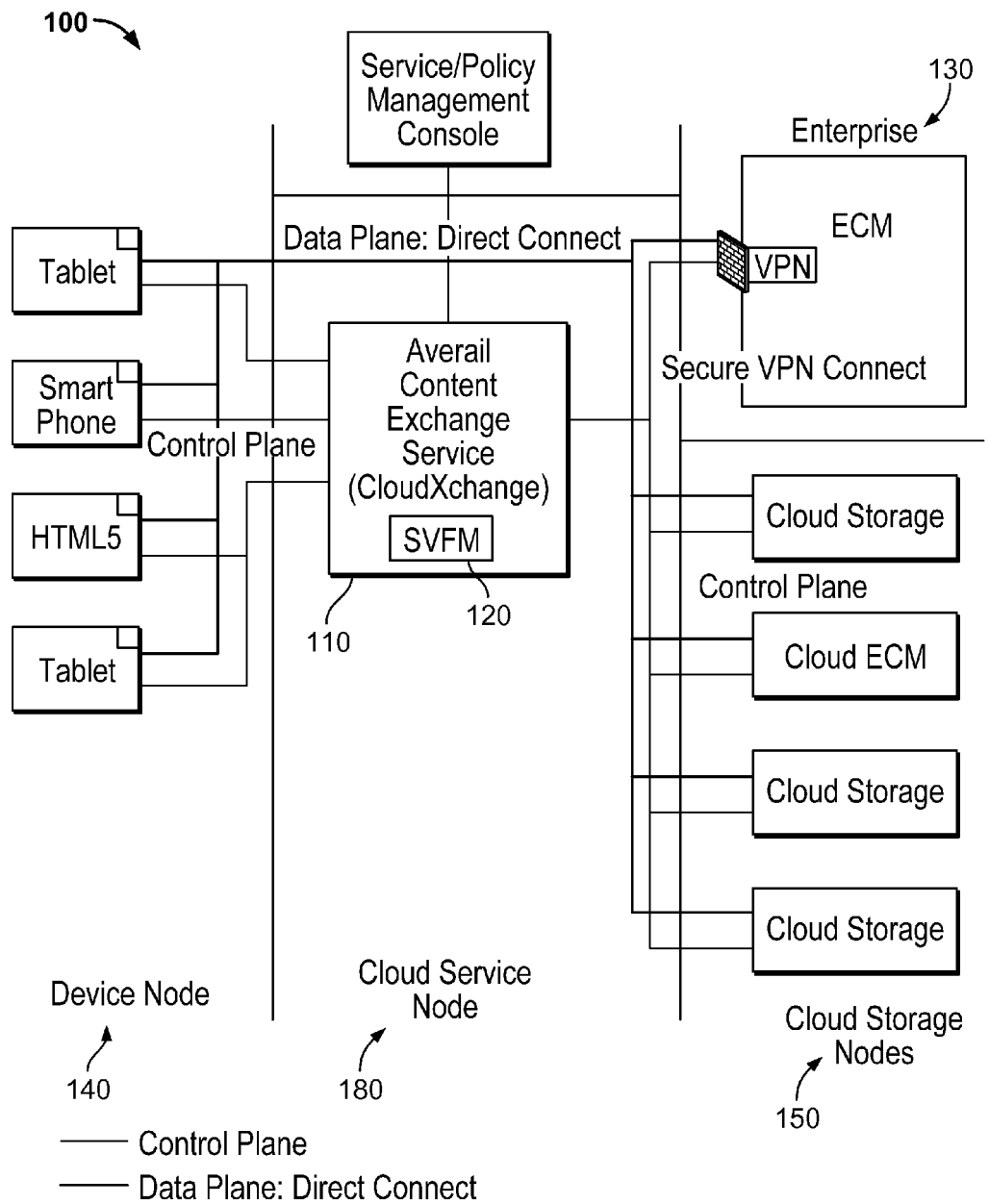
FIG. 1 is an example of an end-to-end view of the ACXS service, under an embodiment.

FIG. 1 is a example of an end-to-end view of the ACXS service. The figure shows a device node 140, a cloud storage node 150, an enterprise node 130 and a cloud service node 180. The device node 140 includes one or more of a smartphone, a tablet or a web browser client. A smartphone device may include an iPhone device running iOS, an Android device running the Android operating system or a Windows phone running the Windows operating system. A tablet device may include any mobile tablet platform running any one of the above referenced operating systems (for example, the iPad running iOS). The enterprise node 130 includes enterprise content management services including Windows Server Active Directory, and Microsoft SharePoint. The enterprise node may also include local shared drive solutions that provide shared access to enterprise content/files. Such systems include Network File System, Distributed File System, and/or Server Message Block (SMB), also known as Common Internet File System (CIFS). The cloud node 150 includes cloud based storage services and/or applications including Dropbox, iCloud, Google Docs and Box.Net. The cloud node 150 also includes cloud hosted enterprise content management solutions such as Microsoft Office 365. The device node 140, cloud storage node 150, and an enterprise node 130 are coupled to the cloud services node 180. The cloud services node includes the ACXS cloud based service 110 hosted in a public or private cloud under an embodiment. The smartphone, tablets and web browser as seen in FIG. 1 run instances of the Averail application that broker user communications with enterprise and cloud content through the ACXS service.

The Averail cloud based service implements a cloud based secure virtual file management system/service 120 (SVFM) as described in greater detail below. In the descriptions and embodiments set forth below, the SVFM system/service may be referred to as the ACXS SVFM system/service, the Averail CloudXchange system/service or ACXS system/service. One skilled in the art will understand that the ACXS cloud based service in cooperation with the Averail mobile application provides the core functionality of the secure virtual file management system. Accordingly, each of the terms SVFM system/service, the Averail CloudXchange system/service or ACXS system/service contemplate interaction with the Averail mobile application and its functionality. Further, the term secure virtual file management (SVFM) may s under an embodiment be used interchangeably with secure virtual document management (SVDM).

As indicated above, the Averail CloudXchange service in cooperation with the Averail mobile application enables a secure virtual file management system with a wide range of mobile device user functionalities. The ACXS SVFM enables mobile users (of smartphones and tablets) to easily and securely access and manage content (documents, media, workspaces, sites) across both on-premise ECM and cloud storage services. The ACXS SVFM enables mobile users to collaborate with other users (partners, customers, offsite employees) and share content across on premise and cloud storage services seamlessly and securely. The ACXS SVFM enables first class experience for enterprise mobile device users (for both IT managed and non-IT managed) who want to access and manage on-premise ECM systems and documents. The Averail mobile application is a "full client" that enables users to view, edit, annotate and share (with other applications and users) documents. The ACXS SVFM ensures that enterprise/IT requirements and policies for authentication, authorization, access control, auditing, business and IT policy compliance, records management, privacy and information management are not compromised. Users can access content under different access and topology scenarios-whether offsite on mobile cellular network, on-site on WiFi or offline. The ACXS SVFM enables IT administrators and enterprise content administrators to define policies, groups, permissions, configuration settings for secure content management.

The SVFM implements a suite of encryption and policy control solutions across a plurality of traditionally siloed storage services, ECM systems and applications. Under conventional document management systems, policy enforcement, encryption methods and authentication/access controls are tightly coupled with the underlying system itself. A decoupling of content from the document management system degrades or eliminates the efficacy of security controls.

As one example, existing encrypted file systems including encFS and ecryptFS are tightly integrated with OS-specific file system and encryption mechanisms or are device specific in case of hardware encryption. The movement of content from encrypted file system to other systems/repositories and devices breaks the security by decoupling the content from its security controls (encryption, policies and permissions) and thereby increasing vectors for information leakage. As another example, existing Enterprise content management systems and cloud-based storage systems enforce controls within a "fenced" perimeter. Users see each system as an end-to-end silo: Each system has its own mobile/desktop/web application that is tightly coupled with underlying storage repository and security mechanisms. Security controls (encryption, policies, permissions, rights management), content management and storage/repository are tightly coupled and are specific to each system. Movement of content from source system to other systems/ repositories and devices breaks the security by decoupling the content from its security controls and thereby increasing vectors for information leakage.

The Averail CloudXchange service is a secure virtual file management system that is cloud-hosted service and provides secure access from mobile devices (smartphones and tablets) to a federated set of on-premise ECM/storage system and cloud storage services. These ECM and cloud storage services can include on-premise SharePoint, Office 365 with SharePoint Online, Dropbox, iCloud, Google Docs, Google Drive and Box.Net. Each such ECM and cloud storage domain integrated within the Averail system is referred to as a storage domain.

FIG. 1 shows the system architecture of the Averail end-to-end system. The Averail system includes a mobile device node comprising mobile devices, tablets and/or web clients. The mobile devices include the Averail mobile application running on iOS, Android, Windows Phone and Windows 8 platforms. The Averail system includes a cloud based node which implements the Averail CloudXchange service (ACXS). The cloud based ACXS is deployed and operated on public and/or private cloud computing platforms. The Averail ACXS service uses the primitives and services of an underlying cloud based computing platform. As one example these underlying services may include computing, storage, relational databases, structured and blob storage stores, and virtual private cloud services. The Averail end-to-end system further includes an enterprise node environment containing enterprise applications, ECM systems, file storage systems, Active Directory domain/federation servers and VPN appliances. Finally the Averail system includes one or more cloud storage services and ECM systems. Examples include Box.net, Dropbox, iCloud, Office365.com, Google Docs, and Microsoft SkyDrive etc.

Each node represents an architected collection of subsystems and components that provides a defined set of services and functionality as part of the overall system. A node connects and interfaces (using different technologies—for example, Representational State Transfer (REST) web services interfaces over Hypertext Transfer Protocol (HTTP) between Averail mobile application and ACXS cloud service) with one or more other nodes to define the overall end-to-end architecture. The system architecture specifies the normative reference architecture for each node, interfaces and interactions across nodes and the entire end-to-end system. This reference architecture can be realized using different software technologies (for example: Amazon AWS or Windows Azure can be the underlying cloud computing platform, public or private cloud) and conforms to the overall system requirements and architecture framework.

The ACXS architecture described below focuses on both logical model and physical deployment model. Depending on the scale of the Averail services, logical components can be deployed in different physical topologies and configurations. In the following description, numerous specific details are introduced to provide a thorough understanding of, and enabling description for, the ACXS systems and methods described. One skilled in the relevant art, however, will recognize that these embodiments can be practiced without one or more of the specific details, or with other components, systems, etc. In other instances, well known structures or operations are not shown, or are not described in detail, to avoid obscuring aspects of the disclosed embodiments.

The AXCS service maintains a logical data model for each enterprise customer of the Averail service. FIGS. 2A-2D show the logical data model under an embodiment. The logical data model includes a federated identity model, a policy and authorization model, a federated content forest model, and a device management model. The ACXS service combines information from the logical data models (on a per customer basis) to perform its cloud-side part of the functionality related to federation of cloud storage and on-premise ECM, secure content management, policy management and enforcement, and monitoring, reporting and analytics.

The federated content forest model maintains a metadata-based forest of storage domains (a storage domain is either a federated ECM or cloud storage system) and corresponding content hierarchy. As seen in FIG. 2B, the content forest maintains such information under an embodiment for a plurality of storage domains. As one example, FIG. 2B shows that the content forest includes data regarding SharePoint team site hierarchy 220 with respect to an instance of on-premise SharePoint storage solution. The displayed content forest also includes metadata information of iCloud 222 and Box domains 224.

Figure 2A:
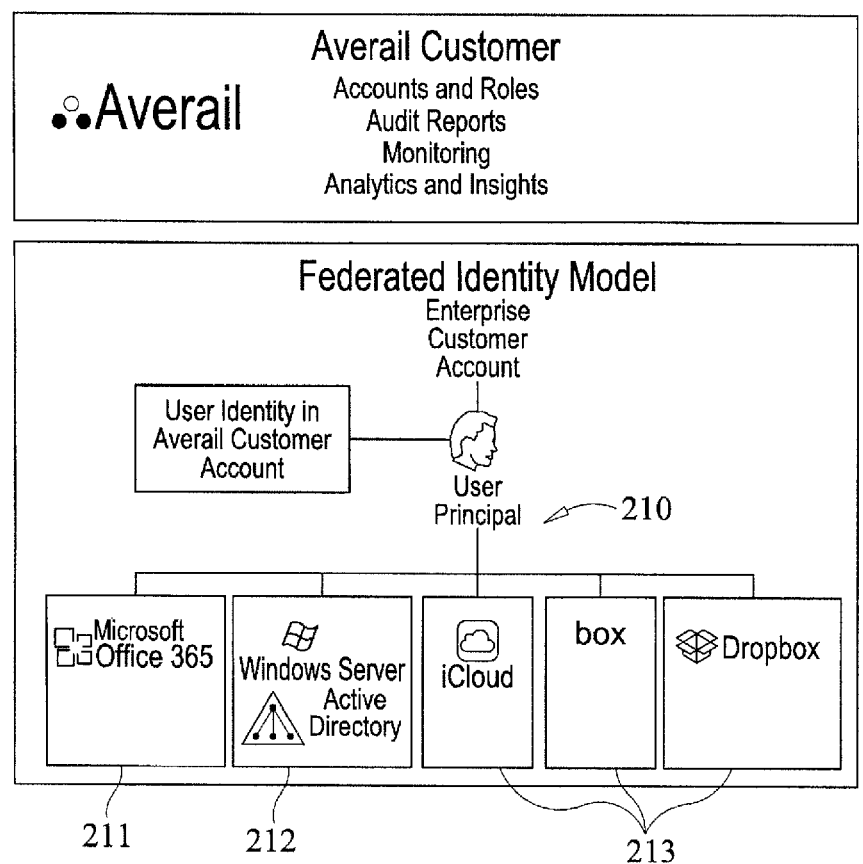
FIG. 2A is an example of a logical federated identity data model, under an embodiment.
Figure 2B:
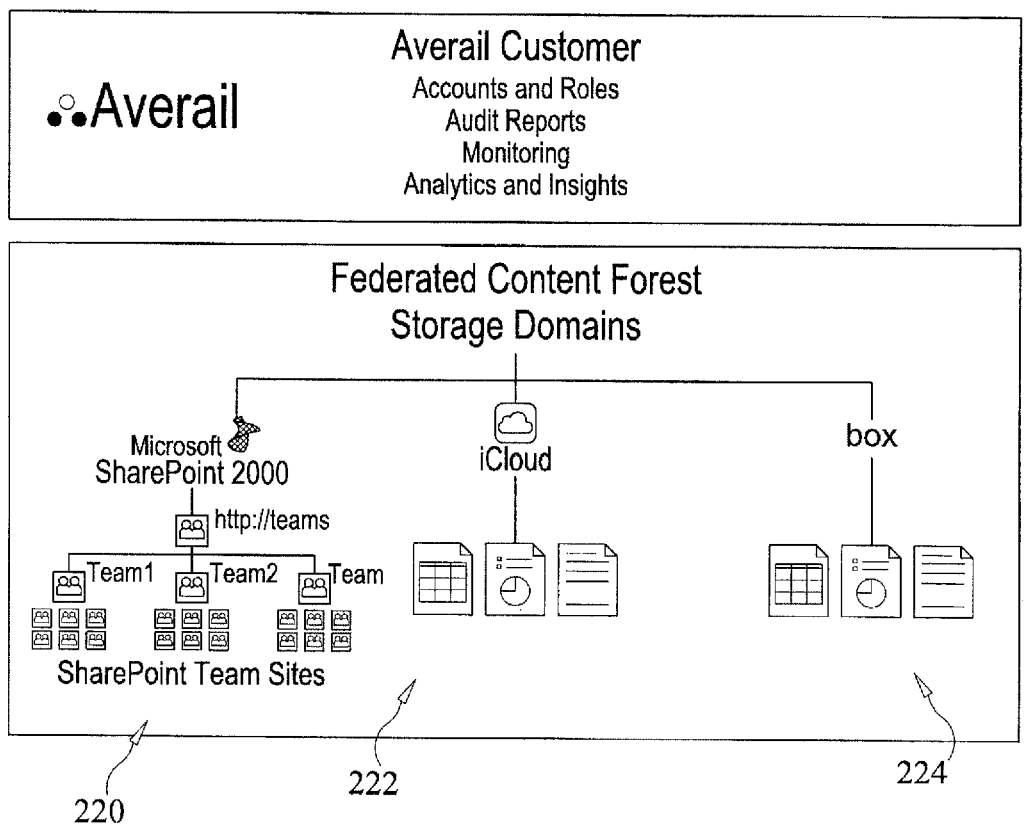
FIG. 2B is an example of a logical federated content forest metadata model, under an embodiment.
Figure 2C:
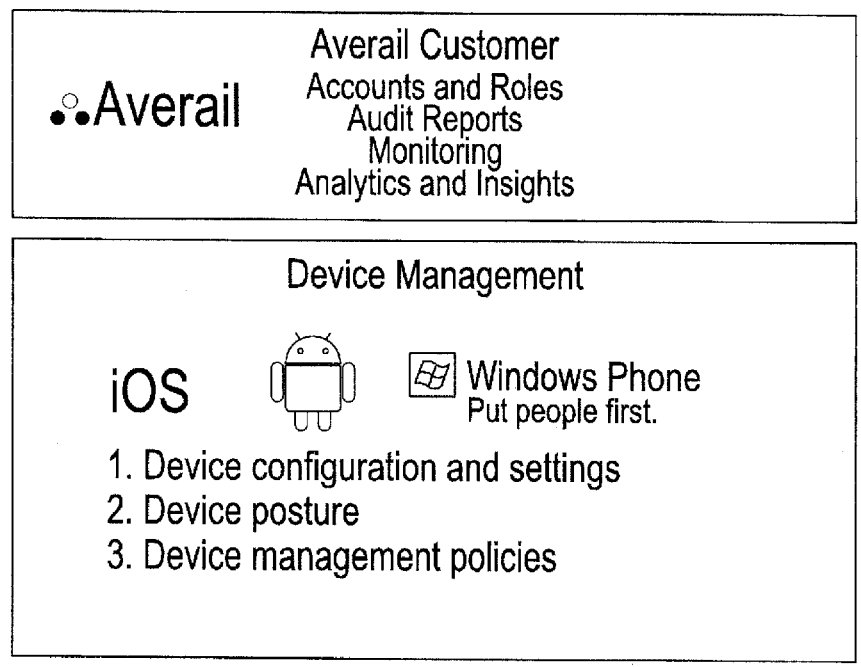
FIG. 2C is an example of logical device management date model, under an embodiment.

As seen in FIG. 2C, the device management model includes data for all user devices enrolled and managed for an enterprise customer as part of the Averail service. Device data includes information about the configuration and settings of all devices, device posture, and device management policies defined by that customer for its set of device. If an enterprise customer has a mobile device management (MDM) service and Averail integrates with that MDM server, then the physical representation of this model is in the MDM server; otherwise Averail maintains the physical model also. Devices that participate in sharing and collaboration scenario (except anonymous users and devices) are also tracked in the device management model. The device management policies for these non-customer devices are derived from user role (example: partner, customer, contractor, guest) relative to this enterprise customer.

FIG. 2A shows the federated identity model under an embodiment. The federated identity model maintains a mapping of user principals 210 within an enterprise customer. The identity model includes the user's Averail identity and credentials, the user's associated device(s) unique identifier(s), and user identity and credentials for each federated storage domain. This identity information is associated with enterprise customer account and administrator roles. FIG. 2A shows a federated identity model that maintains under an embodiment user identities with respect to an enterprise cloud storage service 211 (Microsoft Office 365), enterprise content management system 212 (Active Directory), and cloud storage services 213 (iCloud, box, and Dropbox). In addition, all this information is stored in a multi-layer strongly encrypted manner (AES 256 bit encryption) with requirement to ensure that no user information is ever in the clear or subject to security threats. The ACXS service only stores credentials that are needed to synchronize content forest metadata with storage domains, if so done from the cloud service.

Figure 2D:
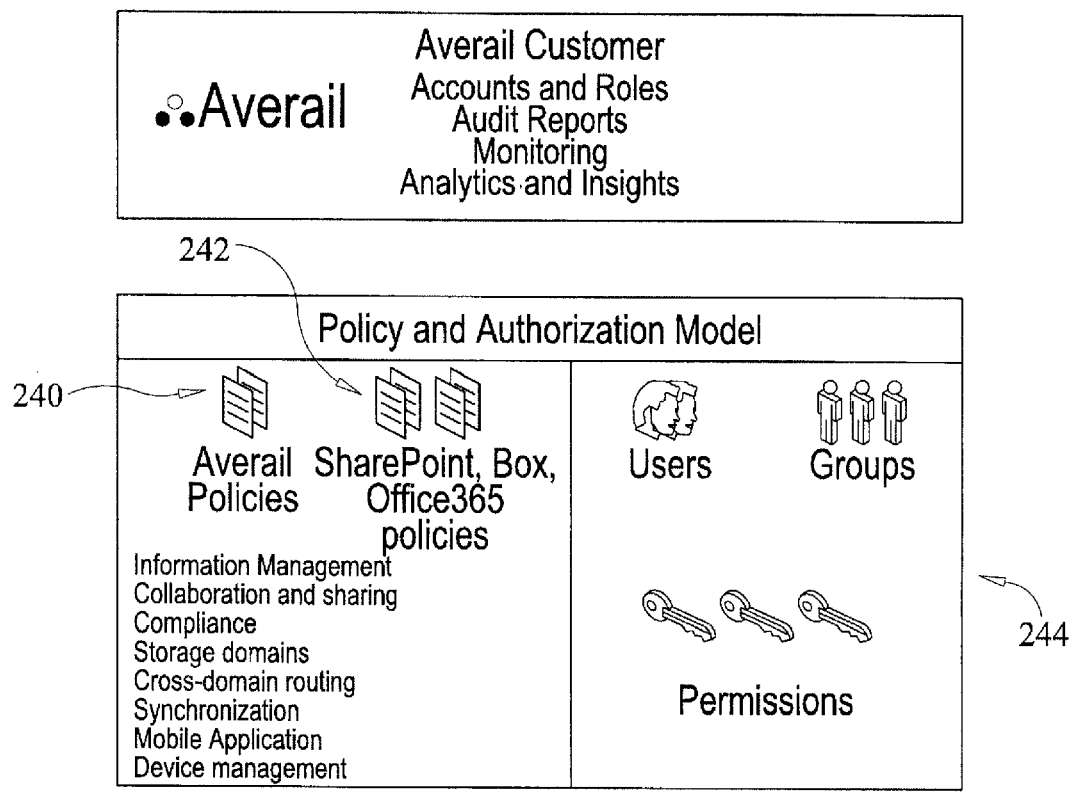
FIG. 2D is an example of a logical policy and authorization model, under an embodiment.

FIG. 2D shows an example of the Policy and Authorization Model under an embodiment. The model under an embodiment includes information of policies and permissions. The Averail service administrator uses a service management application/console to define security policies/definitions 240 that are applicable to the Averail managed storage domains. Averail CloudXchange service stores these policies in an underlying secure policy store. The Averail system implements broad classes of management policies including information management, collaboration and sharing, compliance and auditing, cross-domain routing across storage domains, synchronization, mobile application-specific policies, device management policies, and/or information rights management policies. The policy and authorization model also inherits policies 242 from federated storage domains. The requirement is to ensure that inherited policies are always enforced and cannot be overridden (but may be augmented) by Averail-specific policies. CloudXchange service also models groups and permissions 244 for both those inherited from storage domains, Active Directory and those defined within Averail context.

The Averail service stores content metadata (accessed from its federated storage domains and ECM domains), permissions and policies definitions securely in its databases and structured storage. The Averail mobile application can access this information using secure and trusted REST interfaces exposed by ACXS service. However, any access and operations on the content from mobile device itself happen directly between the application on mobile device and storage domain services.

Figure 3:
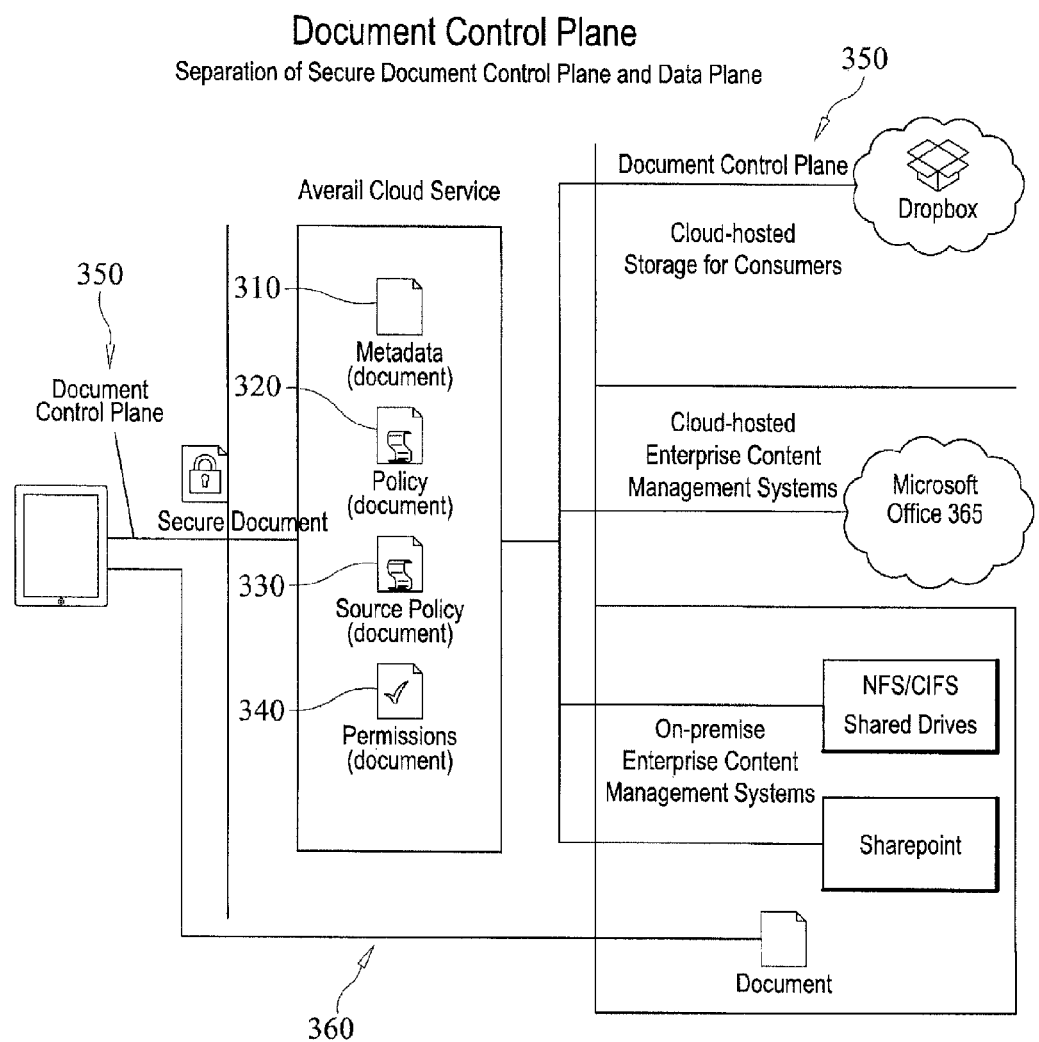
FIG. 3 is an example of the ACXS implemented control plane, under an embodiment.

FIG. 3 is an example of the ACXS implemented control plane under an embodiment. The ACXS maintains (in ACXS cloud based storage) document metadata 310, policy document 320, source policy document 330 and a permissions document 340. Under one embodiment the policy and permissions documents store policy and permission definitions created by an administrator through a policy management console coupled to the ACXS. Under this embodiment, the source policy document inherits policies and permissions from a source storage domain, e.g. policies and permissions administered by SharePoint at an enterprise level. As seen in FIG. 3, the ACXS service secures or contains documents on the control plane 350 by supervising a document control plane. As one example, enterprise content is transferable to a mobile device and further to cloud based storage locations if allowed by "control plane" policies. However, direct access 360 and operations on the content from mobile device itself happens directly between the Averail application on mobile device and storage domain services except as defined under alternative scenarios described below.

Figure 4:
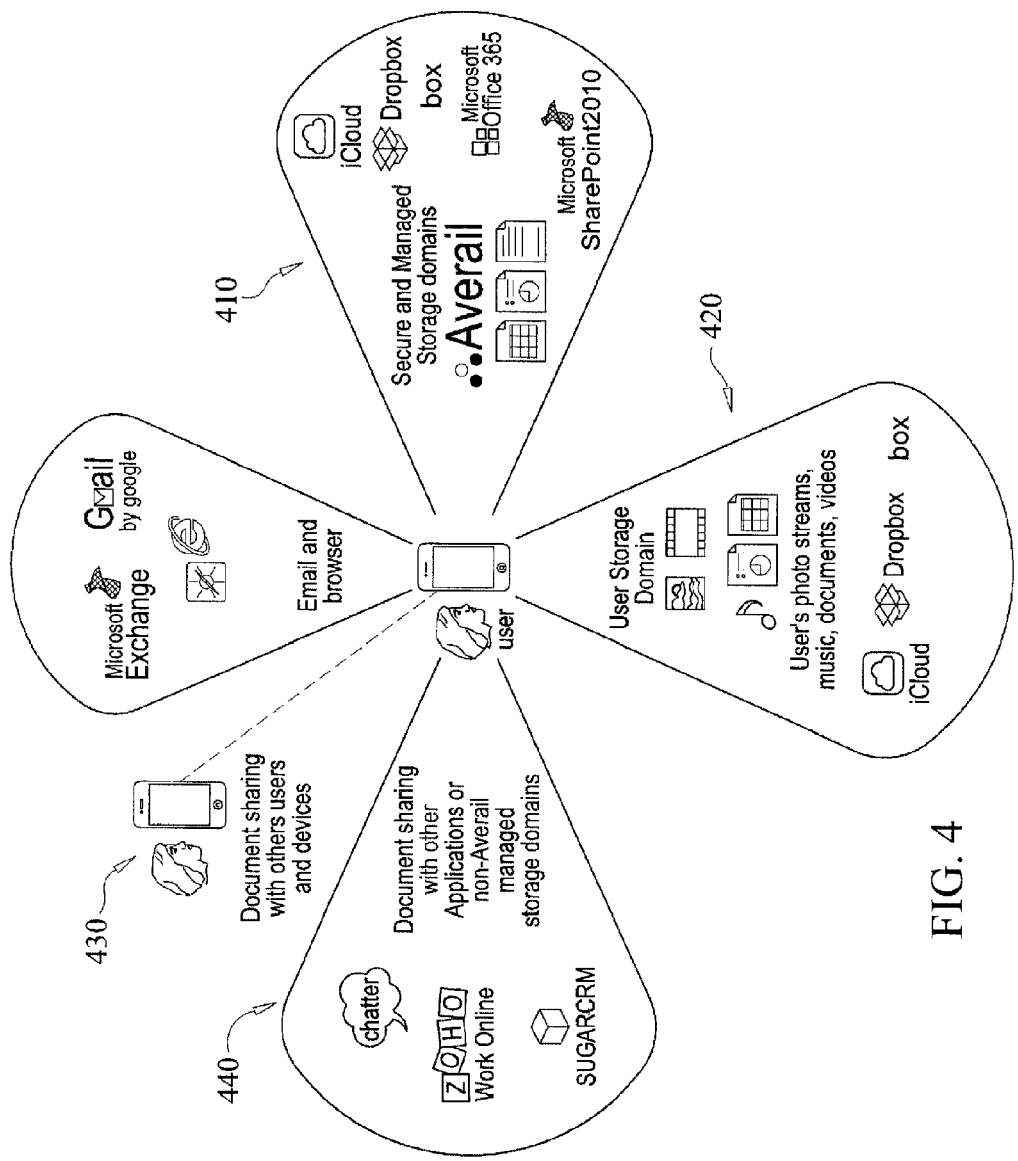
FIG. 4 is a description of Averail managed containers, under an embodiment.

FIG. 4 is a description of Averail managed containers under an embodiment. As seen in FIG. 4, Averail provides the notion of a secure and managed storage/content management container to the mobile device users. This managed container provides secure environment for access/sharing/collaboration of documents from multiple federated storage domains, enforces policies and permissions (as inherited from source storage domains and defined through ACXS service) and prevents document leakage. FIG. 4 shows a number of storage domains and applications available to the user. Mobile device user may store content among a plurality of locations. For example, user storage domains include iCloud, Dropbox and box.

The Averail system provides a managed storage/content management container 410 to the mobile device user. The managed container under an embodiment include a combination of cloud based storage services, cloud based ECM services (Microsoft 365) and on-premise ECM services (SharePoint). While a user can continue to store and manage personal content 420 (music, videos, photos, documents) from a smartphone or tablet onto cloud storage/ECM service of his/her own choice, Averail ensures that any content (that is stored or imported into underlying federated cloud storage and/or on-premise ECM services) within the Averail domain is secure and adheres/complies to policy and permissions defined by enterprise content administrators and Averail service administrators.

Under the SVFM concept and service, the user has the option to import or move documents from other applications on the device into the Averail managed domain and make these Averail managed documents. User can share Averail-managed documents with other users and devices directly via the Averail service 430 or indirectly via 3rd party applications 440 (Chatter, SalesForce, Google Apps) provided policies and permissions allow such sharing. If user shares content or exports content from Averail managed domain with other users/applications, then the content is still managed as per requirements (example: audit trail), policy and permissions for Averail managed domain. For example, if Averail document sharing policy doesn't allow an Averail managed document to be shared with an anonymous user, Averail enforces that policy on document sharing.

Figure 5:
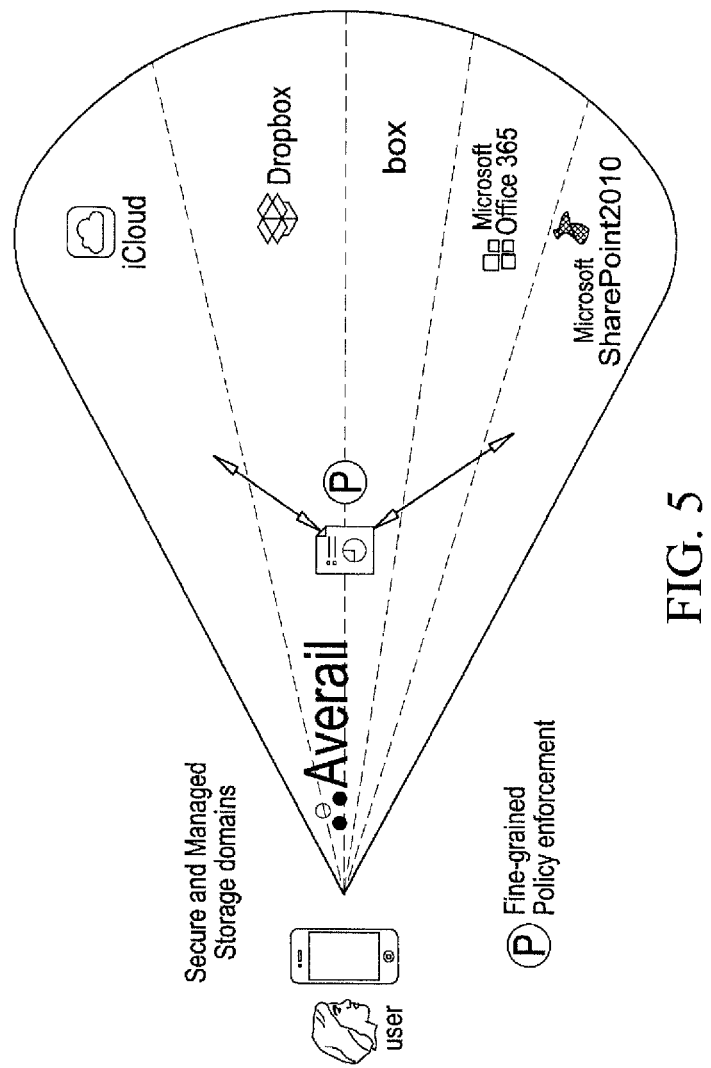
FIG. 5 shows an embodiment of an ACXS system that restricts cross-domain routing across and among cloud and ECM locations, under an embodiment.

Under an embodiment, the ACXS system provides cross-domain routing across storage domains. Given that Averail service federates multiple cloud storage and ECM services, a user has the option of copying/moving or do export/import (for example: "Open in . . . " on iPhone or iPad moves the document to local sandboxed file system of the target application) of the content across these storage domains. For example, a user can move a document from on-premise SharePoint site (that doesn't allow external access to non-employees) to Box.Net so that user can provide access to this document to a customer. However, such cross-domain routing is subjected to policies and permissions defined within the Averail service. FIG. 5 shows an embodiment of a SVFM system that restricts cross-domain routing across and among cloud and ECM locations including iCloud, Dropbox, Box, Microsoft Office 365 and SharePoint. A later section specifies the scenarios related to cross-domain routing policies.

The Averail service provides security for data at rest for documents on both mobile device and ACXS federated cloud storage service.

Averail services enable service administrator and mobile users to set policy to ensure that any content stored on public cloud storage services is always encrypted using keys managed and controlled by either the user or Averail customer. Given Averail CloudXchange service of an embodiment is not on the data plane, the content encryption and decryption happens on the mobile device by Averail mobile applications. Also, Secure Sockets Layer/Transport Layer Security (SSL/TLS) is used during communication between device and cloud storage service. The goal is to ensure that content is never in clear either at rest or in transit as it goes from device to public cloud storage services.

The Averail ACXS (CloudXchange) service federates a user's identity across multiple on-premise ECM and cloud storage services. Under an embodiment, Averail uses a customer account owner to create an Averail customer account and then create users or user principals within that Averail account.

Figure 6:
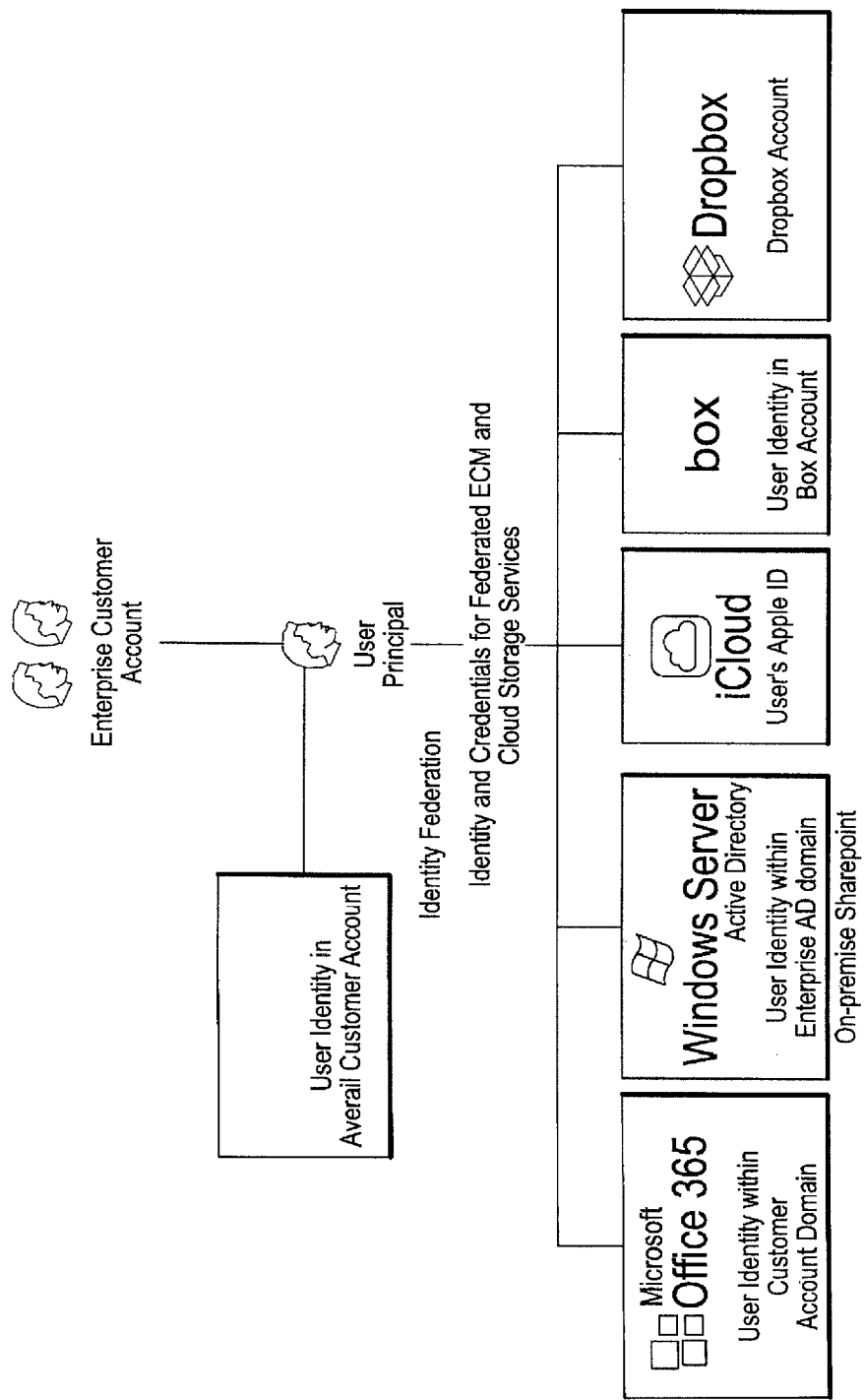
FIG. 6 shows a federated set of user identity and credentials corresponding to the federated ECM and cloud storage services, under an embodiment.

FIG. 6 shows a federated set of user identity and credentials corresponding to the federated ECM and cloud storage services. Under this embodiment, the ACXS service maintains a user principal's identity within a Microsoft Office 365 customer account domain, within an enterprise Active Directory domain, within iCloud (apple id), within a box account and within a Dropbox account. A user principal in Averail domain has multiple identities and associated credentials for authentication and authorization for access to respective storage domains. The user principal has a unique Averail identity within the domain of the corresponding Averail customer account. The Averail ACXS service associates the unique Averail identity with a customer account using an enterprise directory management system. An Averail customer account can have any number of users. As one example, a single user creates a trial account on Averail. As another example, a large enterprise customer may create accounts for over 100,000 employees.

A user principal can have one or more Active Directory accounts across different domains. For example, a user can be a vendor in one Active Directory domain and employee in employer's Active Directory domain.

Under an embodiment, the Averail system associates a user principal's identity as implemented within a plurality of multiple storage domains with an Averail managed user principal identity. For example, iCloud supports a single user identity model. Under this model, there is no notion of an enterprise account. Each user is represented with an Apple ID that is also associated with the device as part of iOS initial setup. Averail enables a user principal to associate an Apple ID with a federated Averail identity for access to iCloud. As another example, Box.Net and Dropbox for teams enable enterprises or group of users to setup a common administrative account and manage users and groups within that account. Through federated identity mapping, Averail manages the association of user principal with the corresponding Box.Net and Dropbox user identity associations within the context of associated account. Averail also supports single user accounts for Dropbox and Box.net.

It should be noted that the ACXS service does not store username and passwords for federated storage domains. A user authenticates separately with the ACXS service and storage domains. For example, the Averail application user authenticates with the ACXS service and sets up trust between application and ACXS (subject to session timeout policy). With respect to storage domains, a user authenticates directly with target storage domains. The authentication tokens may then be cached on the device under an embodiment.

As seen in FIG. 1, the mobile devices within the mobile node of the Averail system run the Averail mobile application. Under an embodiment, the Averail mobile application uses rich platform-specific mobile application or an HTML5 application to access Averail services for secure mobile content access and management, cloud storage aggregation and document collaboration. With respect to mobile devices and tablets, the mobile applications are platform-specific native mobile applications distributed through public app stores or enterprise app stores. Averail supports iOS (for iPhone and iPad), Android (tablet & phone) and Windows Phone applications. The Averail application may also run as an HTML5 application that can be accessed using HTML5 capable browser. Note that HTML5 mobile applications may have limitations including limitations in terms of device native UX, local storage and access to native OS APIs for encryption.

The Averail application provides users an easy to use UX to access Averail services and its federated set of ECM and cloud storage services without introducing complexities related to service administration and policy definition functions. A user can perform at least the following functions using the Averail mobile application.

The Averail application provides capability to view, edit, create and manage content hierarchy (document libraries, folders etc.), metadata and content itself The Averail application provides capability to export document from Averail mobile application to other viewer and collaboration/email applications, under an embodiment.

The Averail application provides capability to import document from other applications to Averail application, under an embodiment.

The Averail application provides capability to share across multiple storage domains securely, under an embodiment.

The Averail application provides capability to share documents across standard/custom groups and users, under an embodiment.

The Averail application provides capability to search for document within/across folders, sites and storage domains, under an embodiment.

The Averail application provides capability to manage and tag items for offline access, under an embodiment.

The Averail application provides capability to subscribe to notifications or alerts for conditions/events related to content, folders, sharing, workflow or system events, under an embodiment.

Figure 7:
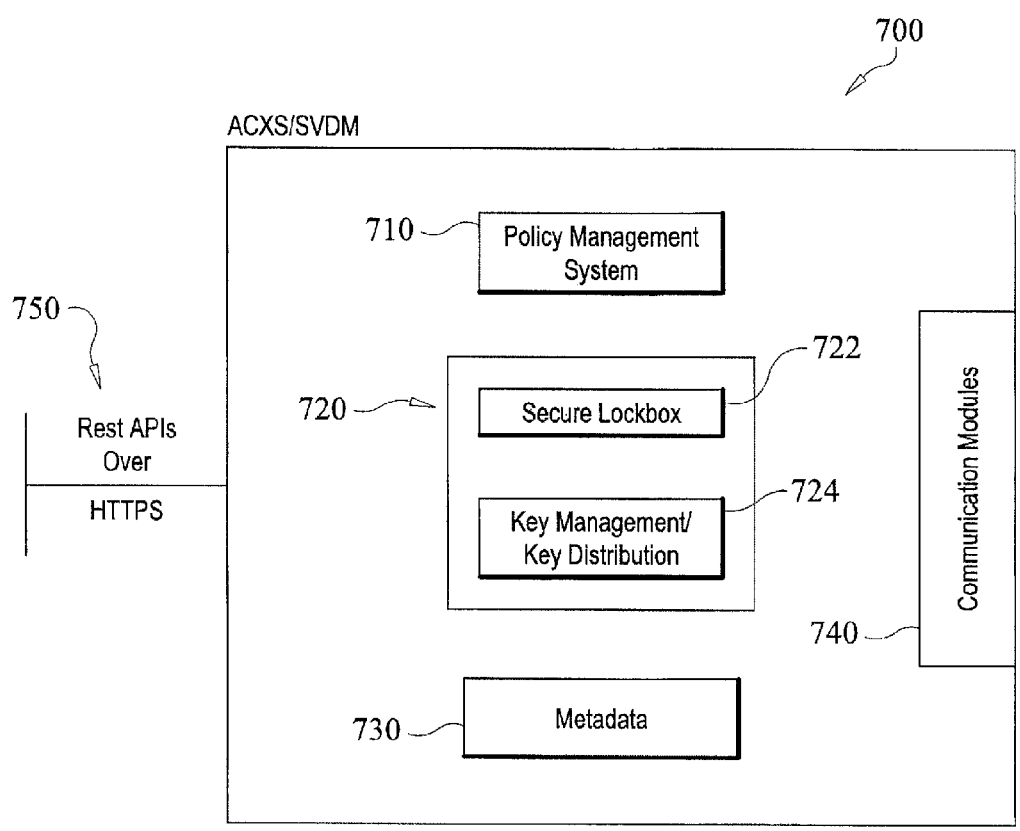
FIG. 7 shows the key components of the SVFM system as implemented within ACXS cloud based architecture, under an embodiment.
Figure 8:
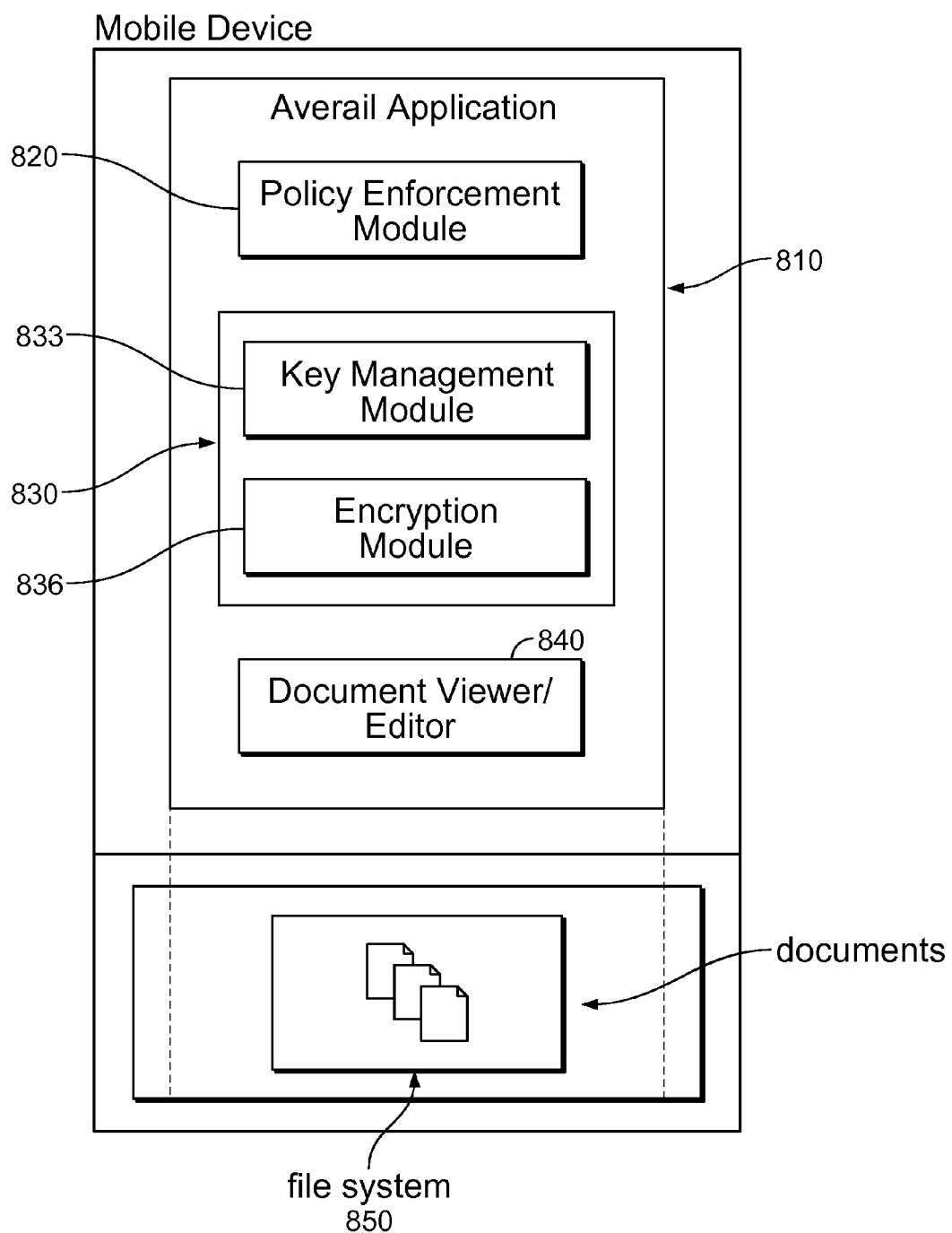
FIG. 8 shows key components of the Averail application running on a mobile device, under an embodiment.

As indicated above, the secure virtual file management system (SVFM) of the Averail system manages content within the Averail system through a combination of metadata capture/analysis, policy/permission definition and enforcement, encryption methods and identity federation/management systems. FIG. 7 shows the key components of the SVFM system as implemented within ACXS cloud based architecture. FIG. 8 shows key components of the Averail application running on a mobile device. The components of the SVFM system and the Averail application are now briefly described to provide a general framework for discussing the ACXS service. Greater detail is provided as needed during the subsequent detailed discussion of the ACXS service.

The SVFM includes a policy management system 710, and encryption system 720, and a metadata module 730. The encryption system 720 further includes a secure lockbox 722 and key management/key distribution component 724. The systems and components of the SVFM cooperate with the components of an Averail application running on a mobile device in order to provide certain functionalities of the SVFM system as described below. FIG. 8 shows key components of the Averail application 810 running on a mobile device. The Averail application includes a policy enforcement module 820, a device side encryption system 830 and a document viewer/editor 840. The device side encryption system 830 further includes a key management module 833 and an encryption module 836. The Averail application maintains a local sandboxed file system 850 on the mobile device.

The SVFM includes communication modules 740. The communication modules include communication interfaces to cloud based storage services and/or ECM services. For example, the communication module includes under an embodiment a SharePoint connector for communication with enterprise SharePoint systems through SharePoint Representational State Transfer (REST) services and Simple Object Access Protocol (SOAP) APIs. The communications module includes under an embodiment a dropbox connector providing an interface with Dropbox APIs from the ACXS cloud based service. The communications module includes under an embodiment a proxy connector that provides an interface with ECM systems using reverse REST/HTTP protocol communications as described in greater detail below. The SVFM exposes ACXS content/services to the Averail mobile application through REST web services using HTTP communications 750. Such REST services include CustomManager, UserManager, RoleManager, GroupManager, DocManager, StorageDomainManager, MetadataManager, DeviceManager, EventManager, PolicyManager, KeyManager and Activity Manager.

The SVFM includes a metadata module 730. The metadata module collects/maintains/tracks data including information of customers, users, groups, roles, document metadata, storage domains, sites, permissions, policies and policy templates, mobile devices, and mobile device user events/activities. The ACXS may under an embodiment implement the metadata module as a Data Access Object (DAO) using Java Persistence or Hibernate to effect an object relational mapping to facilitate data storage in an SQL database. However, embodiments are not so limited. The SVFM/ACXS components as seen in FIG. 7 may under an embodiment be implemented within an open source software implementation of Java Servlet and JavaServer Pages technologies known as Apache Tomcat. Under an embodiment, Tomcat provides a "pure Java" HTTP Java servlet environment in which to run Java code.

The Averail system allows movement of content between communication endpoints distributed among a federated set of storage locations while maintaining enterprise control over the content. At its most fundamental level, the SVFM enables all of these functionalities through a node based communications paradigm which routes communications from any one node to any other node using logical and/or physical elements/controls of the central ACXS core. The components of the SVFM cooperate with the components of an Averail application running on a mobile device to provide certain functionalities of the SVFM system. As just one example, the policy management system of the ACXS (as further described below) cooperates with policy enforcement module of the Averail application to implement policy definitions across a plurality of heterogeneous document management systems and manage their enforcement.

Figure 9:
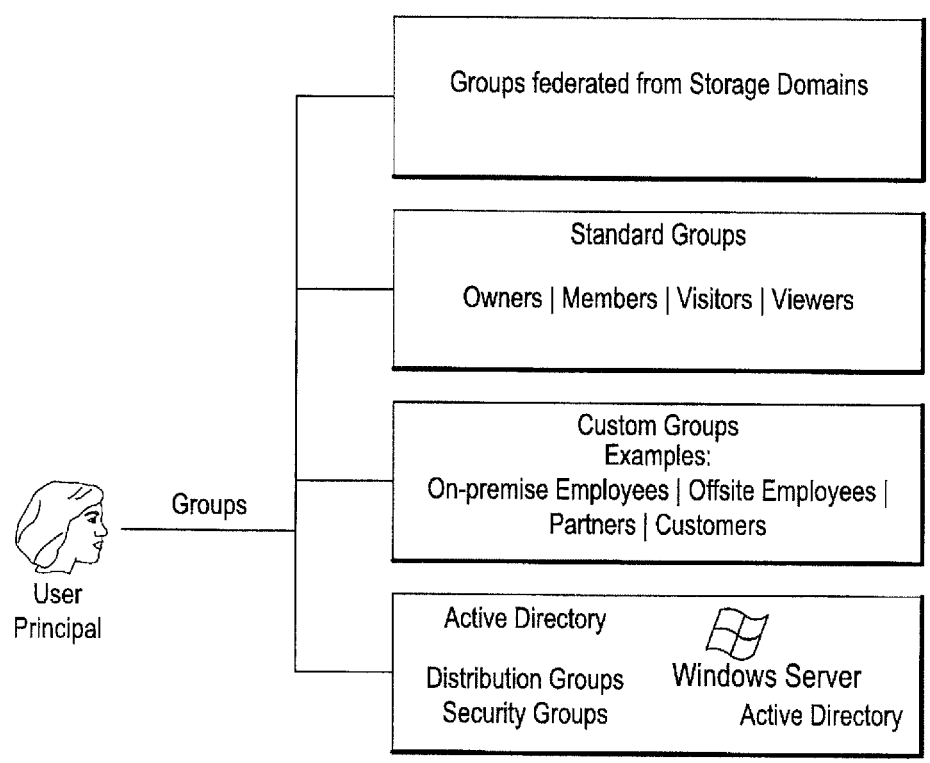
FIG. 9 shows groups federated from underlying storage domains under an embodiment.

The policy management system is further coupled to policy management console that allows administrators ability to define policy controls that augment existing policies and permissions defined at the level of enterprise storage systems and associate policies with groups of users. FIG. 9 shows groups federated from underlying storage domains under an embodiment. The Averail policy management console provides users and administrators an ability to create groups. The Averail service allows an administrator to group users under either standard groups or custom groups. Under an embodiment, custom groups may also be created by a service administrator. Standard groups include owners, members, visitors and viewers. Custom groups include on-premise employees, offsite employees, partners and customers. Each group is associated with a set of permissions and policies. As one example, viewer group users do not have edit capabilities of owner user. The Averail service also associates users with the groups that are defined and managed within the context of federated storage domains. For example, Box.Net enables its users to create and manage groups and permissions within Box.Net enterprise accounts. Averail imports these domain-specific groups and permissions, and also enables administrators/users to define additional groups and permissions. As another example, Active Directory enables distribution group and security group definitions for Active Directory managed users. Averail imports these Active Directory groups and associates permissions as part of its group management.

Figure 11A:
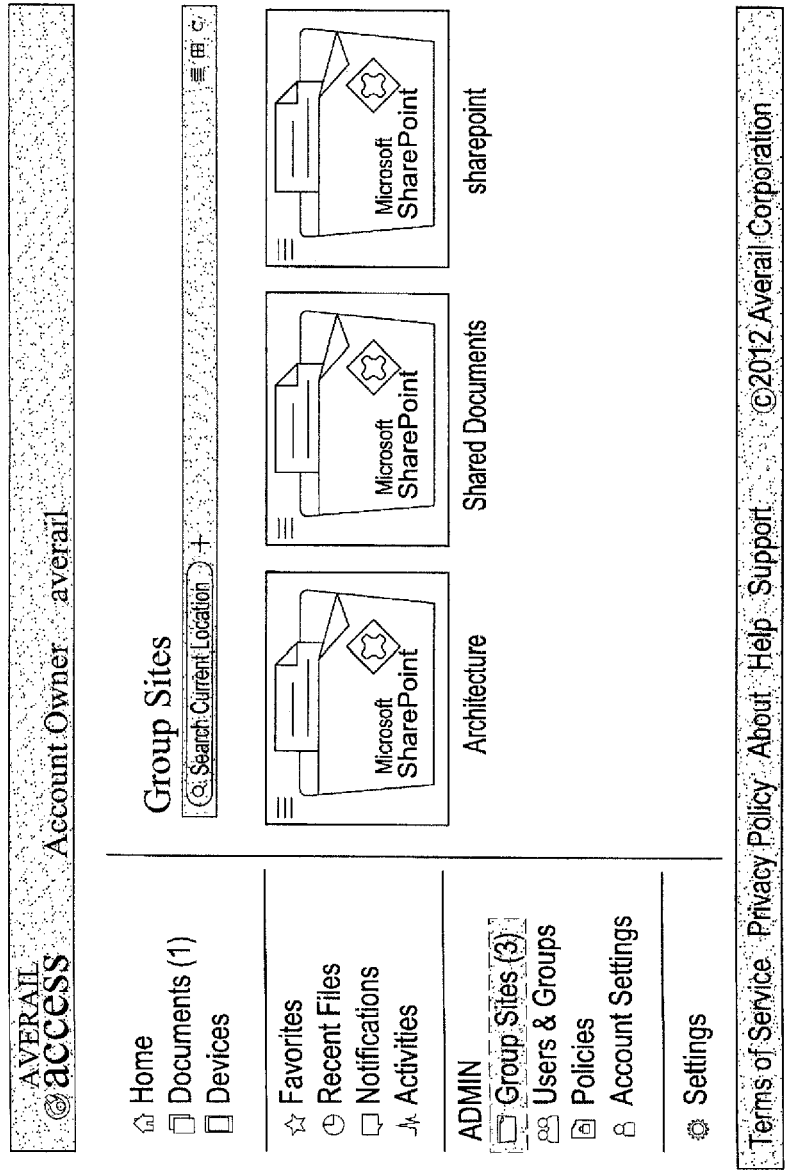
FIG. 11A illustrates the use of the administrative console to define groups/sites, under an embodiment.
Figure 11B:
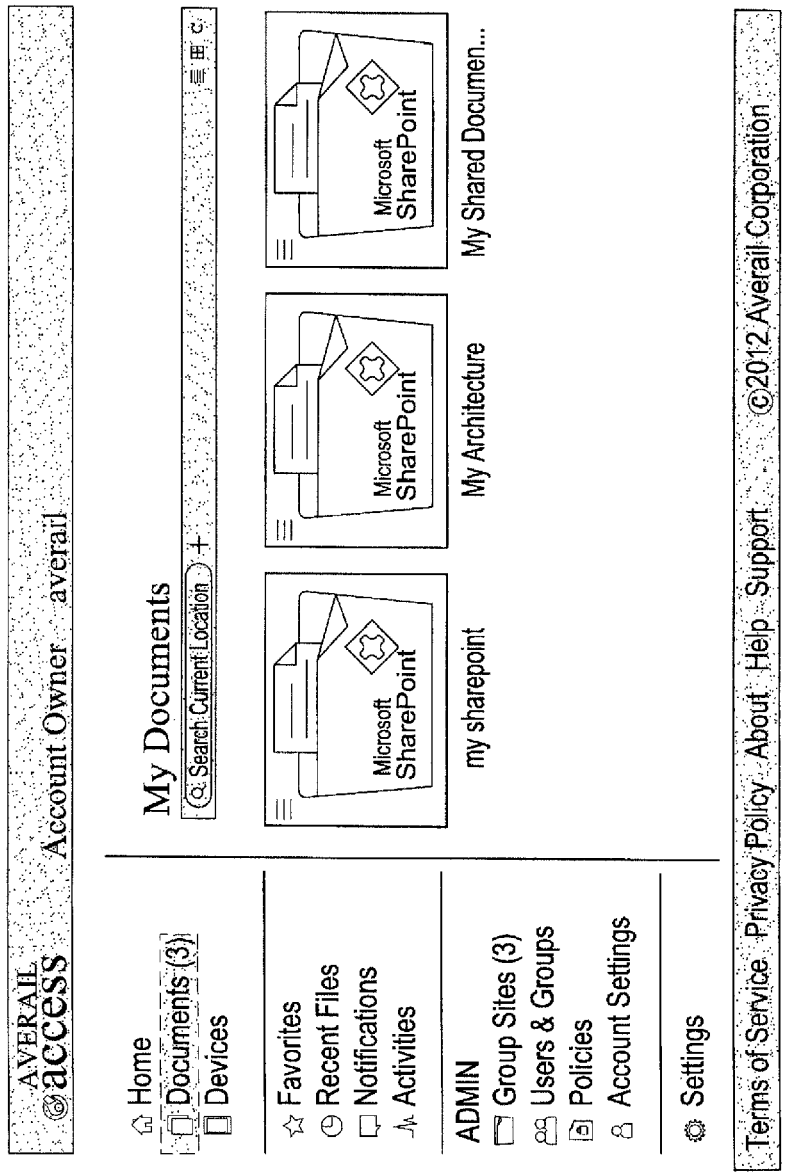
FIG. 11B illustrates the use of the administrative console to define groups/sites, under an embodiment.
Figure 12:
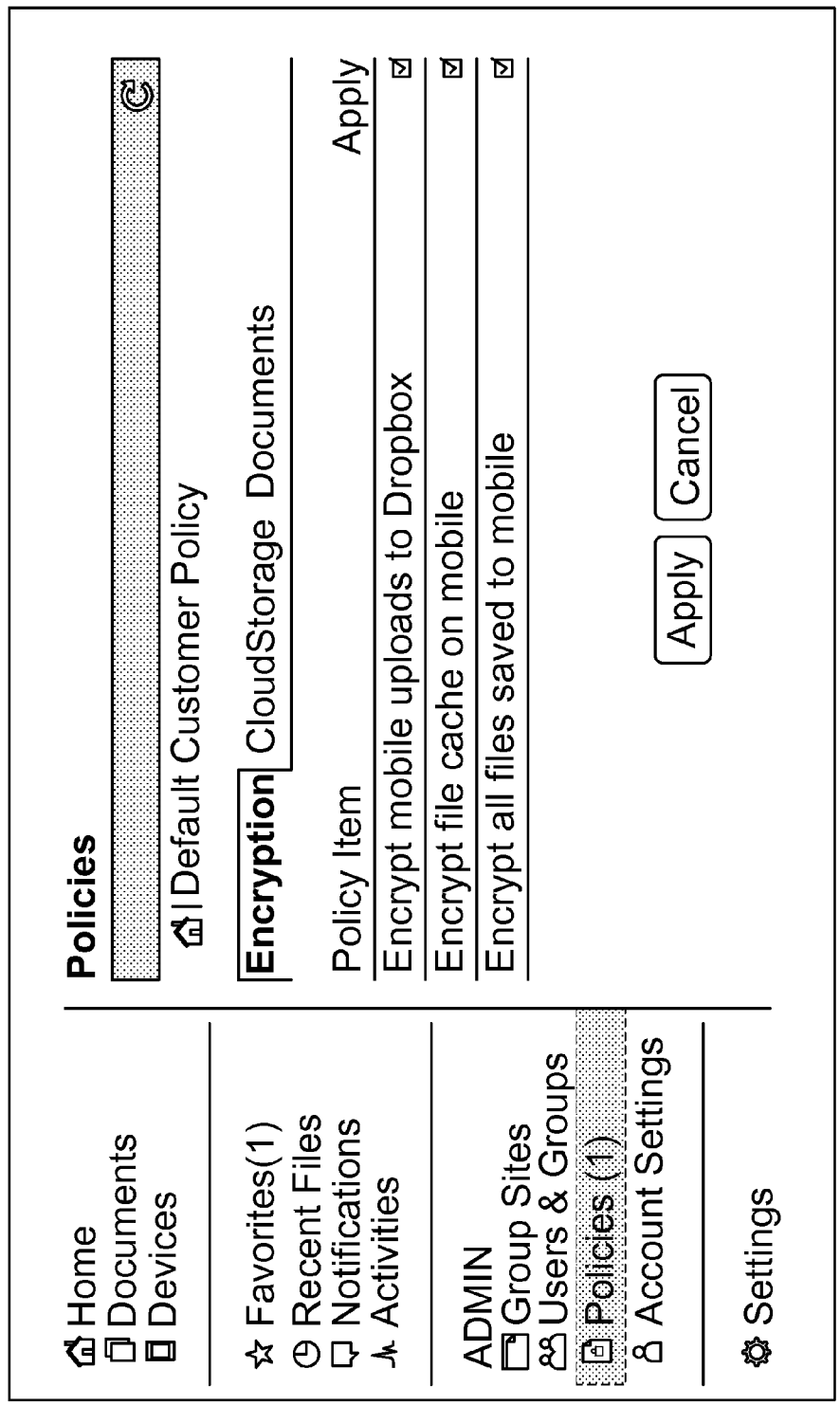
FIG. 12 is an example of a policy management screen of administrative console, under an embodiment.

FIG. 10 is an example of a policy/service management console under an embodiment. The displayed administrative console or portal simultaneously functions as the user Web UX client with similar functionality as Averail mobile application. FIGS. 11A and 11B demonstrates the use of the administrative console or service management portal to define groups/sites, under an embodiment. As seen in FIGS. 11A and 11B, an administrator uses the console to define groups that are then are then published and visible to users on the client side. FIG. 12 is an example of a policy management screen of administrative console, under an embodiment.

The policy management system of the ACXS SVFM system is coupled to policy management console that allows administrators ability to define policy controls that augment existing policies and permissions defined at the level of enterprise storage systems. The Averail CloudXchange service enables service administrator to define a set of permissions and associate/grant those with groups and users. The Averail CloudXchange service also inherits policies from source ECM storage domains and integrates with those defined within the Averail service. For example, inherited permissions from SharePoint include but are not limited to "Full Control"—users can view, add, update, delete, share, approve and customize; "Contribute"—users can view, add, update, delete and download documents; "Read"—users can view pages, list items and download documents; "Limited Access"—users can view specific lists, document libraries, list items, folders and documents when given permissions; "View Only"—users can view pages, list items and documents.

The ACXS SVFM system enables a document-aware policy definition and enforcement system. A 'policy' is a statement or rule that defines one or more permission applied to a user or user group. Under an embodiment, an Averail service administrator uses the policy management console to define security policies that can be applied to overall customer account, groups, users, devices, storage domains and documents in a hierarchical manner. Averail CloudXchange service stores these policies in an underlying secure policy store. The ACXS servers may implement the policy store as a data access object as described above.

In addition, each underlying storage domain has its own specific security policies that are defined, managed and enforced within that specific domain. For example, a SharePoint server with its site collection and sites has a corresponding hierarchy of configuration settings and policies that are enforced by SharePoint itself. The same is the case with SharePoint online on Office365.

Security policies defined at the level of the Averail CloudXchange service are in addition to storage domain specific policies. Given a managed object is owned by its container storage domain, Averail security policies can augment domain policies without being less restrictive than the source security policies for a specific managed object.

Figure 13:
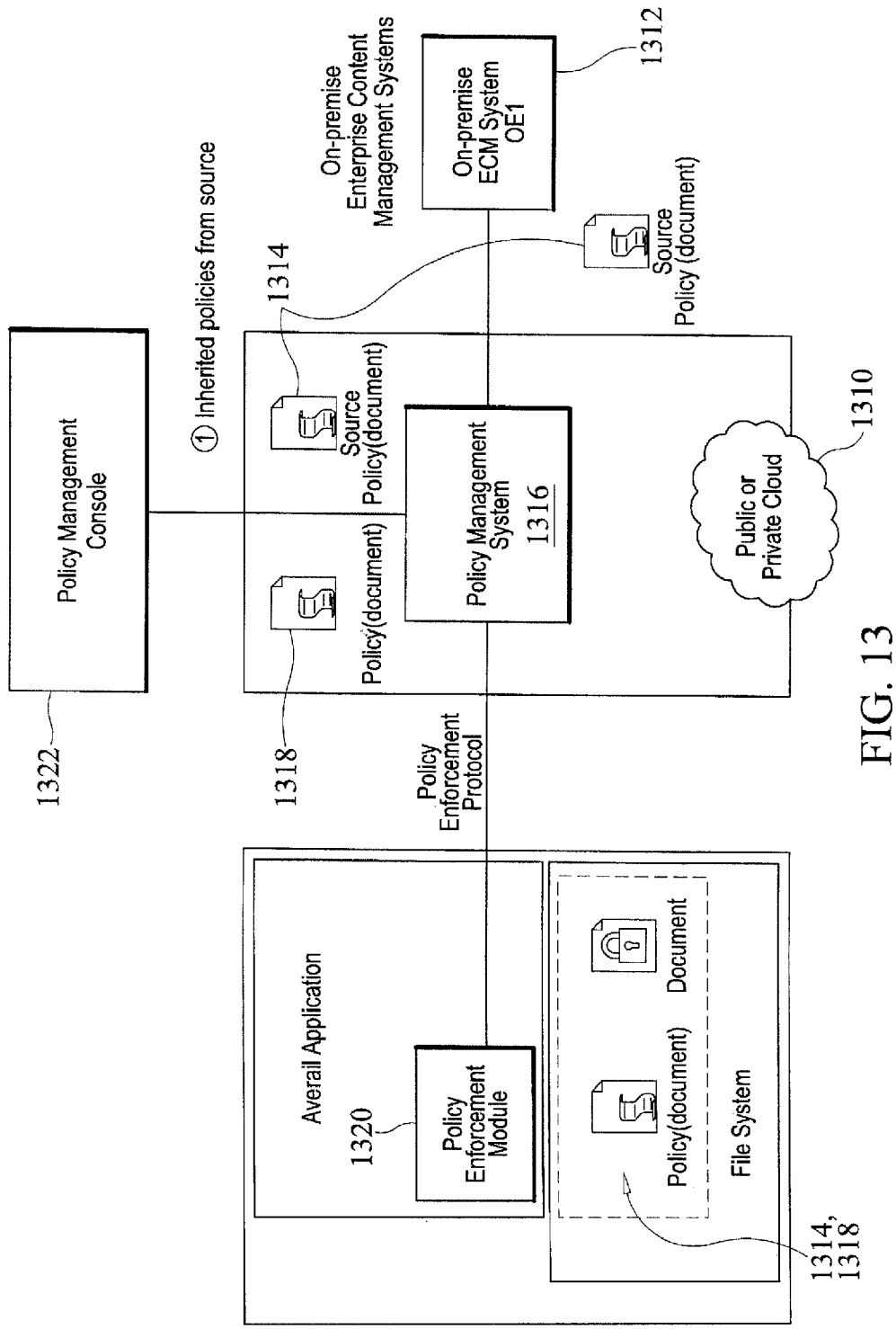
FIG. 13 is an example of a policy management system of the ACXS SVFM system under an embodiment.

FIG. 13 is an example of a policy management system of the ACXS SVFM system under an embodiment. The ACXS cloud based node 1310 is coupled to an on-premise ECM system 1312. The source policy document 1314 contains the policy and permission definitions that exist at the level of the on-premise ECM system. The ACXS includes a policy management system 1316. The policy management system inherits the policies and permissions defined at the enterprise level and stores/maintains these security definitions in a policy store as a source policy document residing on the ACXS cloud. The ACXS is coupled to a policy management console 1322. An Averail service administrator uses the policy management console to define security policies that are applicable to the Averail managed domain. The administratively defined security policies are maintained on the ACXS cloud in a policy store as a policy document 1318. Averail system enables policies and features to be defined and managed at least at the level of Averail service, federated storage domains, sites, folders, documents, users and devices.

As already indicated above, a policy represents a set of persistent rules associated with an information entity (also referred to as a content entity) to govern and control actions on that entity. Policies are associated with policy features (also referred to under alternative embodiments as policy rules, elements or components), actions, policy item values, capability, policy definition entities, and policy managed/enforced entity. Policies are defined by storage domain administrator and/or enterprise/account owner. A policy feature comprises a logical collection of rules and actions that are associated with a policy item. A policy item comprises a policy definition associated with a single policy may include a Boolean value that indicates if the policy is required or not required. Capability includes software or device level features that are needed to support a policy feature. A policy definition entity includes an information/content entity on which policy is defined including one or more of Customer, Device, User, Storage domain, Site and subsite, Folder, Document Library, List, and Document. A policy managed/enforced entity includes an information/content entity on which actions corresponding to policy are applied and enforced including one or more of storage Domain, Site and subsites, Folder, Document Library, List, Document, Device and user/application.

A non-exclusive list of Averail managed policies is set forth below. The list includes policy feature, actions, policy item values, and capability. One skilled in the art understands that many multiple policy definition entities and policy enforced entities may be defined for each of the policies set forth below.

Policy Feature includes Device Local Encryption. Policy requires document or list to be encrypted when stored locally on the device—either on cache or device local storage. This policy is only applicable to software encryption. Policy is enforced prior to downloading of the document locally to the device. If the document cannot be encrypted, then do not download the document. Policy Item Value includes required (if policy item specified). Capability includes software encryption in Averail mobile application with customer-specific crypto keys.

Policy Feature includes Hardware Encryption. Policy requires hardware-level encryption and secure storage for the document or list when stored locally on the device. Policy is enforced prior to downloading of the document locally to the device. If the document cannot be encrypted (example, device doesn't store hardware-level encryption), then do not download the document. Policy Item Value includes required (if policy item specified). Capability includes hardware encryption and secure storage on the device with customer-specific crypto keys.

Policy Feature includes Access to Cloud Storage. Policy determines whether user/device can add and configure cloud storage domains (for example: Dropbox or Box) on the Averail mobile application. Policy Item Value includes allow or disallow with a list of cloud storage domains.

Policy Feature includes Encrypt on Cloud Storage. Policy requires document to be encrypted on the device and then stored in encrypted form on cloud storage (Box, Dropbox). For this policy to be supported, both encryption and decryption of documents must be supported. Policy is enforced prior to uploading of the document to the cloud storage. Policy Item Value includes required (if policy item specified). Capability includes software encryption in Averail application with customer-specific crypto keys.

Policy Feature includes Upload to Cloud Storage. Policy determines whether policy managed document can be uploaded to the cloud storage (Box, Dropbox) for sharing via cloud storage scenarios. Policy is enforced when user chooses the action "Move/Upload to Cloud" for uploading a specific entity to the cloud. User MUST have configured one or more cloud storage domains for this policy to be applied. Policy Item Value includes allow or disallow. Capability includes support for Box/Dropbox integration.

Policy Feature includes Offline Access. Policy determines whether document or list can be tagged for offline access (disconnected mode) and hence stored locally on device. Policy is enforced when user chooses the action "Mark for Offline access". Policy Item Value includes allow or disallow. Capability includes offline device storage supported.

Policy Feature includes Local caching. Policy determines whether document can be stored in local cache after being downloaded on to the device. If local caching is specified as disabled at the device level, then Local caching of document is disabled on Averail application—document gets deleted after application exits out of an active user session and the cache doesn't persist across sessions. Policy is enforced at application lifecycle events (including exiting active user session). Policy Item Value includes allow or disallow. Capability includes local caching mechanism for documents downloaded.

Policy Feature includes Export to other applications. Policy determines whether document can be exported to other applications on the device using a content export protocol (for example, "Open In . . . " protocol on iPhone/iPad). Policy is enforced when user chooses the export action such as "Open In . . . " Policy Item Value includes whitelist of applications. Capability includes support for document export across applications as supported by an operating system of a device.

Policy Feature includes Audit log required. Policy requires audit log to be maintained for every action on the information/content entity and the policy managed/enforced entity by the Averail ACXS service. Policy is enforced on every action performed on the information/content entity and the policy managed/enforced entity. Audit logs can be batched and must work in offline model also. Policy Item Value includes required (if policy item specified). Capability includes integration with Averail ACXS Monitoring and Reporting Service and Auditing service.

Policy Feature includes Sharing via Cloud Storage. Policy specifies mechanisms allowed for sharing on documents via cloud storage. Policy is enforced when user chooses "Share" for sharing the document via cloud storage. Policy Item Value includes mechanisms comprising public share, password protected vault, time-bound uniform resource locator (URL) with access control, encryption required, and Information Rights Management (IRM) protection. Capability includes support for encryption, password protected vault and IRM protection.

Policy Feature includes Viewers. Policy restricts viewers that can be used on the device to view the document. This policy is a refinement on "Export to other applications" policy feature. Policy is enforced when user exports the document for viewing on another application on the device. Policy Item Value includes whitelist of viewers allowed to view the document.

Policy Feature includes Editors. Policy restricts editors that can be used on the device to edit the document. This policy is a refinement on "Export to other applications" policy feature. Policy is enforced when user exports the document for editing on another application on the device. Policy Item Value includes whitelist of editors allowed to edit the document.

Policy Feature includes Document Classification policy. Under this policy, documents can be classified as: public, Confidential and Proprietary, Legal Hold, Records Management. Such policy includes additional rules restricting actions on documents according to document classification. Policy Item Value includes document classification. Capability includes mechanism to map document classification to policy-enforced actions on the device.

Policy Feature includes Document Expiration. This policy if enabled specifies the time limit after which the document expires and is deleted from all Averail managed applications including offline and cached document locations managed by the mobile application and the ACXS service.

Policy Feature includes Network Usage. Policy places restrictions on document download while on cellular connection (specific for cases where there are data usage limits). Restrictions include do not download document above X size while on cellular, do not send audit reports while on cellular, synchronize with Averail ACXS service only on cellular, and do not download/sync when roaming. Policy Item Value includes policy specification with allow/disallow. Capability includes mechanism to detect network connection type: WiFi v/s cellular network.

Policy Feature includes Cache Expiration. Policy requires that local document cache (where documents are downloaded for viewing) expires and is cleaned up after user closes the application session. Policy Item Value includes required (if policy item specified). Capability includes mechanism to clean-up iPad application cache after application session ends.

Policy Feature includes Autodiscovery of storage domains. Policy supports autodiscovery of storage domains for user when the user starts the application session on Averail application. The auto-discovery pre-populates the storage domains for this user as setup by Averail service administrator/user using Averail service administration console. Policy Item Value includes required (if policy item specified). Capability includes Averail application calls ACXS service REST API to get the list of storage domains for a user.

Policy Feature includes Document Size Limitation. Policy limits the size of downloaded document to X number of bytes. Policy Item Value includes size limit expressed in MB. Capability includes checking the document metadata for the size prior to downloading the document locally.

Policy Feature includes Always require SSL. Policy requires that storage domains are always accessed using Hypertext Transfer Protocol Secure (HTTPS). Any non-HTTPS domain is not allowed to be configured and accessed from Averail application. Policy is enforced when storage domains are being added/discovered on the Averail application. Policy Item Value includes required (if policy item specified). Capability includes support for HTTPS for storage domain access from Averail application.

Policy Feature includes Document media types. Policy specifies document media types supported for a specific customer/device/user. If a specific media type (example: Visio document type, MP3, MPEG) is not supported, then Averail application MUST NOT download these. Policy Item Value includes list of media types supported.

Policy Feature includes Cut-Copy-paste. Policy requires that Cut-Copy-Paste actions cannot be performed on a document when being viewed or edited using Averail application. Policy Item Value includes required (if policy item specified). Capability includes mechanism to restrict Cut-Copy-Paste on document viewer/editor embedded within the Averail application.

Policy Feature includes Do not override Group Policy. Policy restricts users from overriding Group Policies setup by Averail service/site administrator. Settings on Averail application cannot change settings that overlap with Group Policies if this policy is set to be required. Policy Item Value includes required (if policy item specified).

Policy Feature includes Averail application level Passcode for Averail mobile application. Policy decision is made on the ACXS side and is communicated to the device as a decision for enforcement. Policy Item Value includes restricted with policy decision detail. Capability includes configuration via MDM mechanism.

Policy Feature includes restriction on access to iCloud from Averail mobile application. Policy decision is made on the ACXS/MDM side and is communicated to the device as a decision for enforcement. Policy Item Value includes restricted with policy decision detail. Capability includes configuration via MDM mechanism.

Policy Feature includes restriction on access to enterprise-storage domain (example: SharePoint) if Dropbox/Box user applications exist on the device. Policy decision is made on the ACXS/MDM side and is communicated to the device as a decision for enforcement. Policy Item Value includes restricted with policy decision detail. Capability includes use of MDM configuration settings to detect if Box/Dropbox installed on the device.

Policy Feature includes VPN-on-demand that controls setup of virtual private network (VPN) policy and settings prior to access to enterprise storage domains. Policy decision is made on the ACXS/MDM side and is communicated to the device as a decision for enforcement. Policy Item Value includes restricted with policy decision detail. Capability includes device configuration for VPN via MDM mechanism.

Policy Feature includes Device Restrictions. Under policy, device can be restricted from access to enterprise storage domains based on one or more of settings including iOS and Build number, Model name and number, Capacity and space available, Current Carrier network, Subscriber carrier network, Data roaming (on/off), Hardware encryption capabilities, passcode present, certificates installed with expiry dates, List of restrictions enforced, Applications installed, Provisioning profiles installed with expiry date, and Web Proxy settings. Policy decision is made on the ACXS/MDM side and is communicated to the device as a decision for enforcement. Policy Item Value includes restricted with policy decision detail. Capability includes configuration of settings detected via MDM mechanism.

Policy Feature includes Policy Compliance. Under policy, Averail application is restricted from access to enterprise storage domains if device doesn't pass the MDM-level policy compliance required by the enterprises. Policy decision is made on the ACXS/MDM side and is communicated to the device as a decision for enforcement. Policy Item Value includes restricted with policy decision detail. Capability includes configuration of settings detected via MDM mechanism.

Policy Feature includes Domain Joined. Under policy, Averail application is restricted from access to enterprise storage domains if device is not domain-joined to enterprise Active Directory infrastructure.

Other policy features and policy actions may include location and time based access restrictions. With cloud based systems and mobile devices, users can access the documents pretty much from anywhere. There could be some places where companies do not want their employees to open the documents for several reasons. One example is, companies do not want their employees to open the documents in places like clubs and bars. In some cases they do not want their employees to open outside their office. Averail policies enable the fine grained control over where employee can access a document. For example admin user can specify that a document can be accessed while user is in office premises only. So, in this case even though a document is downloaded and cached on user's device, user can not access outside the office locations. Averail client application uses the device (phone tablet)'s hardware software GPS capabilities to get the current location and applies the policies. Also, the locations that user opens the document will be tracked on Averail servers. Another example is while users are travelling, then users can set the location policy on particular documents to open in only in the places that user is going to use that document. While attending conferences, user can set the policy to open the document in the conference location. While attending meetings with customers, users can set to open the document in only meeting locations etc. If a device does not have any way to find the current location, then the location protected documents cannot be accessed on those devices. Users can set the policies on a document to let it open only during a particular time. For example a confidential document prepared for presentation at a meeting may have a policy to open the document on the set date only.

The Averail system stores policy definitions on the ACXS. However, Averail system enforces the Averail security policies either at the level of the mobile application or the Averail ACXS service. Under an embodiment, the Averail ACXS service acts as a cloud-based policy definition and decision point (PDP) while on device-side, the Averail application acts as the policy enforcement point (PEP). The Averail system defines and implements an HTTP-based Secure File Control Protocol (SFCP) between the ACXS node (PDP) and device-side Averail mobile application (PEP). With reference to FIG. 13, policy enforcement module 1320 of the Averail application enables the PEP on the device side.

The SFCP supports setup of certificate-based trust between PDP and PEP for policy control mechanisms under an embodiment. The SFCP supports HTTPS based RESTful Create, Read, Update, Delete (CRUD) style access to policy definitions from PEP. Typically, PEP only has READ access to policy definitions. However, a device-side application can also act as both PEP and PDP that communicates with the cloud-based PDP for policy definition and management. The SFCP supports offline and online modes for PEP points to access policy definitions and perform policy enforcements. As seen in FIG. 13 the Averail system provides under an embodiment local storage of policy definitions 1314, 1318 on the device side. With respect to offline-mode, the device-side policy enforcement module uses locally cached policy documents for enforcement. These policy documents are refreshed when device/application comes back online and connects back to ACXS. The SFCP supports synchronization of policy definitions across multiple device-side PEP.

The Averail system may under an embodiment use the policy management system to enable other applications to enforce policies defined on ACXS. Under this embodiment, the Averail system enables a trusted 2nd party application to use SFCP to access policy definitions from Averail Cloud-Xchange PDP. This supports scenarios where other client applications can integrate with Averail CloudXchange service and support fine-grained document level policy control and tracking. In this case, Averail becomes a "headless" service on the device side.

The Averail CloudXchange service enables a secure sharing and document vault functionality. Averail enables users to share documents (managed within Averail storage domains) with a) users/groups within the enterprise identity domain, and b) with users/groups outside the enterprise. The Averail system enables this functionality according to policy and permissions defined for documents and associated storage domains.

Under an embodiment, the Averail system user can associate policies with documents that are being shared. For example, a user may require that documents be private and always require authentication prior to access by other users. A user may create a signed access signature for access to the document. This access signature includes query parameters for time expiration, permissions (read, update, delete) and signed identifier. A user (or administrator) can revoke this signed access signature. A user may create a document vault for sharing with a set of users. Creation/management of the document vault comprises use of a master key based encryption in cooperation with the ACXS as further described below.

The Averail system manages content using awareness of the document metadata, users, policies and permissions. In contrast, mobile device management solutions (MDM) manage the device. Traditional MDM solutions enable IT/enterprises to securely enroll mobile devices in enterprise environment, wirelessly configure device configuration and settings, monitor compliance with enterprise policies and also remotely wipe/restore devices. Under an embodiment, the typical scenario in MDM includes device enrollment (comprising user authentication, certificate enrollment to render a device as MDM managed), device configuration (to configure configuration settings and policies), device query (to get specific configuration and settings from the managed device) and device management (comprising remote wipe, password 10 policies, remote lock, clear passcode).

Traditional MDM solutions today are horizontal device-level management solutions that configure and secure a device with limited application or content awareness. Enterprise applications, content and workflows remain black box relative to these MDM solutions. For example, MDM solutions tend to offer only application block/allow capability. These MDM solutions are not able to restrict a mobile user from exporting documents received by email to Box.net or Dropbox or restrict offline storage of a specific document library or enforce policies discussed above. Hence, MDM solutions leave the onus on IT and MDM administrators to define and enforce policies and configuration settings as applicable to an environment. While MDM solutions provide an essential base level security for mobile devices used in enterprises, these tools do not address the problem of secure and fine-grained access and permissions and audit control within enterprise applications and content management systems. However, the Averail CloudXchange service described herein provides such capabilities.

The Averail system operates under an inheritance model that allows Averail to incorporate or inherit existing security definitions in place at the level of enterprise content management solutions. Under an inheritance model, the Averail policy management system enables integration with existing MDM mechanisms (for example: MobileIron, Zenprise, AirWatch, Good MDM) to add intelligence and fine grained controls used for secure mobile content management, document collaboration/sharing and cloud storage/ECM aggregation. Averail integrates with MDM solutions and verifies proper configuration of underlying device security. On iOS devices, under an embodiment, the CloudXchange service queries the following information:

Device name
iOS and build version
Model name and number
Capacity and space available Network information: current carrier network, phone number Compliance and security information: configuration profiles installed, certificates installed with expiry dates, list of restrictions enforced, hardware encryption capabilities, passcode present Applications installed (app ID, name, version, size, app data size)

Provisioning profiles installed with expiry date

The CloudXchange Service analyzes these queried settings from the enrolled devices. The CloudXchange Service then creates a configuration profile using the queried settings. Configuration profiles are XML files that contain device security policies and restrictions, VPN configuration information, Wi-Fi settings, email and calendar accounts, and authentication credentials that permit iOS device to work with ECM systems. The CloudXchange service performs such dynamic analysis in the context of requirements and policies for secure mobile content management and cloud storage aggregation. In addition, CloudXchange service can configure additional configuration settings and policies (in addition to the MDM settings) on the device via Averail Mobile application. These additional configuration settings include:

Sites and folders pre-configured on the Averail Mobile application for access based on user's identity, groups, permissions and policies. For example, SharePoint site administrator can configure access to user's MySites and TeamSites using the service management console so that user gets these as part of initial experience with Averail application. These sites and folders can also be revoked.

Certificates used to setup trust between Averail mobile application and CloudXchange service.

Certificates and credentials used for access to storage domains being managed by Averail CloudXchange service.

Policies that are enforced on the device side by Averail Mobile application.

Averail CloudXchange service also supports the following functionality through the Averail Mobile application as its device agent:

Grant/deny or revoke access to sites, document libraries and folders

Selective wipe of documents and folders that are part of Averail managed storage domains Backup and restore of documents and folders that are part of Averail managed storage domains and stored on the remote device as per the document retention policies.

The Averail mobile application supports policy based export and import of content. Averail application enables users to view and annotate policy-controlled documents and content. Further export/transfer of these documents to other applications (GoodReader, Pages, Numbers, Keynote etc.) outside Averail managed domain on the device may be policy restricted under an embodiment. For iOS devices, the Averail mobile application uses UIWebView class and PDF class libraries for viewing of most common formats. UIWebView supports the following document types including Excel (.xls), Keynote (.key.zip), Numbers (.numbers.zip), Pages (.pages.zip), PDF (.pdf), Powerpoint (.ppt), and Word (.doc).

Averail mobile application allows public documents or policy-allowed documents to be exported to other document viewers and editors on the device. For example, user can "Open in . . . " a document in an email application from Averail mobile application. Averail application requests policy definitions from the ACXS policy documents (maintained by policy management system) or under an alternative embodiment requests policy definitions from the Averail application's local file system. Averail mobile application under yet another embodiment supports policy-controlled export and import of documents from other third party applications. Averail application provides rich functionality on the client device in cases where confidential documents cannot be opened in other applications. As an example, Averail mobile application provides under an embodiment editing and commenting operations on documents.

Averail service or storage domain administrator may under an embodiment use the policy management system to setup policies that turn on audit logs for managed objects included within Averail managed security domains. A storage domain administrator or enterprise customer may use the policy management console coupled to the policy management system to view/monitor these audit logs/report.

The Averail service provides a wide range of searching capabilities. The system enables searching for documents and associated hierarchy content follows a three level search model as follows. The search levels include device-local search, ACXS search and a federated search across domain repositories. The capabilities of search depend on what metadata/content is available and searchable at each level. A description of device-local, ACXS and federated search follows. Thereafter, a search mechanism that combines these three types of searches is also described.

A device-local search is only applicable to searches conducted by the device application. First, the Averail application performs a local search on the document/content model maintained in the content forest on the device. The scope of this search extends across local device domain, favorites/offline files and content model/cache for domains/sites configured on the application. The search mechanism integrates with the device's document cache management. If a document is found in the document data model or rather the device-local document model, then the application checks if the document is in the local cache or documents folder. If the document is not cached or stored offline, then the Averail application issues a GET request to retrieve the document from the associated domain.

The Averail service provides searching capabilities at the ACXS level. Averail CloudXchange service (ACXS) maintains a metadata module that contains document metadata. Under an embodiment, the ACXS pulls document metadata from the source ECM/storage domains and application metadata synchronized from applications across multiple user devices. As already described above, the Averail service maintains content forest metadata across a federated set of storage domains. The ACXS maintains the content metadata in a cloud based ACXS metadata module.

ACXS exposes a REST search API that returns a list of document metadata for entities based on the following input parameters. The ACXS REST search API may under an embodiment be modeled on SharePoint search API.

Query string: Structured Query Language (SQL) or keyword based

Fields to return in entity metadata: Uniform Resource Identifier (URI) for document access, Content Forest Metadata (CFM) entity id, domain type.

Type of query

Number of entities to return

Type of entities: Lists|Sites|Folders|Documents

Path to search from

The document metadata returned from search REST API ("the $CFM_{acxs}$") returns the metadata fields requested.

Under an embodiment, this metadata is sufficient for Averail application to check permissions and policies prior to retrieving a document directly from a source domain, e.g. SharePoint or Dropbox. In the case of Averail web application, the document is retrieved via the SharePoint connector. For web application client, all calls to SharePoint under an embodiment are made via the SharePoint connector in ACXS.

The Averail system provides a federated search across domain repositories. The ACXS service performs the search on the source domains (SharePoint and Dropbox) using the API exposed by the corresponding domain. For Web UX, ACXS connectors perform these API calls, while for the device application, the API calls are made from connectors in the device application logic. Both SharePoint and Dropbox have search APIs. The particular search call pathways depend on whether the ACXS service uses an inside out proxy system (IO Proxy) to manage communications between ACXS and ECM, e.g. SharePoint. The IO Proxy system is described in detail below and is referenced here simply to enable a description of search call pathways initiating from WebUX (or web based client) versus iPad client (i.e., Averail application running on iPad) under an embodiment. Such pathways include 1. iPad→direct to SharePoint in case there is no IO proxy system in place.
2. WebUX→ACXS/SharePoint connector→SharePoint.
3. iPad/WebUX→ACXS→IO Proxy→SharePoint in the case of inside-out proxy being used.

The decision to use one topology versus another depends under an embodiment on whether SharePoint is reachable via an iPad application or ACXS. In case of public cloud storage locations, (e.g., Dropbox), the paths are:

1. iPad→direct to Dropbox
2. WebUX→ACXS/Dropbox connector→Dropbox

A search can be performed at global level across all domains using the search icon on the application dashboard within the current container context (domain/subsite/document library/folder/Favorites/Recents) by using a search text field displayed at the top of a navigation view controller on an iPad application. Analogous searching interface is provided on Android/Windows applications and through web UX under alternative embodiments. When a user performs/initiates a global search from the iOS device application UX, the application initiates three concurrent searches—1) device local search, 2) ACXS CFM search, and 3) federated search across repositories. The ACXS CFM search and the federated search are conducted through asynchronous non-blocking operations in background. With respect to web UX, the device local search is not applicable. The Web UX performs the ACXS CFM search and federated search across repositories via the ACXS REST APIs. Under one embodiment, the ACXS simply exposes a single search REST API and abstracts $CFM_{acxs}$ and federated search underneath that single REST API.

The search results are limited to a configurable small number (20 as an example) in a single batch. As search results are fetched across these 3 concurrent searches, these are UNION-ed together and shown to the user based on the location (local to device or a source domain) and type of domain (local My Access, SharePoint server or Dropbox). In order to provide the experience of a fast interactive search, results are shown incrementally. The Averail application posts a first set of results retrieved from local search while in parallel a search is being performed on the level of CFM/ACXS and federated repositories. As the results are being fetched, local search results are shown mapped to the associated domains. For example, if a search is looking for "Design", then documents found locally on device (either in My Access, device-local caches for sites/domains or in offline) are shown first.

The Averail system maintains monitoring, compliance and usage insights. Under an embodiment, Averail collects logs, event traces, alerts and usage data on operations and events related to content access and management, policy compliance and other operations performed on Averail managed objects. An administrator can see these logs, reports and insights using the 20 service management console coupled to the ACXS.

Figure 14:
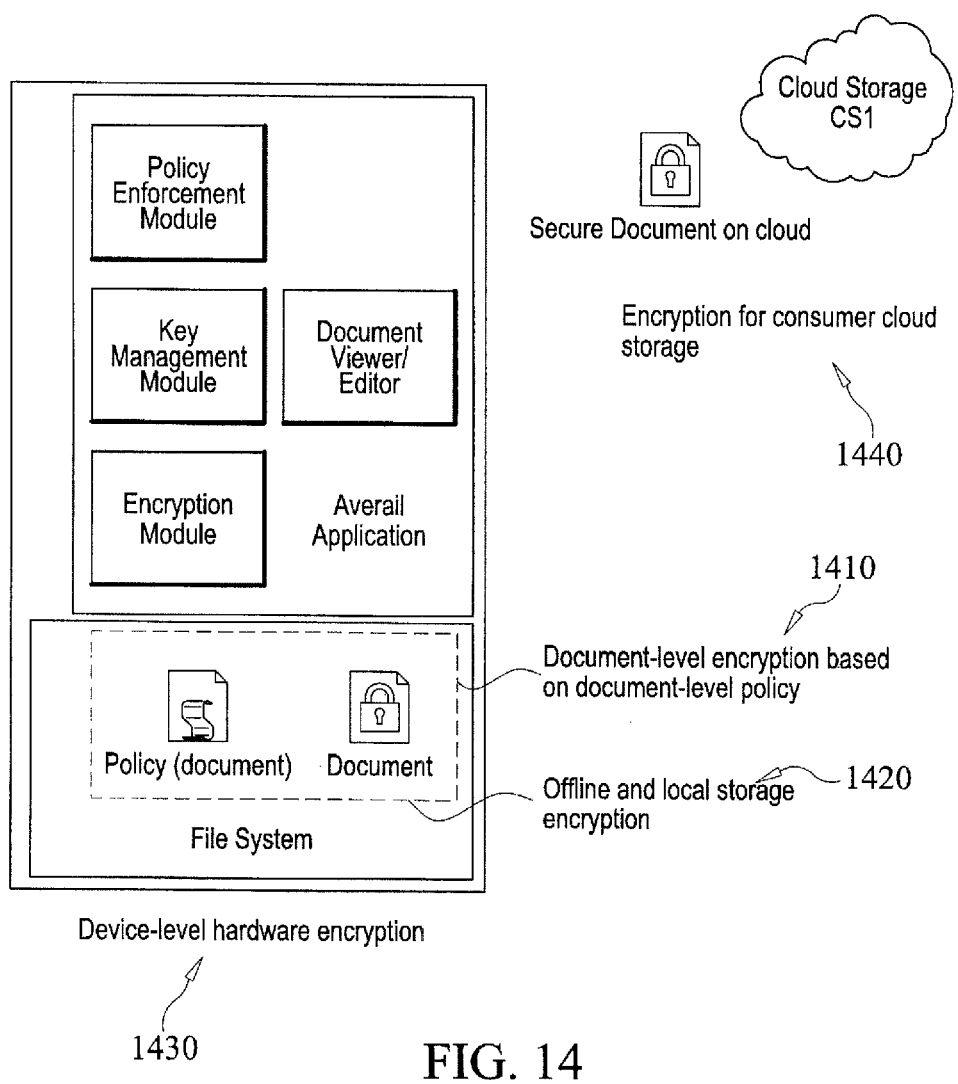
FIG. 14 illustrates the varying levels of encryption applied under the ACXS SVFM system, under an embodiment.

The Averail system applies different levels of encryption according to polices associated with a document. FIG. 14 shows the varying levels of encryption under an embodiment. The Averail system applies document/file level encryption based on document/file level policy 1410. One level of encryption includes hardware encryption 1430 applied to documents on a mobile device. Under an embodiment, all documents stored in a device's temporary cache are encrypted using hardware encryption. Another level of encryption includes local encryption 1420 and may under an embodiment apply to files/documents stored in local folders on a device. Under this embodiment, local encryption comprises generating a symmetric key based on user credentials and using the symmetric key to encrypt locally stored content. With respect to an iOS device, the symmetric key is then stored securely in an iOS key chain system. Averail also applies ACXS managed encryption 1440. This level of encryption places content in a "secure vault" for secure storage in public storage locations using a master key system. The ACXS managed or master key based encryption is described in greater detail below.

The Averail system ensures that enterprise content never sits in the clear in a managed domain. Averail managed documents are encrypted using a per document unique 256 bit AES key which is generated on the client side Averail mobile application where the encryption is being applied. The 256 bit AES symmetric key used to encrypt the document on the client side will be encrypted with an Averail server side master key. The master key encrypted document key and encrypted document are then stored in an envelope under an embodiment. The file including the envelope ends with an .acxs extension. Once this envelope is created, authorized Averail clients can parse this envelope and communicate with the ACXS servers to view the document. Steps to encrypt/decrypt a document from client application are explained below. In order to facilitate an explanation of the encryption/decryption process, key terms of the process are defined.

TERMS $D_{k,symm}$: Symmetric key to encrypt the document. It is a 256 bit AES key.
$UC_{pubKey}$: User Certificate's public key that client application got from ACXS and stored on client side application.
$UC_{prvKey}$: User Certificate's private key stored on ACXS.
$M_{ksymm}$: Symmetric master key to encrypt the document access key $D_{k,symm}$. This resides on ACXS. For example, there could be one or more $M_{ksymm}$ for all customer documents.
( ): Parenthesis to represents encryption action
[ ]: Square brackets to represents decryption action
The sequence of steps to encrypt a document from a client include the following:

1. Client app(phone/tablet/any other device) generates a symmetric key $D_{k,symm}$.
2. Encrypts the document with $D_{ksymm}$ Represented as $D_{ksymm}(Document) \rightarrow E_{doc}$.
3. Encrypt the symmetric key $D_{ksymm}$ with user certificate's public key. i.e. $UC_{pubKey}(D_{ksymm})$ and sends it to ACXS.
4. ACXS decrypts the $UC_{pubKey}(D_{ksymm})$ with $UC_{prvKey}$ to get the $D_{k,symm}$. i.e. $UC_{prvKey}[UC_{pubKey}(D_{ksymm})] D_{k,symm}$
5. ACXS encrypts the $D_{k,symm}$ with $M_{ksymm}$·represented as $M_{ksymm}(D_{k,symm})$.
6. ACXS sends back $M_{ksymm}(D_{k,symm})$ after encrypting it with $UC_{prvKey}$ represented as $UC_{prvKey} \cdot (M_{ksymm}(D_{k,symm}))$.
7. Client app receives $UC_{prvKey} \cdot (M_{ksymm}(D_{k,symm}))$ and decrypts it with UCpubKey to get the master key encrypted document symmetric key. Represented as $UC_{pubKey}[UC_{prvKey} \cdot (M_{ksymm}(D_{k,symm}))] \rightarrow M_{ksymm}(D_{k,symm})$. Client stores the $M_{ksymm}(D_{k,symm})$ along with the document on the device/storage server.

The sequence of steps to decrypt a document from a client include the following.
1. Client app encrypts the $M_{ksymm}(D_{k,symm})$ with $UC_{pubKey}$ and sends it to ACXS. Represented as $UC_{pubKey}(M_{ksymm}(D_{k,symm}))$.
2. ACXS decrypts the $UC_{pubKey}(M_{ksymm}(D_{k,symm}))$ with $UC_{prvKey}$ to get $M_{ksymm}(D_{k,symm})$. Represented as $UC_{prvKey}[UC_{pubKey}(M_{ksymm}(D_{k,symm}))] \rightarrow (M_{ksymm}(D_{k,symm}))$.
3. ACXS checks the metadata to see if user requesting this has access to the document. (Either user is owner or has access).
4. Once ACXS has $(M_{ksymm}(D_{k,symm}))$, it decrypts it with $M_{ksymm}$ to get $D_{k,symm}$ Represented as $M_{ksymm}[M_{ksymm}(D_{k,symm})] \rightarrow D_{k,symm}$.
5. ACXS encrypts the $D_{k,symm}$ user certificate's private key and sends it to client. Represented as $UC_{prvKey}(D_{k,symm})$.
6. Client receives $UC_{prvKey}(D_{k,symm})$ and decrypts it with user certificate's public key. Represented as $UC_{pubKey}[UC_{prvKey}(D_{k,symm})] \rightarrow D_{k,symm}$
7. Client decrypts the encrypted document with $D_{k,symm}$. Represented as $D_{k,symm} D_{k,symm}(Edoc) \rightarrow$ Decrypted Document.

Figure 15:
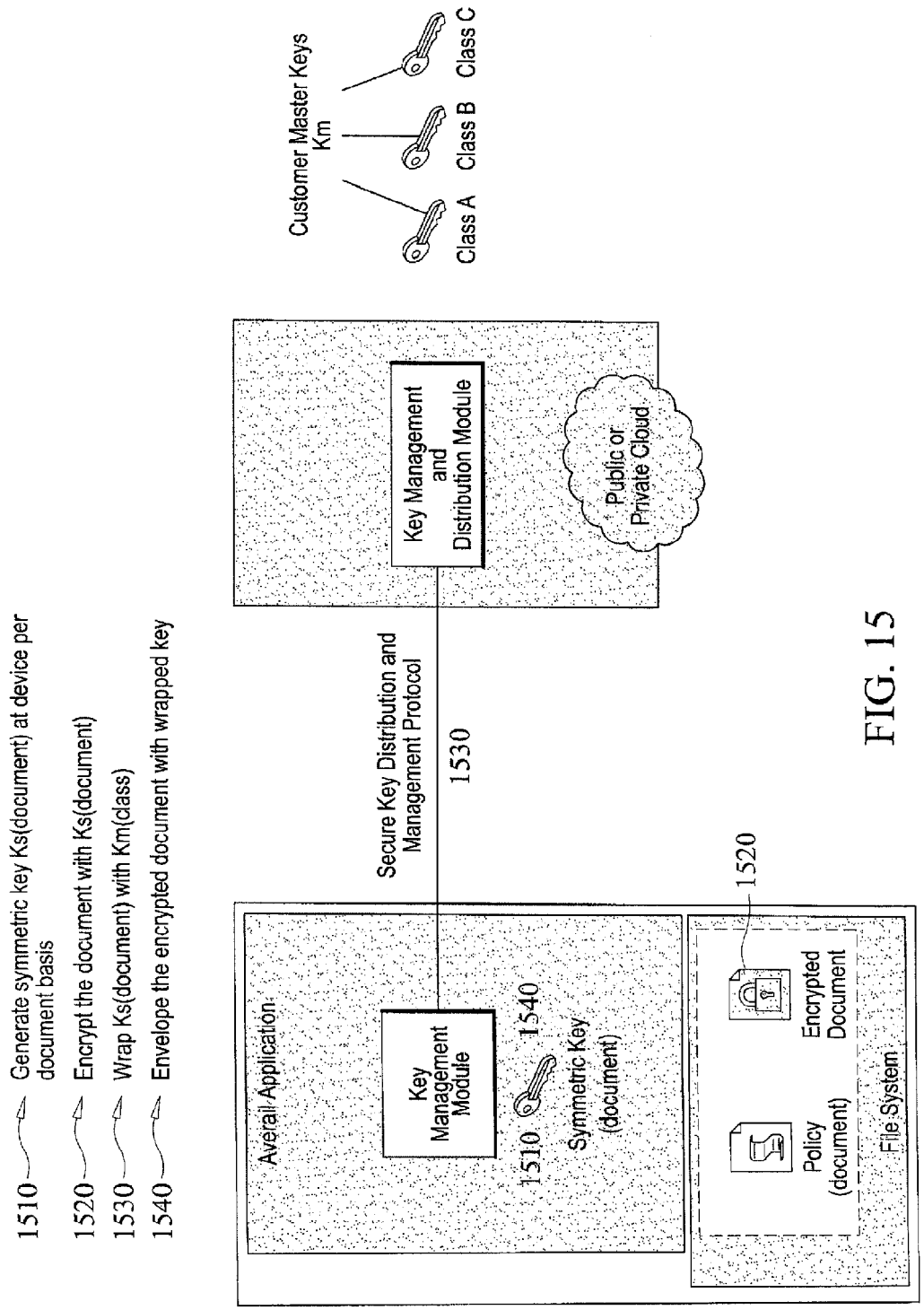
FIG. 15 is an example of Averail document encryption, under an embodiment.

FIG. 15 is an example of Averail document encryption under an embodiment.

Under the first step 1510, the Averail application generates a symmetric key on the device side for a document. As the second step 1520, the Averail application then encrypts/stores a document on the client side using the symmetric key. Under step three 1530, the key management module of the Averail application sends the symmetric key to the key management and distribution module maintained on the ACXS service using a secure key distribution and management protocol. The ACXS then encrypts the symmetric key with a master key, and the key management and distribution module returns the wrapped symmetric key back to the key management model using a secure key distribution and management protocol. As the fourth step 1540, the Averail application stores the wrapped symmetric key (i.e., the master key encrypted symmetric key) along with the symmetric key encrypted document in an Averail encryption .acxs envelope.

The Averail encryption system uses an acxs file (envelope) format under an embodiment. The Averail encrypted file comprises a multi-layer encrypted document key, other key information including length of key and meta data to identify the class of the master key used to decrypt, and the encrypted document itself. Once this envelope is created, authorized Averail client application understands this format and "opens" this envelope to display the file.

The Averail ACXS server maintains several classes of master keys. Master keys never go out of servers. Master keys are used to encrypt the per document key. Based on the class of document (confidential, Proprietary etc), policies around encryption, based on the storage domain and based on the client application master key will be used to encrypt document keys. This gives the flexibility in managing the master keys. To enable disable access to a particular cloud storage, user group, device group etc, a particular class of master key on the server side may be disabled.

Figure 16:
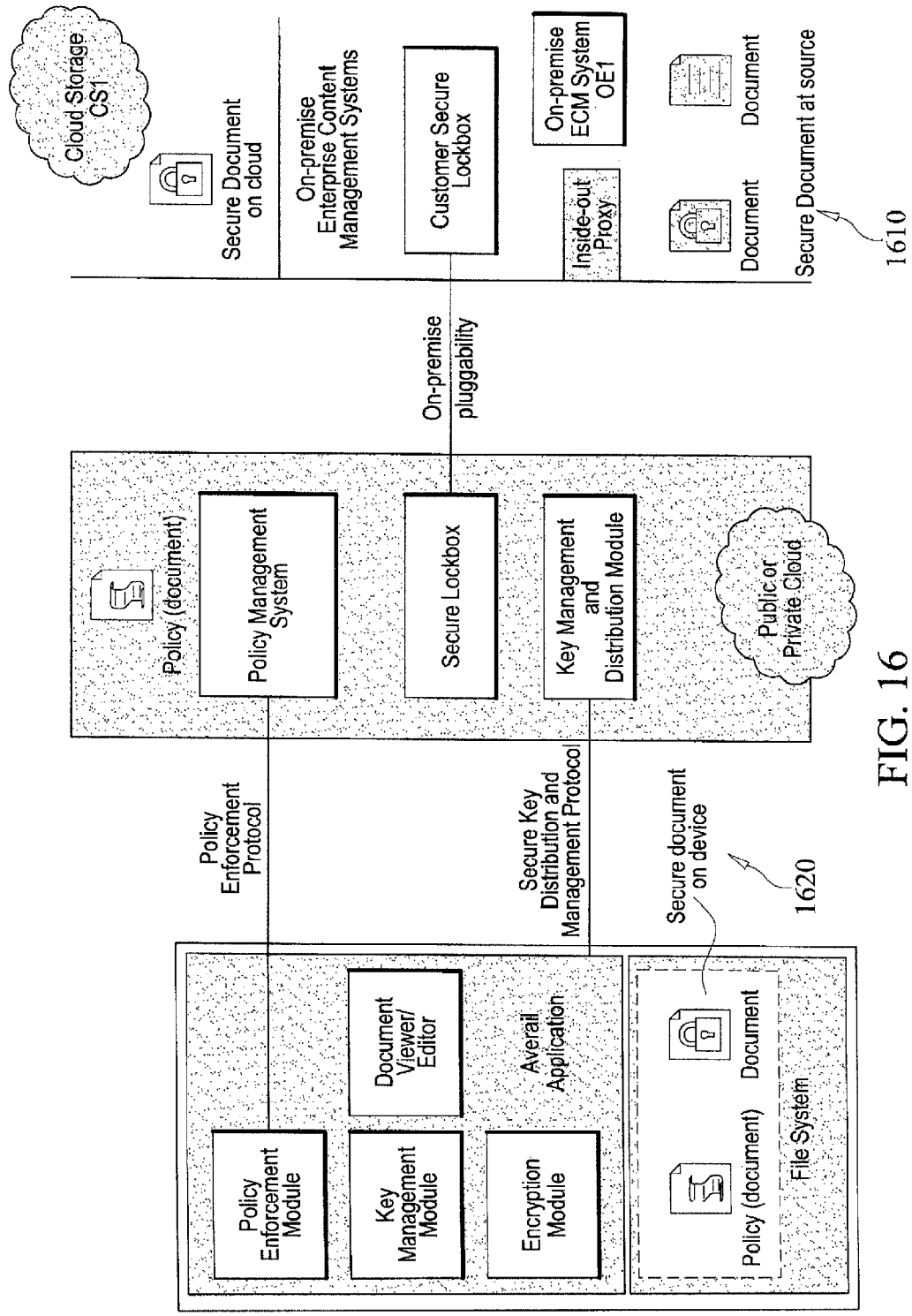
FIG. 16 shows the secure lockbox maintained on the ACXS, under an embodiment.

The Averail may adopt varying approaches to key management. Under one embodiment, the Averail system stores master key classes in a secure ACXS lockbox component. Under an embodiment, the secure lockbox component encrypts/decrypts symmetric keys using the master keys. Under this system, the enterprise customer creates master key classes and may revoke them. The Averail service manages the master keys on behalf of the customer. However, an enterprise customer may wish that master keys are never stored on the cloud. Rather the customer may wish to maintain all master keys on-premise or on public cloud using a Hardware Security Module (HSM). Under an embodiment, the Averail service may implement an on-premise pluggability module that allows secure lockbox to encrypt and decrypt symmetric keys using master keys from on premise or public cloud HSM. FIG. 16 shows the secure lockbox maintained on the ACXS under an embodiment. FIG. 16 shows the secure lockbox coupled to the customer secure HSM-based lockbox. FIG. 16 shows the secure document at the source 1610 and the secure document on the device 1620.

The Averail system may use its encryption methods to block misbehaving applications, users or devices from accessing documents. According to policy and permission, a user may under an embodiment move documents from one application to other applications on a mobile device. Accordingly, documents can reside with multiple applications. But at some point, if an application is misbehaving, then the application will not be able to decrypt the documents or access the documents any more. These applications will be blocked from server side by disabling the corresponding class of master key on server side and application identification key. Once an application is marked as misbehaving on server side, it will no longer be able to decrypt any of the documents that are stored locally with the application. All the calls to server to decrypt the document keys would fail.

The Averail system encrypts documents as they move across federated domains. The Averail clients & ACXS servers apply appropriate encryption to documents automatically based on the source and destination properties, and policies that are in place for that user and target device. The Averail system maintains document encryption during the following content transfers:

Upload document from client application on mobile device to cloud storage: Averail client automatically decrypts the encryption applied on client side and applies the encryption that is required for that particular cloud storage, e.g. master key encryption.

Move document from one cloud storage to another cloud storage: The client application that's interacting with source cloud storage and destination cloud storage automatically applies appropriate decryption based on the source storage domain policies and applies appropriate encryption based on destination storage domain policies. Policy definitions are defined at different levels (Customer, User, device, storage domain, document) and affect the kind of encryption be applied to a document in a particular scenario.

Move from cloud storage to local disk: Based on the policy definitions, the appropriate encryption (e.g., local symmetric key based) will be applied to files stored locally.

Move from one application to other application on a device: Each application communicates with the ACXS servers to obtain required keys in order to encrypt/decrypt according to policy definitions.

Averail client on a mobile device provides a secure document container—which is a secure encrypted common file system (backed by Averail ACXS service for policy management and crypto functions) for others applications to use. This secure document container on a mobile device enables secure access to documents from other applications through secure document/file exchange protocol using the Averail secure access client library. This enables other applications on a mobile device to use the secure document container provided by the Averail client. Averail secure document container keeps the documents encrypted, enforces passcode-based authentication and authorization for document access, and enforces policies thereby ensuring that any access to these documents is secure whether from Averail mobile application or other applications. Under an embodiment the Averail application maintains the client side library for the secure document container. Averail client side library enables the client to communicate with Averail cloud system to perform various activities. Client side library is typically embedded into the application that needs to interact with ACXS cloud based system to secure files. Under one embodiment, an application embeds the library by using a protocol to communicate with the client library of the Averail application. Each application will need to be authorized to access the cloud system. Client applications makes calls on the cloud based system to protect/encrypt the files, view/decrypt the protected files, view and enforce the policies etc. This client library will be available for multiple supported operating systems including Android, iOS, and windows mobile thereby exposing the client side library to multiple devices and corresponding software platforms.

Figure 17:
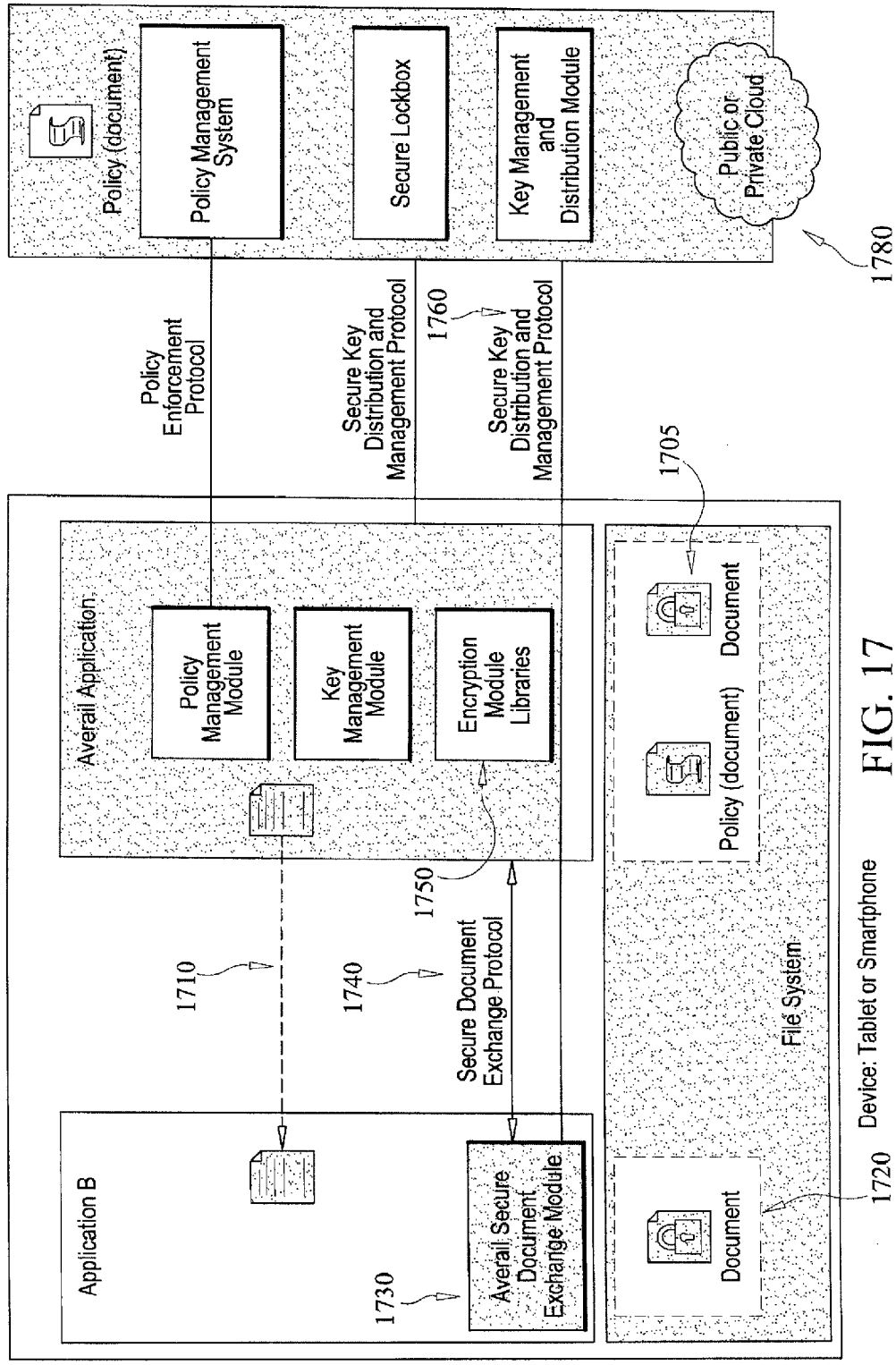
FIG. 17 shows secure transfer of content to third party application, under an embodiment.

FIG. 17 shows the secure transfer of content to another application under an embodiment. As seen in the figure, the Averail application transfers 1710 a document 1705 from the Averail application to application B. The encrypted document now resides in the sandboxed file system of application B 1720. When application B wishes to view/access the document, application B must communicate with the ACXS servers to obtain the necessary key to decrypt the document. As seen in FIG. 17, application B comprises an Averail Secure Document/File Exchange Module 1730 which embeds the Averail secure access client library by using a secure document/file exchange protocol 1740 to access/communicate with the library 1750. The Secure Document/File Exchange Module communicates with the ACXS servers 1780 using a Secure Key Distribution and Management Protocol 1760 to retrieve decrypted symmetric keys required to decrypt the document.

Once a document is encrypted with Averail encryption, then the document can be opened with Averail application or trusted third party application on any device. Averail encrypted documents (.acxs files) are accessible to third party applications under the following examples but embodiments are not so limited.

Averail Client application: Averail client application uses the client side library to interface with Averail ACXS service to encrypt decrypt documents.

Trusted third party client applications: Trusted client applications on the devices may integrate Averail secure access library. This library provides an interface with the ACXS service to enable Averail encrypt decrypt operations using the trusted applications. This secure access library understands the .acxs files format and communicates securely with Averail ACXS service to get documents decrypted. Also, this secure access library ensures that the copy of the decrypted file is not stored with the client application.

Untrusted client applications: Untrusted client applications receiving .acxs files can not open themselves. They need to export the document to Averail application or trusted third party client application.

The Averail mobile application provides offline access of protected documents under an embodiment. On an authorized client, if the policy defined for a particular file allows it to be offline, then client application can make appropriate calls on client side library to get the offline access. When offline access is requested, the Averail cloud system generates special keys which are active for a predefined amount of time. These special keys will be securely placed on hardware security element, operating system provided key chain. The secure access client library enforces the offline policy for those files over an amount of time allowed to be offline (number of days). Once the device comes online, the client library gets the latest policy and meta data information from ACXS cloud system including updates regarding locally valid keys distributed by ACXS for local storage.

Figure 18:
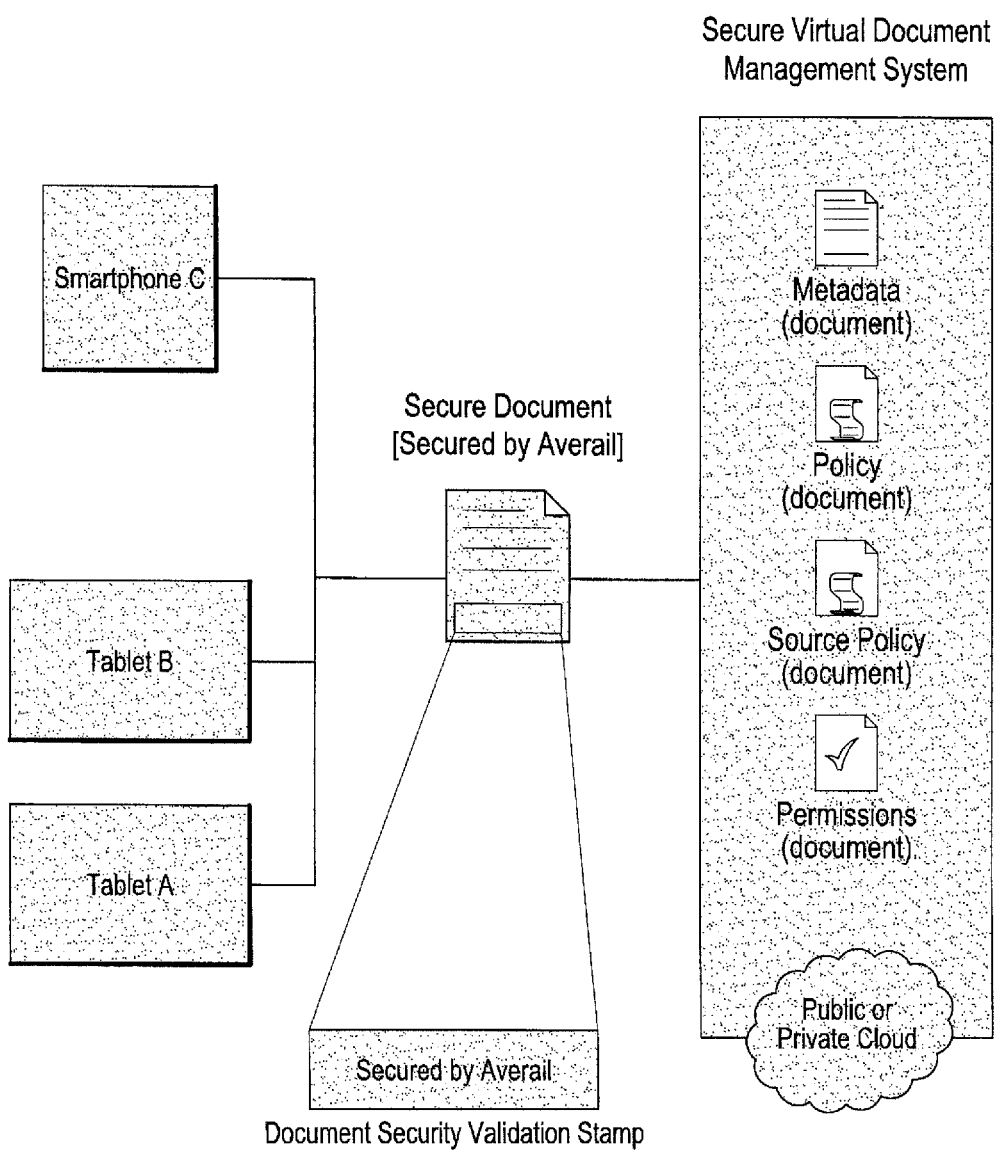
FIG. 18 shows delivery of secured documents to client applications using a document security validation stamp or a trusted document icon, under an embodiment.

When authorized client applications access the ACXS cloud system to view protected documents, all the operations required will be seamless to user. Meaning, under the hood client applications manage all the required operations through client side library to decrypt the document and show to user. To show the document is trusted and coming from an identified source (in this case, trusted and protected by Averail service), a document stamp (a graphic icon) will be shown visually on the client application. FIG. 18 shows delivery of secured documents to client applications using a document security validation stamp or a trusted document icon. Application users may obtain the source and other information about the document by interacting with the trusted document icon. This trusted document graphic will be similar to a trusted Certification Authority graphic symbol displayed on web sites.

The trusted document icon parallels the notion of secure browsing. When documents are downloaded and viewed from common browser applications, browsers do not have any restrictions on accessing the documents, maintaining cache and restricting other applications from accessing downloaded documents. Once the document is downloaded, any application understands the format can open the application. There is no way to track how many copies of a document are lying around with applications.

Averail client application provides notion of secure browsing by providing following features:

The documents that are downloaded are encrypted locally based on the policy.

Only Averail trusted $2^{nd}/3^{rd}$ applications can access the downloaded files.

Averail application keeps the temporarily cached files also as encrypted files based on the policy.

Since only trusted applications can access the document, Averail can track the document.

Downloaded and cached documents expire after policy allowed time while user is offline. User need to renew the authentication token to view the documents.

Also, the Averail client application controls policy permitted/restricted actions that may be taken on documents like cut/copy/paste, print, email and save offline.

Under an embodiment, an Averail protected file (including files carrying an .acxs extension for example) can always be traced back to the source irrespective of which application opens the file, which user opens the file and which device is used to open the file. The ACXS SVFM intelligently combines several activities of the Averail application. Such activities of the Averail application include calls to the client library under an embodiment.

As one example, assume that a first user downloads a file from a first storage domain (for example, SharePoint) to an iPad device and shares the file with a second user who then opens the file on the second user's phone and transfers the document from the Averail application to a second application (for example by using Open-in to open the file in the second application). Now the second user shares the file with a third user from the second application. The third user uploads the document to a second storage domain (for example, DropBox). A fourth user then downloads the document from the second storage domain and opens the file in a third application.

In the above example one observes that the outlined transactions/transfers/actions include multiple storage domains, multiple users, and multiple applications and devices. At the end of all the transactions/transfers/actions described in the above example, the fourth user may obtain information about where the document came from and the path the document travelled. The fourth user may obtain this information by interacting with a trusted document icon associated with the file and may therefore see the entire path along with corresponding transactions/transfers/actions. Under an alternative embodiment, the trusted document icon may visually encode information of the path and the associated transactions/transfers/actions using any combination of colors, shapes, icons, graphics, fonts, design and presentation formats to encode such information into the trusted document icon. It should be noted that under the example provided above regarding the transactions/transfers/actions of a file, the ACXS SVFM traces the document path and associated activity even when the file moves physically from one application to another application.

Under alternative embodiments, the ACXS SVFM traces files under its management as the file moves from one user to other user, one application to other applications and one device to other devices. The ACXS SVFM intelligently combines the activities of users, the Averail application and calls to the client side library to track activities associated with a file thereby enabling a trace of the file and activities associated with the file back to a source. Under this embodiment, the document always moves as URI which is constructed and tracked by the ACXS SVFM, the Averail application and client side libraries.

An embodiment of a SVFM system is described herein. A SVFM system is secure cloud-based virtual file management system for mobile OS platforms that federates multiple physical file systems, content management systems and storage repositories. Under an embodiment, the goal of SVFM system is to virtualize heterogeneous file and storage systems and expose a secure federated file system to mobile users and applications. A SVFM system exposes a virtual file system to smartphone and tablet applications such that these applications can access files from underlying federated systems in a secure manner.

The SVFM system is based on the following mechanisms and security controls:

The SVFM system maintains a pluggable mechanism for interfacing with various physical file systems, content management systems and storage repositories irrespective of whether such repositories are cloud based or on-premise systems. The SVFM system uses public interfaces (REST, SOAP or proprietary API) or protocols (WebDAV, CIFS, NFS) to access these underlying federated systems. The SVFM system layers on top of one or more such federated file systems. The SVFM system interfaces with the federated domains to collect metadata of the content stored across the federated domains and to collect information of file system access primitives of the federated domains. The SVFM system maps file system access primitives to corresponding content residing in the underlying storage domains. The virtual file management system maintains information of the access primitives for accessing content residing on the underlying physical file systems and organizes such information together with collected metadata of the federated physical file systems to create a virtual file system for the underlying federated/managed content.

Unlike other physical file systems that store files on underlying file storage (typically tightly coupled with the file system and/or specific OS), the SVFM system is a virtual file system that overlays a security control plane on top of multiple underlying physical file systems and storage repositories. The SVFM system doesn't store any file content at rest. The SVFM system only integrates with underlying federated systems at a control plane level by extracting file metadata (example: name of document, creation date, owner etc.) and associated policies and permissions. The SVFM system stores this metadata, policies and permissions and uses these to provide security around file access and operations while letting the file contents remain on the corresponding source/originating file system. The SVFM system ensures that all this user/device/policy/permissions/file metadata is protected at rest on SVFM system cloud service.

The SVFM system is distributed across two parts including a cloud and mobile-side. The SVFM cloud service (or ACXS) can be deployed on public or private cloud. SVFM cloud service a) integrates with multiple file systems, b) acts as a policy definition and decision point for secure file access from mobile devices, and c) models users, devices, policies and content meta-model of underlying file systems.

The SVFM system separates control plane from the data plane for secure access to files (from a mobile device) from the underlying federated file systems. The SVFM system only comes in to play during authentication, authorization, policy and permissions enforcements on file operations. The access to file content happens transparent to the SVFM system either direct to the underlying physical file system or on a secure overlay data plane on the SVFM system.

Each action primitive on the virtualized file system is access, policy and permission controlled by the SVFM system. Under an embodiment, the SVFM system inherits policies and permissions associated with each file (as known to SVFM system) from its source/origin file system across the federated physical file systems. Next, the SVFM system augments these policies by defining and enforcing additional policies that are mobile device and user-aware. Under an embodiment, these policies control whether files are encrypted on mobile devices, whether these can be shared across applications, what actions (Create, Read, Update, Delete, Copy, Move) can be performed on a file and by whom, whether files can be shared across mobile applications or copied/moved across the federated physical file systems.

Most mobile OS platforms offer a sandbox view of file systems to applications. Each application receives its own part of file system visible to that application only. Applications exchange files by copying files from one application's sandbox to another. Another option is for an application to copy/move a file to some cloud storage and for other applications to then access that file via the same cloud storage location. SVFM system changes this by offering a common facility of secure virtual file system to mobile applications and services on the OS platform and device. This is done via a lightweight SVFM library that is linked with each application (including the Averail application), thereby enabling such application running on a mobile device to hook into SVFM services for virtualized file system management and policy controlled access to files. Each such application (including the Averail application) makes calls upon or communicates with the library to access the virtual file system and communicate with the ACXS.

On mobile device OS, each application has its own sandboxed file system. Under this configuration, the device OS fails to provide a common file system to all of the hosted applications. Accordingly, mobile device OS limits/restricts an application's visibility to its own sandboxed file system. Document transfers across applications running on mobile device occur through platform defined document/file exchange protocols. Under an embodiment, an application moves a document by transferring the document to a common area where the document is then further moved to a target location.

The SVFM system creates a virtualized view of content across multiple storage domains and exposes the virtual file system to third party applications running on a mobile device. Third party applications may then access the managed content (of the federated domains) and associated operations exposed by the SVFM system. As one example, assume that an editor application runs on a mobile device alongside the Averail application. The editor application sees into its sandboxed portion of the device memory. However, the editor application has no capability to reach content stored on shared storage of an enterprise behind a firewall, e.g. SharePoint. The editor application may integrate or make calls to a lightweight SVFM library in order to access the virtual file system and its functionality. In other words, the editor application may use the exposed SVFM system to obtain a single view into the federated storage domains of the virtual file system. The editor application may then perform create, read, update, and delete operations on the federated content using the virtual file system exposed by the SVFM system.

Under an embodiment, once the editor application integrates the SVFM library, the editor application may use the virtual file system to access content residing on SharePoint. The editor application's access to such content is policy and permission controlled.

Figure 19:
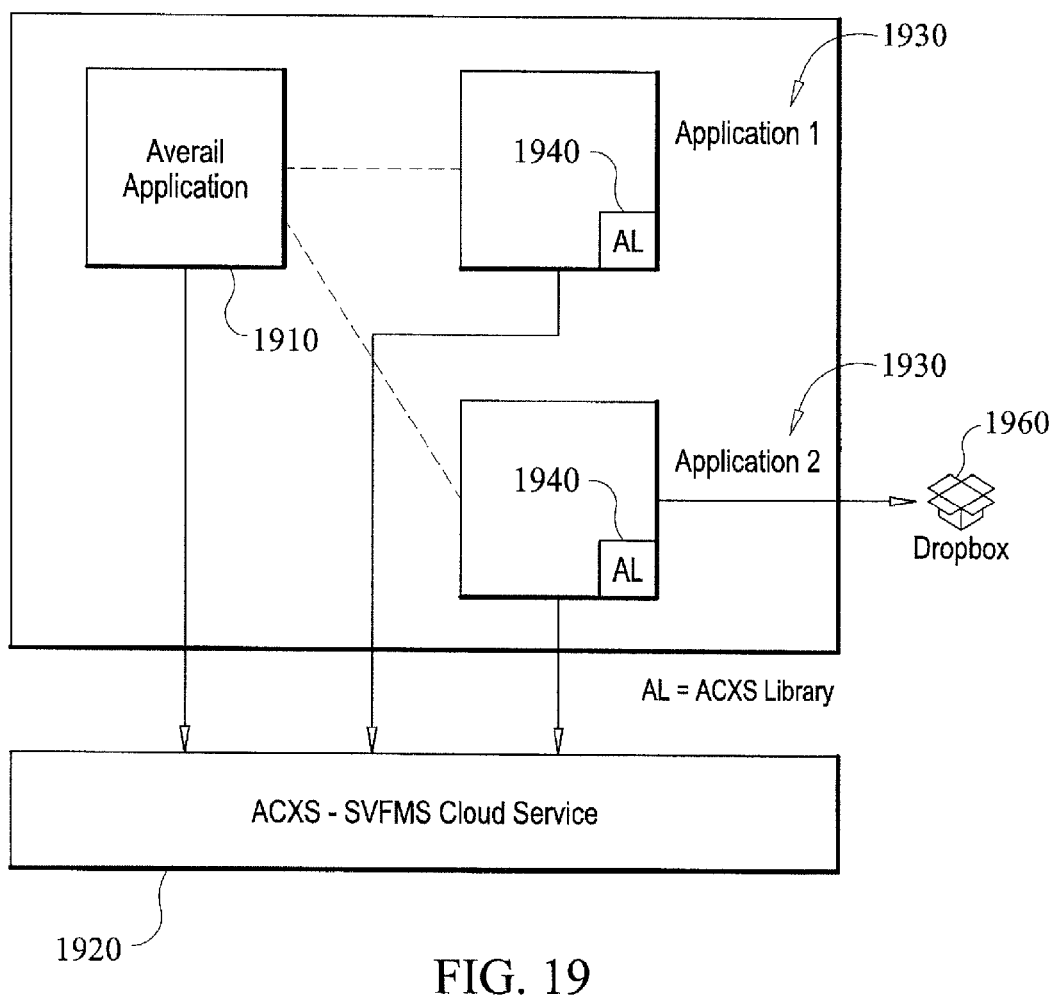
FIG. 19 is an example of third party applications using the Averail client library, under an embodiment.
Figure 20:
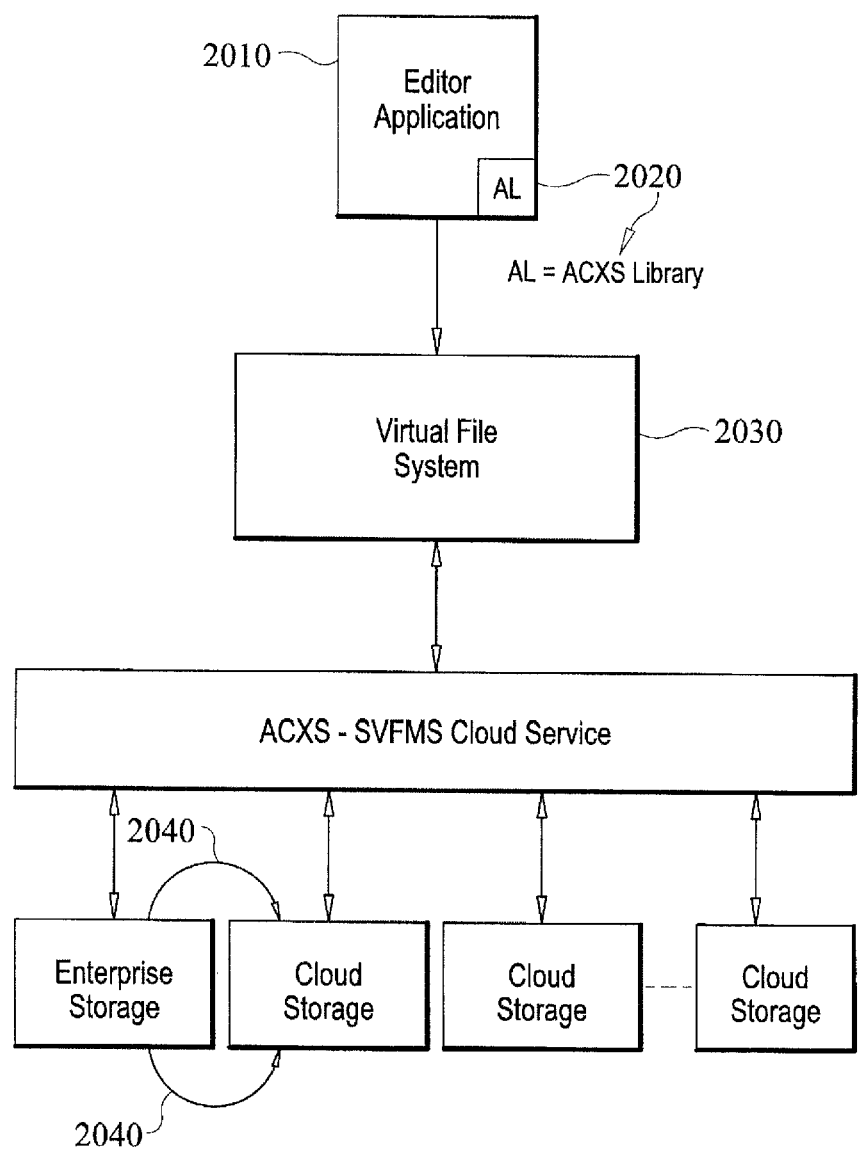
FIG. 20 is an example of an editor application using the Averail client library, under an embodiment.

As seen in FIG. 19, the Averail application 1910 is coupled to the ACXS service 1920. Application 1 and Application 2 1930 integrate with Averail application by integrating the ACXS or the SVFM Library (AL) 1940. Application 1 and Application 2 may then interact with the ACXS service 1920 to access content managed by the ACXS service. As seen in FIG. 19, Application 2 uses the ACXS library to access content on DropBox 1960 using the policy controlled virtual file system exposed by the Averail application. As seen in FIG. 20, an editor application 2010 may integrate the SVFM library 2020 thereby gaining visibility into the SVFM 2030 and access to its functionality. The editor application may then move content 2040 from an enterprise content management domain to a cloud storage domain according to applicable policies and permissions.

The mobile side of SVFM system is implemented specific to each mobile/tablet OS platform—for example, SVFM system for iOS, for Android and for Windows 8/Phone platforms. The SVFM service acts a secure virtual file system that a) functions as a policy enforcement point for policies defined on SVFM cloud services, b) provides multi-layer encryption of files as per policies, c) provides interfaces for other applications to access files exposed by the SVFM system.

On mobile side, SVFM service maintains virtual file system access primitives and exposes primitive operations for access to files from other applications and users. These primitive operations include—create, read, update, delete, rename, list, move, copy, get metadata, view, edit, annotate, copy/move across physical file systems, open in specific applications for editing/viewing. SVFM system also introduces policy controlled actions around copy/move of files across different file systems. For example, whether a file can be moved from an on-premise physical file system to cloud file system is controlled by SVFM policies. Each of these operations are policy controlled by SVFM cloud service with SVFM mobile service acting as a policy enforcement point.

SVFM system manages a secure file cache and offline storage for files on the mobile device. The file cache has cache expiration and file encryption policies defined on SVFM system cloud service and enforced on SVFM mobile service. The controls on whether a file can be stored offline and for how long (as in offline document expiration), and encrypted are also controlled by SVFM system. The size and scavenging of file cache and offline store is also controlled by SVFM system.

SVFM services also controls leakage of files from the mobile devices. Each action on a file around copy/move or sharing across users/applications/devices and file systems can be controlled by SVFM policies. For example, SVFM system can block sharing or copy/move to cloud storage for a secure confidential document that is accessed on a mobile device from on-premise document management system.

The SVFM service controls and manages multiple layer encryption on the mobile device. It can enable device-level encryption for all tiles stored/cached on mobile device, encrypt files in cache, encrypt files stored offline in device-local file system and also encrypt files that are copied to other applications or physical file systems intermediated by SVFM control plane.

A SVFM system uses a Secure File Control Protocol (SFCP) between its mobile service (acting as policy enforcement point) and cloud service (acting as policy definition and decision point). SFCP is secure REST based protocol that exposes an interface to GET, DELETE, PUT, POST policy definitions. SVFM cloud service uses a dynamic policy decision engine and algorithm to determine policy definition that is to be enforced on a specific action (on a specific file on the mobile device) based on applicable user, device, file entity and associated metadata and defined or inherited user/device/file level policies and permissions. The algorithm uses the principle of most restrictive policy derivation when there are multiple policy items applicable to a specific action on a file entity.

Under an embodiment, an administrator may define company or enterprise policies based on a combination of device, user/group and storage domain parameters. Administrators may then define an additional set of phone/device specific polices and permissions relating to particular devices and their corresponding configurations. For example, an additional set of phone specific policies may apply to a device configuration including OS type, OS version and device type/name. One example configuration includes iOS, version 5.0 and iPad. Another example configuration includes Android, version 6.1 and phone. In addition to enterprise/company policies and the additional set of phone/device specific policies, an administrator may further define an additional set of user/group policies applicable to particular users or groups (e.g. sales group or company CEO). The above referenced administrator defined polices augment the inherited policies and permissions, i.e. the policies and permissions associated with SVFM system managed content inherited from corresponding source/origin file systems across the federated storage domains.

Figure 21:
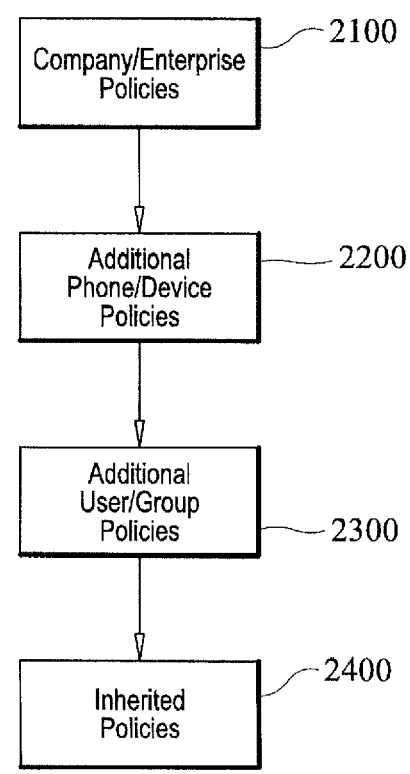
FIG. 21 is an example of ACXS system algorithmically generating a policy, under an embodiment.

As indicated above, the SVFM cloud service uses a dynamic policy decision engine and algorithm to determine policy definitions that are to be enforced on a specific action. According to such algorithm and as seen in FIG. 21, the SVFM system first applies the enterprise/company policies in step one 2100, the additional phone/device policies in step two 2200, the additional user/group policies in step three 2300 and the inherited policies in step four 2400. The inherited policies include the user/device/file level policies and permissions inherited from the federated storage domains. The algorithm uses the principle of most restrictive policy derivation when there are multiple policy items applicable to a specific action on a file entity. Under an embodiment, a policy enforcement module of the Averail application retrieves policy definitions (policy update can be triggered to Averail application by a push notification from the ACXS service) from the SVFM cloud service when the user accesses/starts the Averail application. In addition, the enforcement module automatically retrieves changes to the policy definitions as changes occur on the server side of the SVFM system.

SVFM system ensures traceability and auditing of actions on files that are managed by SVFM system. Each action (primitive operation, authentication, authorization or policy/permission control) is tracked by SVFM system mobile service and is reported to SVFM system cloud service. SVFM system cloud services can then be used to run logs/audit and analytics reports for traceability and auditing purpose.

SVFM system supports mechanisms for selective remote wipe of a file (or delete of all files) from the mobile device. This action can be performed by an administrator from the SVFM cloud service. Also, a specific underlying file system can be disabled from access for a specific user/device. SVFM system also supports deactivating and blocking access to the entire secure virtual file system for a specific user/device.

SVFM system supports federated search across all underlying federated physical file systems and repositories. The federated search is a 3-layer mechanism—first, the search is performed on the local secure cache, then on mobile cloud service on file metadata and content graph, and on underlying physical file systems.

The SFMS service facilitates transfer of documents from a source location to a target location only as permitted by policies and permissions administered by the ACXS cloud service and enforced by the mobile application. On the device side, the Averail service provides access privileges to managed content through a virtual file system exposed to the mobile application and to trusted third party applications. Each document transfer initiated by a user through either the mobile application or a third party application is policy and permission controlled. Therefore, the Averail system maintains awareness of a document's transfer history including information of a document's source, information of the user transferring the document and encryption applied to the document. The Averail application and ACXS service track every action taken on content managed by the ACXS service. The ACXS service then associates this tracked information with a transferred document and stamps the document with a trusted document icon. A user accessing the document may interact with the trusted document icon (e.g. clicking the icon) to obtain such information associated with a document.

The Averail system allows movement of content between communication nodes distributed among a federated set of storage locations while maintaining enterprise security controls over the content. The Secure Virtual File Management System (SVFM) manages content within the system through a combination of metadata access and management, policy/permission tracking, encryption methods and identity management systems. At its most fundamental level, the SVFM enables all of these functionalities through a node based communications paradigm which routes communications among nodes while imposing logical and/or physical elements/controls/constraints of the central ACXS core.

Under one embodiment, the Averail mobile application running on a mobile device communicates directly with public cloud storage systems (e.g. Box, Dropbox), enterprise cloud storage systems (Office365) and/or ECM systems. Under this embodiment, the Averail application on a mobile device communicates directly with cloud storage and/or ECM systems as allowed by Averail enforced policies and permissions. Such pathways include for example iPad→direct to storage/ECM system. For example, Averail mobile application (running on iPad) accesses documents from Office365 directly with the ACXS acting as policy engine. Policy enforcement happens on the Averail secure document container on mobile device. As another example, Averail mobile application (running on iPad) accesses documents on Dropbox directly from Dropbox with ACXS acting as policy engine. With respect to WebUX client, such pathways include WebUX→ACXS→storage/ECM system. However, the Averail application and/or WebUX client may not be able to reach behind an enterprise firewall to reach ECM systems, e.g. SharePoint, directly.

The existence of enterprise firewalls complicate the use of conventional client server requests to enable certain node to node communications within the Averail system, i.e. ACXS to SharePoint residing behind a firewall. An enterprise may segregate local storage systems from open networks through various firewall solutions. A firewall is either software-based or hardware based and primarily analyzes and monitors traffic leaving and entering a local area network. In a typical configuration, a firewall sits between an Enterprise LAN and public networks. The firewall monitors outgoing traffic initiated by client computers, i.e. clients within the enterprise initiating requests for information hosted by servers outside the firewall. Conversely, the firewall also monitors incoming traffic, i.e. requests from clients outside the firewall for information hosted on the corporate servers.

An enterprise may under an embodiment maintains corporate data locally and behind the enterprise firewall using on premise share drives. An enterprise may provide distributed file access to local computing devices within the firewall through Windows based systems such as SharePoint or Active Directory. Under alternative embodiments, an enterprise may implement distributed file sharing systems using Network File System (NFS), Distributed File System (DFS), and/or Server Message Block (SMB), also known as Common Internet File System (CIFS). A company uses such distributed file systems to provide local network access to company files, data, content, and/or computing resources within the firewall.

Enterprises provide access to local file systems behind an enterprise firewall to trusted devices including authorized/approved company desktops and laptops. However, mobile devices including Android and iOS devices are not considered trusted devices. Therefore, mobile devices are often not allowed access to trusted networks within the firewall perimeter. Accordingly, mobile devices are managed differently within the enterprise. IT professionals may block mobile device access to enterprise resources altogether. IT professionals may provide access to mobile device users by forcing such users onto guest Wi-Fi when operating within the enterprise firewall. Under an alternative embodiment, IT directly manages mobile devices within the enterprise. Under an embodiment, IT may securely provision the mobile device by configuring the device for Wi-Fi authentication, VPN access, password protections and other enterprise settings, monitoring the device for compliance with IT policies, and remotely maintaining capabilities of wiping and/or locking the device. Under this scenario, mobile device user would be given access to SharePoint, Winders Server Active Directory and shared drives. Even if the device is trusted and IT managed, mobile devices are generally not domain joined and do not enjoy single sign on access to all locally networked resources. Under an alternative embodiment, managed mobile devices may receive access to email, contacts and calendar through Microsoft Exchange and Active Sync, but that's it. In the worst case scenario, IT leaves the mobile device user to manage devices independently of company policies and permissions.

IT professionals face security difficulties as mobile devices migrate outside the firewall. As a threshold consideration, the enterprise may decide to refuse all remote access to company data from outside the firewall. For most enterprises, this solution is unrealistic given the increasing demand for mobile access from an ever increasing number of mobile device users. The enterprise may offer a variety of "outside in" pathways for mobile device users. Conventional remote access solutions include Secure Sockets Layer VPN (SSL VPN), Internet Protocol Security VPN (IPSec VPN), and access via a reverse proxy. Under an embodiment, a standard web server may expose enterprise data to the outside world through standard HTTP/S protocols. A web server may sit at the edge of an enterprise firewall and receive normal incoming HTTP/S requests for enterprise data. The HTTP/S requests are then routed to the targeted storage site where the requested data is retrieved. Under an alternative embodiment, the enterprise may provide SSL Virtual Private Network (VPN) access to corporate data. Under yet another embodiment, a reverse proxy solution may be used to mediate outside in traffic at the edge of the enterprise firewall. A reverse proxy receives request from clients outside the firewall for server side enterprise resources within the firewall. The reverse proxy passes on requests that are approved according to defined policies to server (or locally cached) resources and returns the requested content to the client. As another example, Microsoft offers Unified Access Gateway to provide secure remote access to corporate resources behind an enterprise firewall. All of the above referenced remote access solutions provide an "outside in" solution to the remote access problem. In other words, such solutions provide a mechanism for exposing corporate data to client requests originating outside the firewall under restricted conditions using encryption methods.

However, these solutions offer limited access to end users and expose enterprise content to leaks once a document resides on a mobile device outside the enterprise firewall. Further, enterprise customers often refuse to adopt any of the above reference solutions for fear of exposing enterprise data to the outside world. In other words, the enterprise may block "outside in" client requests for corporate resources. The SVFM system overcomes the firewall issue through an "inside out" proxy system (hereinafter the "IO proxy") implemented between the ACXS and the enterprise content management system. As described below, the IO Proxy system allows the ACXS to reach behind an enterprise firewall and securely request resources from firewall protected ECM systems such as SharePoint.

Figure 22:
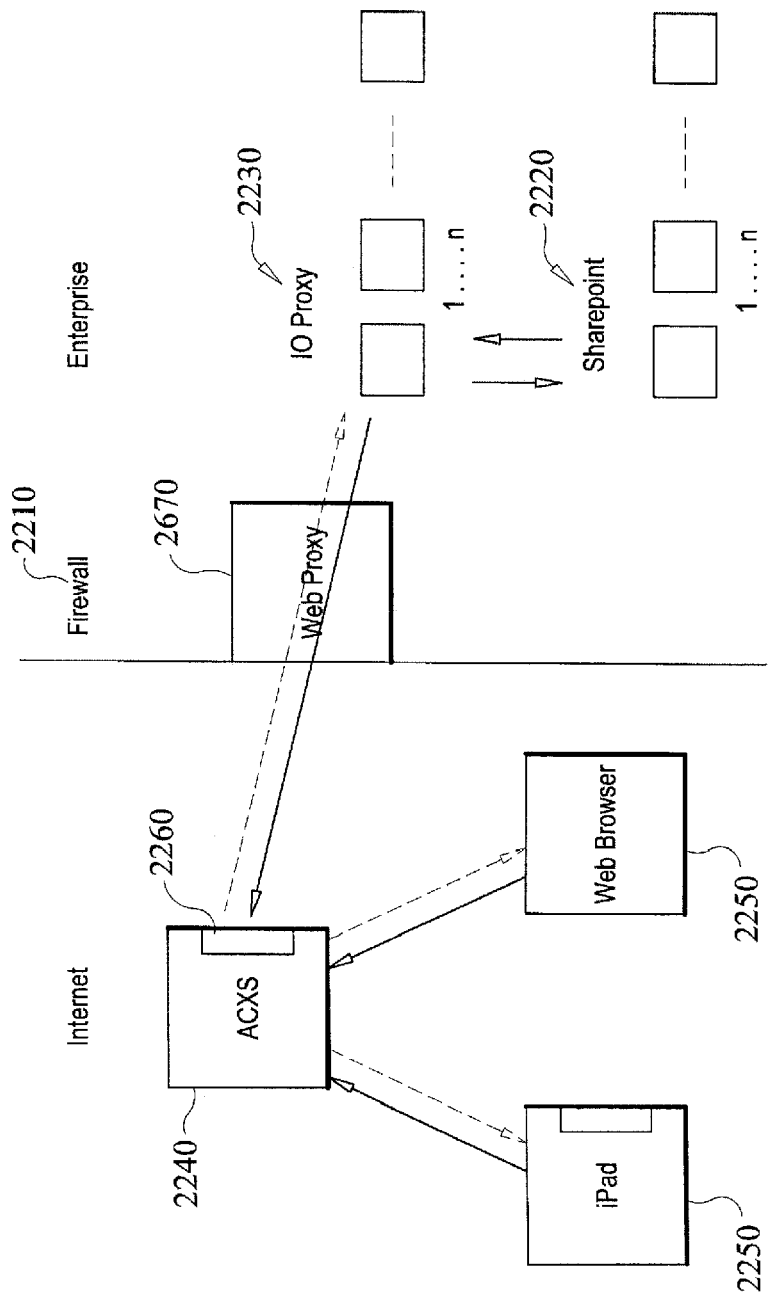
FIG. 22 shows the "inside out" proxy system, under an embodiment.

The SVFM provides an "inside out" solution to the remote access problem using an IO proxy mechanism that resides within the enterprise firewall. FIG. 22 shows the "inside out" proxy system under an embodiment. FIG. 22 shows an enterprise data storage environment separated from the Internet by a firewall 2210. As seen in FIG. 22, an enterprise uses SharePoint 2220 to maintain enterprise data under an embodiment. Under alternative embodiments, the enterprise may also use Active Directory or shared drives. FIG. 22 shows SharePoint drives coupled to the IO proxy 2230. The IO Proxy interacts with SharePoint as further described below.

The IO Proxy is coupled to the ACXS servers 2240 which are in turn coupled to mobile devices or browsers 2250 running instances of the Averail application. The ACXS servers maintain a communications component 2260 which in turn includes a proxy connector module (or proxy connector component or proxy connector) that communicates with the IO Proxy. The communication protocols among the Averail application, the ACXS servers, the proxy connector module, IO Proxy and enterprise SharePoint are described in detail below.

Figure 23:
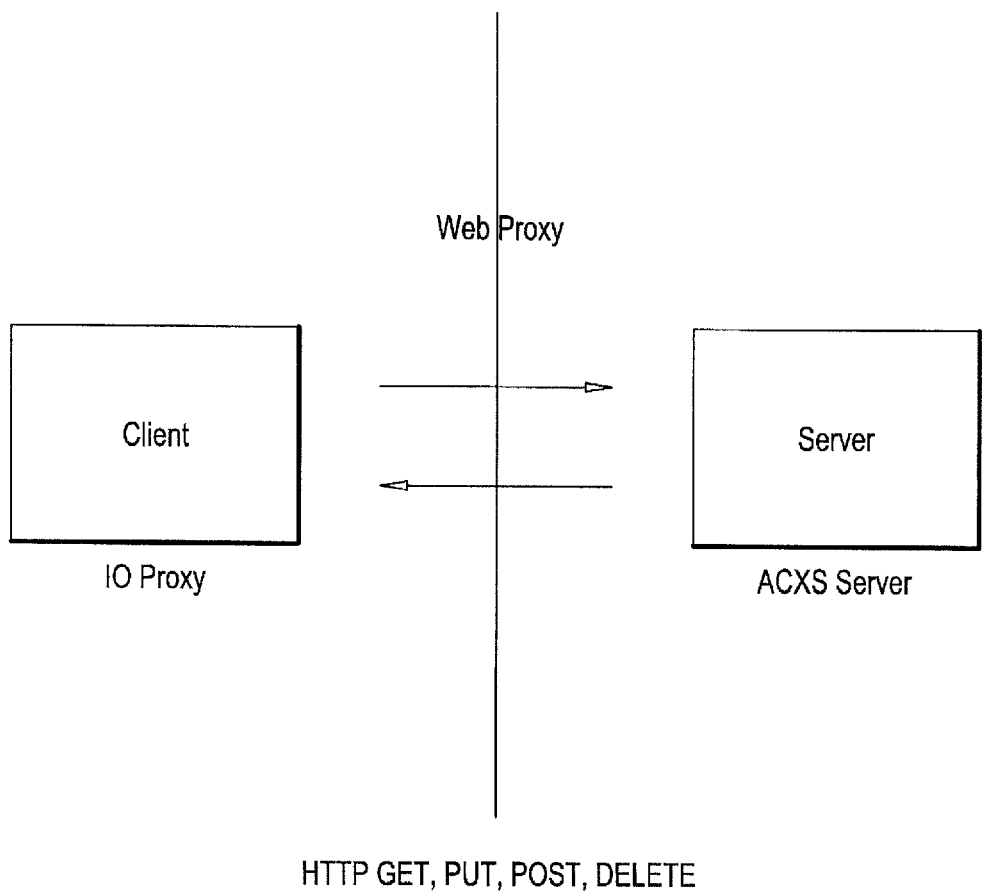
FIG. 23 displays the communication framework in place between the IO proxy and the ACXS, under an embodiment.

As indicated above, the ACXS resides in the cloud. On both the enterprise and client (Averail application) side, the ACXS resources are accessible via standard HTTP requests. The IO Proxy as client communicates with the ACXS proxy component through HTTP/S communications. FIG. 23 displays the communication framework in place between the IO proxy and the ACXS under an embodiment. As seen in FIG. 23, the IO proxy is the client and the ACXS is the server.

As seen in FIG. 22, the ACXS is coupled to an end user devices outside the firewall. These devices include an iPad and a web browser but are not so limited. The iPad as seen in FIG. 22 runs the Averail application and manages/issues the communication requests between the mobile device client and the ACXS server. The web browser interfaces with an HTML5 application that similarly manages communications between the browser client and the ACXS.

The firewall of FIG. 22 includes a web proxy 2670. The IO Proxy is coupled to the ACXS through an enterprise customer managed web proxy. Under one embodiment, a web proxy is a server dedicated to mediation of enterprise client requests for resources outside the Enterprise network. A web proxy receives HTTP or HTTPS protocol requests from enterprise clients, establishes a connection with a target server, passes along the request and then receives the response. The web proxy then returns the response to the requesting client. As the intermediate server, the web proxy may block certain client requests, file uploads, access to certain web services, etc.

Under the embodiment of FIG. 22, the IO Proxy is a client within the enterprise firewall and the ACXS component is a server residing in the cloud. As seen in FIGS. 22 and 23, the IO Proxy initiates requests. IO Proxy establishes a connection with the ACXS server, passes along the request to the ACXS server and then receives the response.

This underlying client server architecture as described in FIGS. 22 and 23 is in direct contrast with the desired and enabled (as later described in detail) data flow of the IO Proxy system. In general operation of the IO Proxy system from the vantage of logical data flow, the iPad client and/or the web browser client initiates a request for information residing on the enterprise content management system. The ACXS server receives the client request. The ACXS would then become the reverse client that passes the request along to the IO Proxy. Within the enterprise, the IO Proxy receives the request and manages the server side response, i.e. the IO Proxy functionally behaves like the server in the client server architecture and provides a response to the ACXS client request. The IO Proxy interacts with the enterprise content management system to provide the requested information. However, this logical data exchange does not physically map to the client server architecture between IO proxy and ACXS as seen in FIG. 23 due to the fact that the IO Proxy is the client that requests resources from the ACXS. However, the IO proxy system uses the client server architecture as described in FIGS. 22 and 23 to functionally reverse the role of client (IO Proxy) and server (ACXS Server) to allow the ACXS server to functionally behave as the client and the IO Proxy to functionally behave as the server. Accordingly, the IO proxy system maps the logical data flow described above to the client server constraints in place between IO proxy and ACXS. This functional reversal of client server architecture is described in greater detail below.

For sake of clarity in the following discussion, the terms client and server maintain their commonly understood meanings within client server architectures. However, the functional reversal of client and server in the IO Proxy system introduces functional versus literal operations of client server communications. Therefore, the IO Proxy serving as functional server is referred to as the IO Proxy acting as Reverse IO (or the "Reverse IO") and the ACXS server performing functionally as the client is referred to as the ACXS acting as the Reverse ACXS (or the "Reverse ACXS").

The IO Proxy system leverages the HTTP protocols to change the roles of client and server. In a conventional application of HTTP communications, a client communicates with resources outside the enterprise firewall using HTTP requests. With reference to FIG. 23, client IO proxy initiates HTTP request using a GET, PUT, POST or DELETE command. As one example, the server responds to a client GET request by providing the particular resource or returning a response to the client. The response contains completion status information about the request and may also contain requested content in its message body. The server may perform other functions on behalf of the client in response to GET, PUT, POST and DELETE commands.

The IO Proxy system leverages the HTTP protocols to change the roles of client and server by sending GET, PUT, POST or DELETE commands to the client within the server response. As a simple example, the client IO proxy in FIG. 23 issues a GET command to the ACXS server. In response, the ACXS responds to the GET command by embedding in the response a GET, PUT, POST, or DELETE, i.e. by issuing a REVERSE GET, REVERSE PUT, REVERSE POST, or REVERSE DELETE. Therefore, the ACXS server functionally behaves like a client by sending REVERSE HTTP commands on top of an underlying response primitive of standard HTTP communications. The functional reversal of client server roles using underlying HTTP protocols allows the REVERSE ACXS to "request" resources that reside on SharePoint by issuing reverse HTTP commands to a REVERSE IO proxy "server" as described in detail below.

Figure 24:
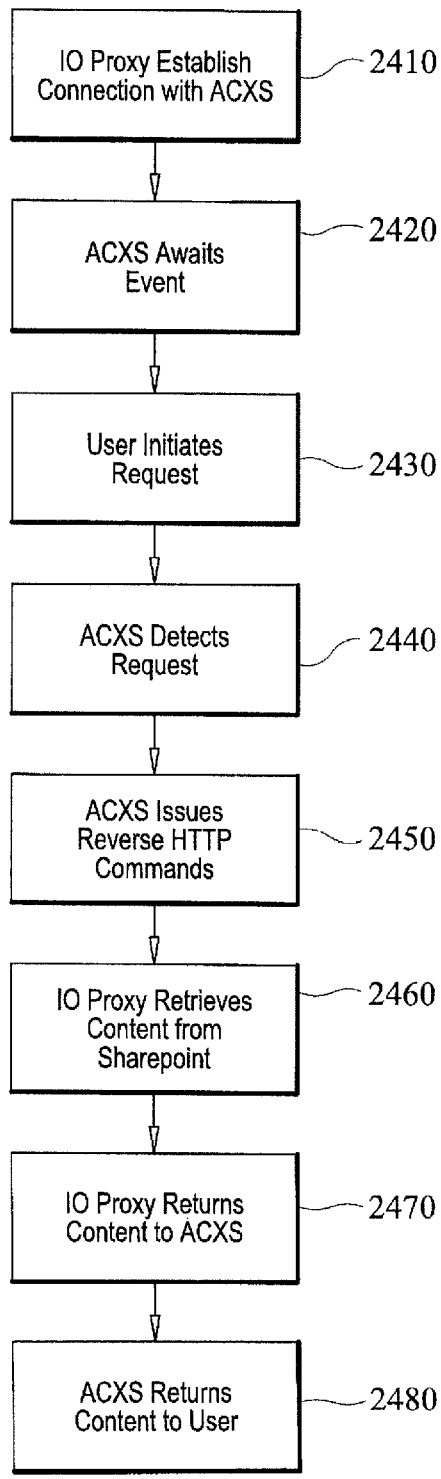
FIG. 24 shows flow diagram of communications between ACXS and SharePoint using IO Proxy, under an embodiment.

The ACXS SVFM integrates with on premise document management systems running within the enterprise. Under an embodiment, the IO proxy layers on top of the HTTP protocol in order to provide mobile device users access to enterprise documents and data sitting behind a firewall using existing enterprise communications and storage infrastructure. The SVFM system provides mobile device users access to SharePoint data in the manner described in FIG. 24. The IO Proxy establishes a secure communication channel with the ACXS server 2410. The IO Proxy maintains this connection as a long polling occurrence during which the IO Proxy awaits events 2420 from the Averail application running on a mobile device. The ACXS server awaits a request 2420 from the Averail application running on a mobile device. The end user issues a request 2430 for SharePoint document and the ACXS server detects the request 2440. The ACXS (acting as Reverse ACXS) issues reverse HTTP commands 2450 to the IO proxy (acting as Reverse IO). The IO Proxy retrieves the requested resource from SharePoint storage 2460 and returns the resource to the ACXS server 2470. The ACXS then returns the requested resource 2480 to the mobile device as the final step.

Figure 25A:
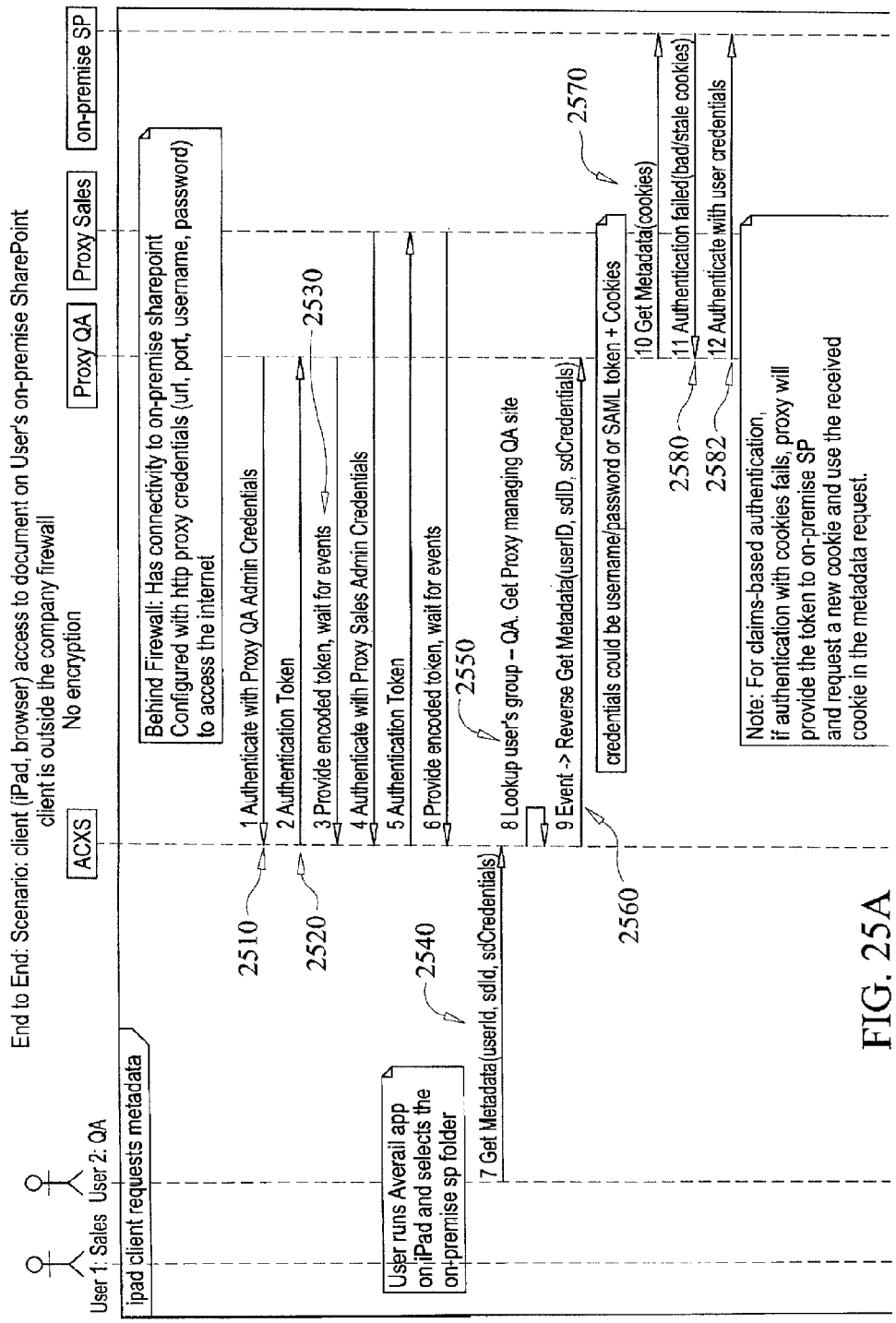
FIG. 25A shows establishment of communication between ACXS and SharePoint using IO Proxy, under an embodiment.
Figure 25B:
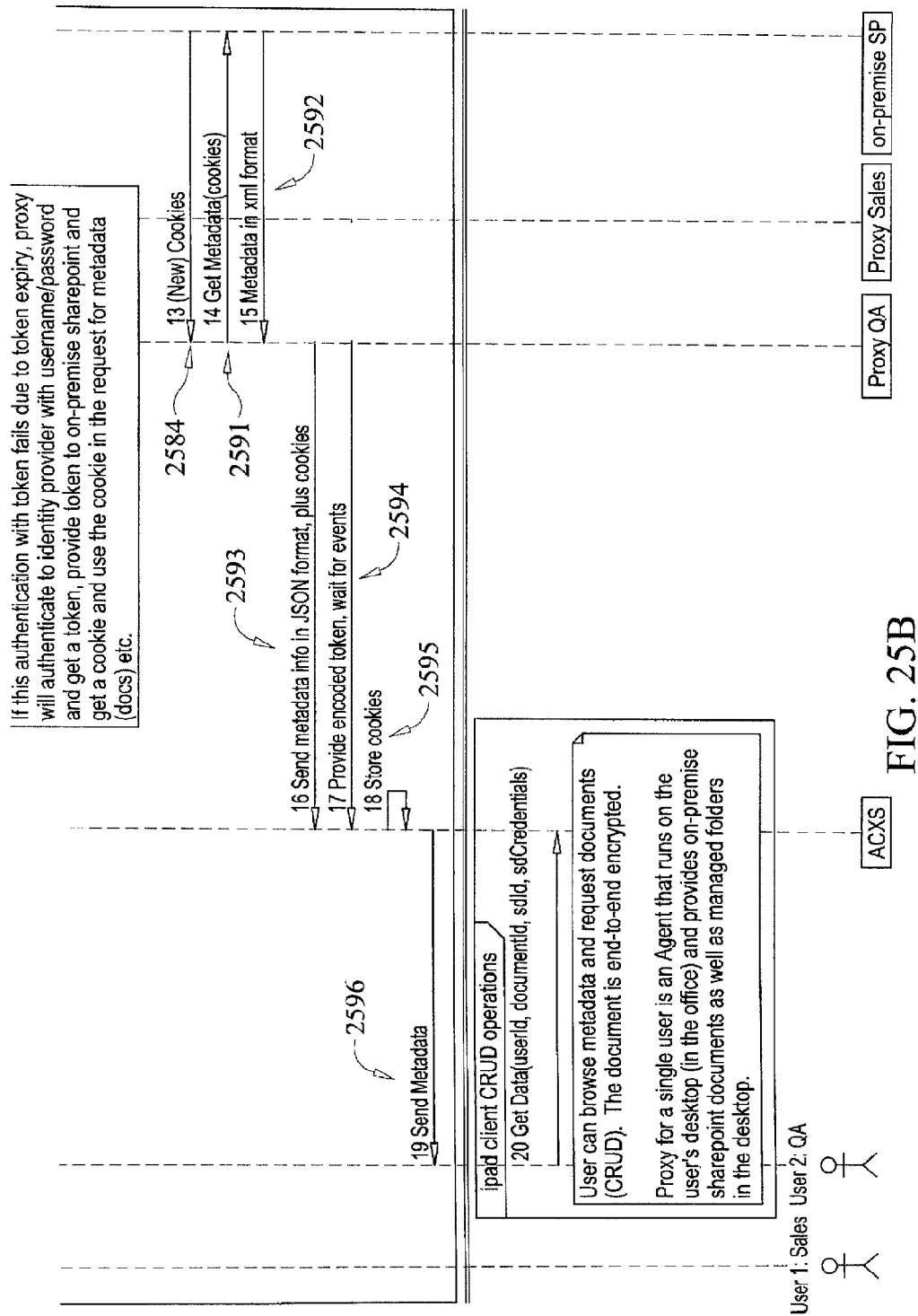
FIG. 25B shows establishment of communication between ACXS and SharePoint using IO Proxy, under an embodiment.

As indicated above, the IO Proxy establishes a communication pathway with the ACXS. FIGS. 25A and 25B is a visual depiction of the steps involved in brokering this connection. Assume that a Quality Assurance (QA) testing group is created in the on-premise SharePoint content management system allowing QA group members access to a collection of stored content. Under the ACXS SVFM, the IO proxy maintains a corresponding Proxy QA component (the "Proxy QA") behind the enterprise firewall. The Proxy QA has connectivity to on-premise SharePoint documents in "QA group" container and is configured with http proxy credentials (url, port, username, password) to access the internet. Note that FIGS. 25A and 25B show an example for "sales" group as well. The following discussion uses the QA group example to provide a description of IO Proxy communications with the ACXS servers.

The Proxy QA authenticates itself to the ACXS using Proxy QA credentials 2510 including user name and password but embodiments are not so limited. When the Proxy QA authenticates to the ACXS using appropriate credentials, the ACXS then provides the Proxy QA a token or a cookie which the Proxy QA stores locally 2520. In all subsequent requests to the ACXS, the Proxy QA provides this token or cookie as authentication. The Proxy QA then provides the token to the ACXS and waits for an event from a mobile device user 2530. The authentication process provides the ACXS with location of the Proxy QA. When an event occurs, i.e. when a mobile device user initiates a request (through the Averail application) for a QA group SharePoint document managed by the Proxy QA, the ACXS know where to forward the request.

The user triggers an event by running the Averail application and selecting the on-premise SharePoint folder. The Averail application issues a request 2540 (GetMetadata) to the ACXS to retrieve information of the content stored in the selected folder. When the ACXS receives the request, the ACXS looks up the requesting user's customer and group affiliation 2550. For example the user may work for Company Z and belong to the Proxy QA group. After identifying the user as member of the Proxy QA group, the ACXS forwards the request to the Proxy QA as a reverse HTTP GET command 2560 as described above. Under an embodiment, the reverse Getmetadata request includes the user's SharePoint user id and password. The ACXS may send a request back to the Averail application for the SharePoint user id and password at the time of the event. Under alternative embodiments the Averail application may present the user with a request to enter SharePoint credentials prior to the time the user initiates SharePoint access and send such credentials to the ACXS at the time of the event (i.e. user's selection of SharePoint folder on the Averail application) but embodiments are not so limited. As indicated above, the ACXS sends the reverse Getmetadata request using a reverse HTTP GET command as described above. The Proxy QA then authenticates with SharePoint using credentials comprising either user name and password or a Security Assertion Markup Language (SAML) token received from an identity provider. The Proxy QA authenticates with SharePoint using the credentials and receives cookies from SharePoint (not shown). The Proxy QA may authenticate with SharePoint using the cookies 2570. If authentication fails due to bad or stale cookies 2580, the Proxy QA provides credentials 2582 again to SharePoint and receives new cookies 2584. In the event the SAML token is bad due to expiry, the Proxy QA authenticates again to the SAML identify provider and uses the token to authenticate with SharePoint thereupon receiving new cookies from SharePoint. The Proxy QA then issues a Getmetadata request to SharePoint using the cookies 2591. SharePoint then provides the metadata to the Proxy QA in xml format 2592. The Proxy QA forwards the metadata to the ACXS in JSON format 2593 together with the cookies which are stored in the ACXS. The Proxy QA then sends a token 2594 (i.e. received during initial authentication between Proxy QA and ACXS) to the ACXS server and waits for another event. The ACXS stores cookies received during Proxy QA Authentication with SharePoint 2595. These cookies are used in future exchanges between ACXS and Proxy QA so that Proxy QA may authenticate again to SharePoint with the cookies in future transactions. Under an embodiment, the ACXS may forward cookies to backup or alternative IO proxies (e.g., in the event of a failure of Proxy QA) thereby obviating the need to repeat authentication between alternative IO Proxies and SharePoint. The requested metadata is sent to the client 2596. The client user (Averail application) may now browse metadata and request documents (using CRUD commands).

Figure 26:
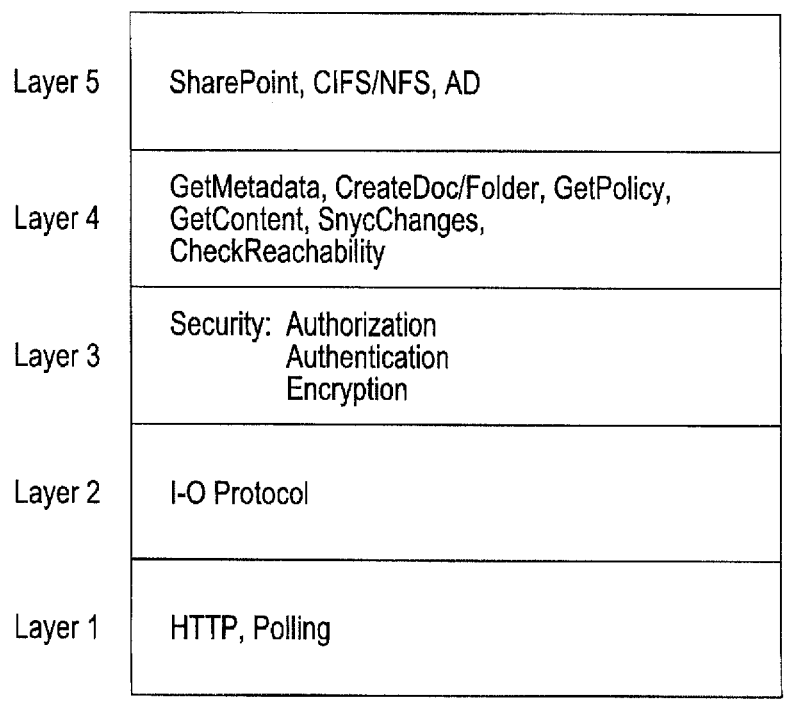
FIG. 26 shows communication layers that provide HTTP protocol access to enterprise documents and data sitting behind a firewall using existing enterprise communications and storage infrastructures, under an embodiment.

The SVFM integrates with on premise document management systems running within the enterprise. The SVFM integrates with on premise document management by implementing an IO proxy protocol layer on top of the HTTP protocol primitives. FIG. 26 displays the communication layers that provide HTTP protocol access to enterprise documents and data sitting behind a firewall using existing enterprise communications and storage infrastructures. Layer 1 represents standard HTTP communications between the IO proxy and ACXS. The IO Proxy authenticates to the ACXS using HTTP communications and establishes an open link to the ACXS referred to as a long polling occurrence. Layer 2 represents the 10 protocol that sits atop the HTTPS protocols. As already described above, the 10 protocol leverages the HTTP protocols to change the conventional roles of client and server by sending REVERSE GET, PUT, POST or DELETE commands to a client within the server response. Layer 3 represents security and encryption methods implemented alongside communications within the IO proxy server. As discussed above, the IO proxy authenticates to the ACXS in communications with the ACXS and authenticates to SharePoint in communications with the enterprise content management system. The SVFM also implements encryption and policy enforcement within the IO Proxy system as further described below. Layer 4 represents reverse HTTP commands that issue from the Reverse ACXS to the Reverse IO. The reverse HTTP commands include GetMetadata, CreateDoc/Folder, GetContent, SyncChanges, CheckReachability, and GetPolicy but embodiments are not so limited. Layer 5 represents the underlying content repository resident on premise and behind the enterprise firewall.

Figure 27:
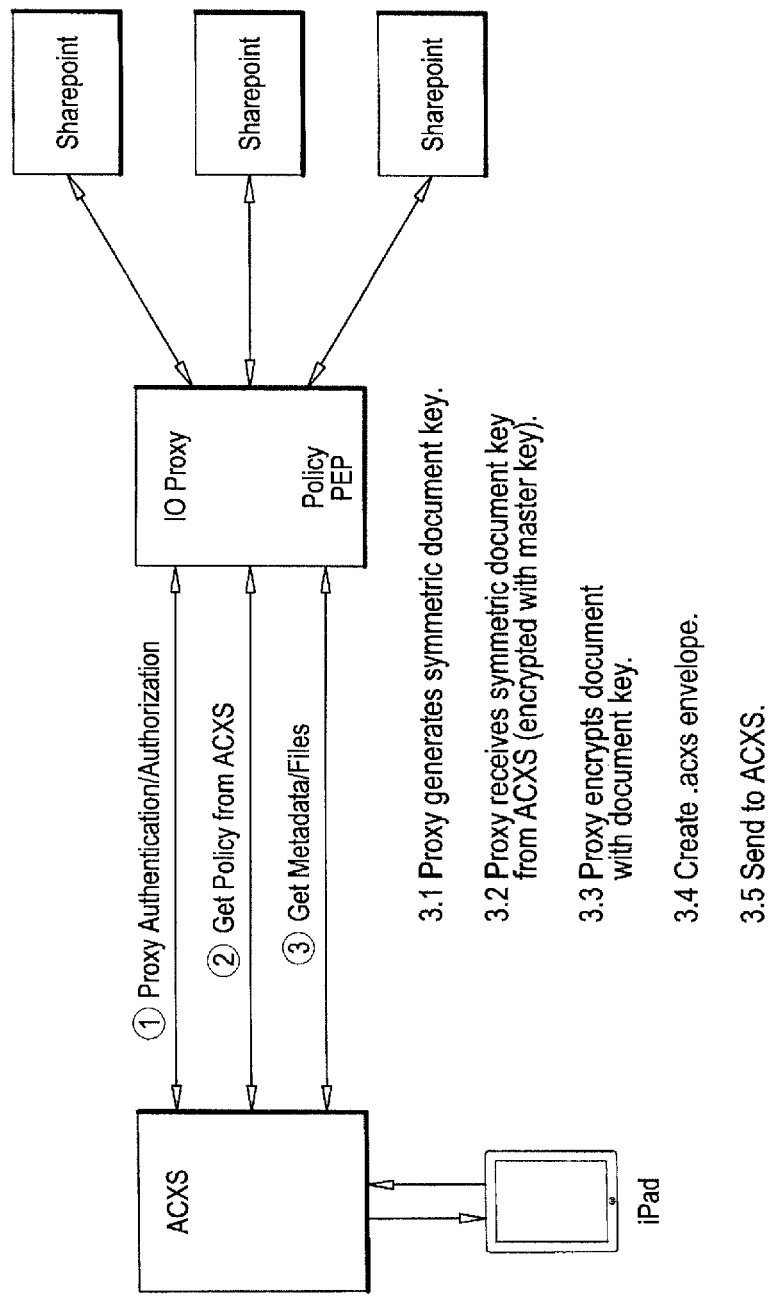
FIG. 27 shows movement of content from SharePoint to ACXS servers (and Averail application) together with enforcement of policies and encryption, under an embodiment.

FIG. 27 shows movement of content from SharePoint to ACXS servers (and Averail application) together with enforcement of policies and encryption. In step 1, the IO Proxy authenticates to the ACXS servers and to SharePoint as described above. In step 2, the IO Proxy retrieves policies from the ACXS servers. In the IO Proxy system, the IO Proxy (behind the enterprise firewall) acts as the policy enforcement point (PEP) of policies defined by administrators and maintained by the ACXS using the policy management system. In step 3, the ACXS and IO Proxy interact as described above to transfer enterprise content to the ACXS servers which is then passed along to the Averail application. The content is encrypted on the move from SharePoint to the client using the Averail master key method. In step 3.1, the IO Proxy generates a symmetric document key. In step 3.2 the IO Proxy interacts with ACXS to receive a wrapped symmetric key, i.e. the symmetric key encrypted by ACXS with a master key. The IO Proxy then in step 3.3 encrypts the document with the symmetric document key. In step 3.4, the IO Proxy creates the .acxs envelope and then in step 3.5 the IO proxy sends the encrypted document together with the wrapped key in the envelope to the ACXS servers.

Under another embodiment, there is also a personal proxy (which is also known as Agent), which resides for example on a laptop. This Agent is the equivalent of the IO Proxy. The Agent may run behind of or outside of a firewall. When the agent runs behind the firewall, the Agent may provide access to SharePoint documents under an embodiment. The Agent may also provide access to locally stored files when the Agent operates within or outside the firewall. Under this embodiment, the Agent manages access to local folders allowing managed documents on the local folder to be shared between users.

The IO Proxy system provides a wide array of functionality. It allows user to access corporate (on-premise) documents securely on mobile devices (tablets, laptop etc) from anywhere, anytime with full tracking and auditing, end-to-end encryption, current authorization. Current authorization means that check for authorization is made at the time user accesses the document as authorization may have been revoked. The ACXS and IO Proxy cooperate to enforce policies. The Averail IO Proxy and ACXS never serve a document for which the user is unauthorized. As indicated above, the IO Proxy retrieves ACXS maintained policies and enforces them at the enterprise level. Of course, on-premise ECM systems enforce their own policies and permission definitions. Averail system policies may augment such policies and permission and may therefore be more (and never less) restrictive. The IO Proxy system supports two way synchronization. Change on the iPad (via Averail application) are pushed to Storage Domain even when the client is outside the firewall. As indicated above, documents served by the IO Proxy are encrypted end-to-end in such a way that the Averail application requires keys from Averail system before documents may be decrypted. Further multiple IO proxies may increase throughput and availability. In addition IO proxies may serve specific enterprise groups. For example, a marketing group may under an embodiment have their own four proxies while sales may have their own four proxies. The proxies themselves may run unattended after initial configuration as they use certificates/credentials from the ACXS to access on-premise systems. On the client side (Averail application), the IO proxy is entirely transparent to the user.

The Averail system may implement IO Proxy system using multi-threaded Proxies running on a wide variety of platforms from vanilla desktops (2 to 4 cores) to mid-range servers to enterprise servers (64 or more cores); therefore the capability of a Proxy to serve hundreds of simultaneous requests varies a lot. Under one embodiment, the Proxy will provide ACXS information about its capabilities (and current load) so that ACXS can perform intelligent weighted load-balancing among the Proxies that serve a group (e.g. Sales or Marketing) so as the maximize the resource utilization and minimize latency. Under another embodiment, ACXS can 30 use the average round-trip time (and other performance metrics) of past requests (sliding window) to decide which Proxy is most likely to respond the fastest for the current request and route the request accordingly.

While it is true that Proxies run in secure environments inside the firewall, some installations may be more secure than others. For example. a Proxy running on a desktop in a lab (with access control), though secure, is relatively less secure than a Proxy running in a secure room with highly limited access and multiple levels of protection (guard, badge, card access control, video monitoring etc). Under an embodiment, the Proxy will provide this security information to ACXS.

Under one embodiment of the IO Proxy system, documents can be classified as "unclassified", "Restricted", "Confidential", "Top Secret" etc. The roles of the enterprise users could be employee, engineer, human resources, attorney, director, VP, board of directors etc. Under this embodiment, ACXS can use the information about the user role (and perhaps document type) to route the request to the appropriate Proxy. For example, the create/update/read/delete requests from users in the VP role will be routed to the Proxy which is in the most secure location.

The ACXS service provides access to documents from enterprise document sources such as SharePoint through multiple routes to mobile devices outside the firewall, while maintaining end-to-end security through encryption and authorization controls. The ACXS thus constructs a secure "Virtual Document Circuit" for documents to flow from enterprise sources to BYO devices.

Some specific routes for document flows include but are not limited to:
SharePoint→Inside-Out-Proxy installed by IT on server→ACXS→Device.
SharePoint→IOProxy installed by user on desktop/laptop→ACXS→Device.
SharePoint→Averail app on desktop/laptop→ACXS→Device.
(The Averail system implements this pathway using a native client for Win7/Mac platforms, under an embodiment).
SharePoint→Averail app on Device1→ACXS→Device2 (Under this embodiment, the first device has locally cached a SharePoint doc).

All such pathways/routes may be constructed real-time and on-demand by the ACXS server based on the reachability/connectivity of each node in the routing network, and based on the location(s) where the desired document resides. The ACXS service thus provides a convenient and secure method for users to search and browse for documents across the entire Secure Virtual File Management System, which includes documents cached in other users' mobile devices or created by other users on their desktops/laptops. The SVFM system then transfers the desired document contents with end-to-end encryption and authorization control from the source server/desktop/laptop/mobile device to the user's mobile device.

The ACXS system implements Mobile Information/Data Leak Protection (ILP/DLP). The goal of ILP/DLP solutions is to discover, detect, protect and manage confidential and sensitive information throughout its lifecycle and storage locations within the enterprise and as it gets shared with customer/partners. ILP also is used for regulatory compliance. Presently, enterprises deploy ILP solutions either on the enterprise network parameter or on PC/laptop endpoints. Examples include Microsoft Forefront Unified Access Gateway, RSA Data Loss Prevention Suite, BlueCoat DLP and Symantec Vontu/DLP. Existing ILP solutions typically perform the following functions:

Discover and classify confidential, custodial or PII information during its lifecycle. This is done through document scanning, metadata analysis, digital fingerprinting etc.

Enforce compliance with policies on information protection.

Integrate with VPN and remote access solutions for off-site employees. In this case, remote employee/user can only access on-premise information through VPN tunnel in addition to endpoint ILP protection.

Protect across different risk vectors at endpoint and network perimeter. The following diagram (FIG. 28) shows the risk vectors that are covered by existing ILP solutions. These include a) endpoint-level ILP protection on a laptop/desktop—this includes use of USB storage, syncing with mobile devices also, b) integration of ILP with proxy/gateway appliances on enterprise network perimeters, c) off-site protection on remote laptops.

In the context of access to cloud storage services, enterprises can restrict access to cloud storage services by using perimeter ILP protection. However for this to work information flow has to go through the ILP-enabled gateways and proxies, which is the case for a) on-site employees/devices and b) remote devices that access cloud services only via VPN tunnel back to the enterprise and out through enterprise web proxies.

Figure 28:
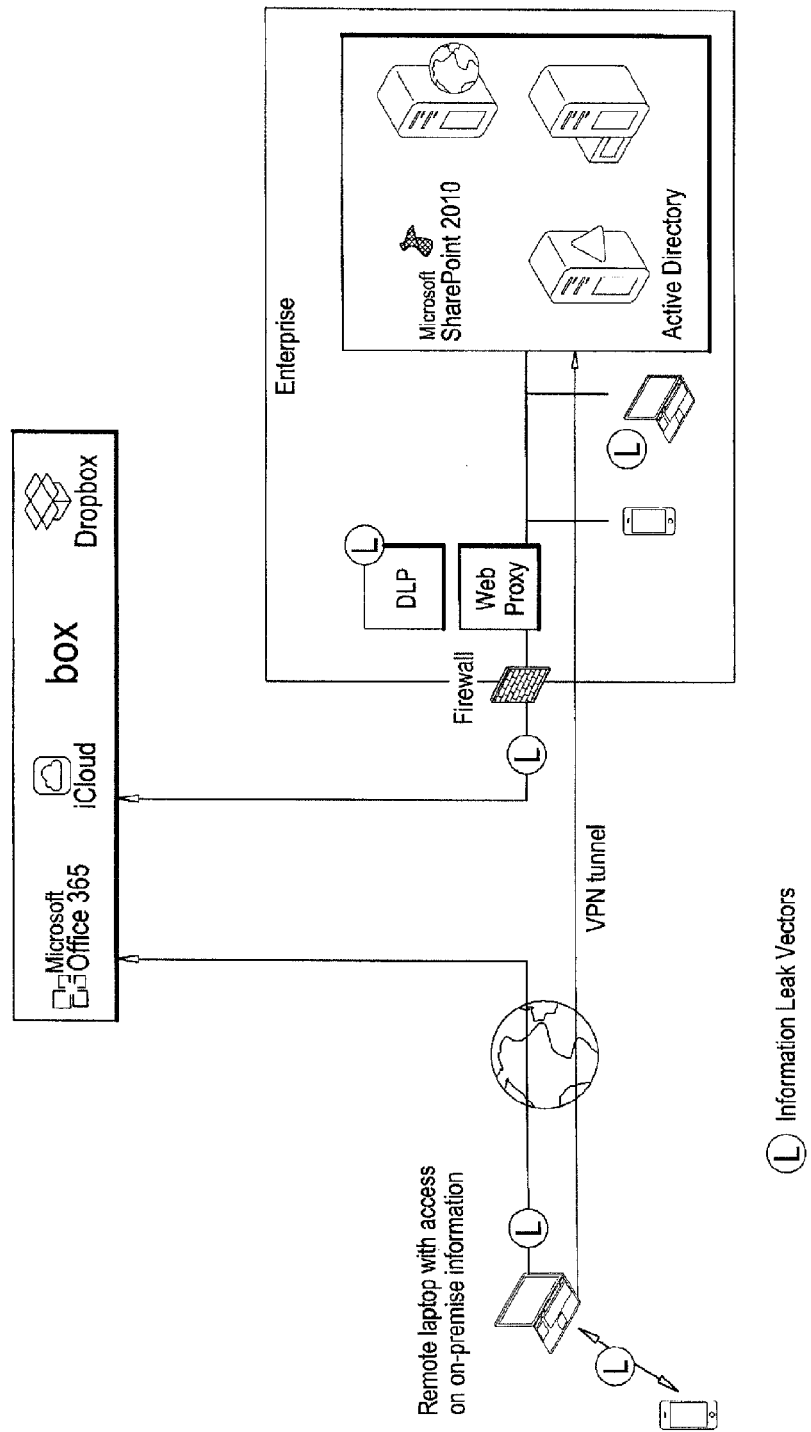
FIG. 28 shows risk/leak vectors under existing enterprise deployed ILP/DLP solutions, under an embodiment.
Figure 29:
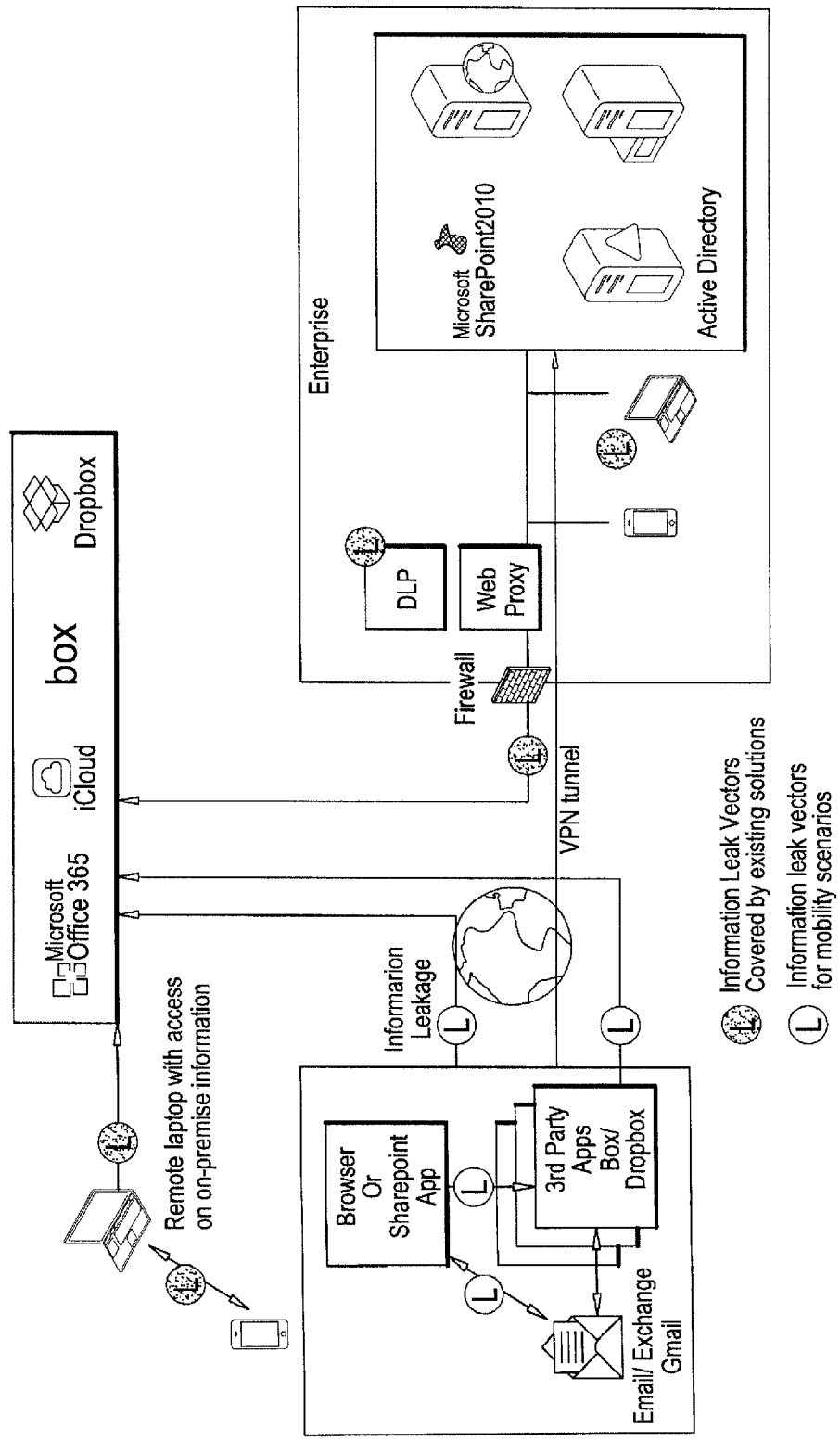
FIG. 29 shows risk/leak vectors under existing enterprise deployed ILP/DLP solutions, under an embodiment.

Averail service integrates with existing enterprise deployed ILP/DLP solutions to cover the risk vectors highlighted in FIG. 28 above. Averail can use ICAP (Internet Content Adaptation Protocol) to couple in its own information scanning to existing proxy appliances. Smartphone/tablets bring additional scenarios given the mobility aspect and the fact that users are more likely to use these remotely on public WiFi hotspots and cellular networks. FIG. 29 shows additional risk vectors for information leakage under an embodiment.

A smartphone can get private/confidential documents through a) sync from laptops that have secure access to secure enterprise information resources, such as on-premise SharePoint, b) as email attachments using email application on the device, c) using browser or SharePoint application to access on-premise SharePoint while device was "within" enterprise network with secure access to SharePoint. Once a confidential document is on the device, the document can move across from one application's sandboxed file system to another. For example, user can open a confidential document received via email with Box/Dropbox application and these documents move to the corresponding sandbox and can be uploaded to cloud storage—this is an information leak vector. The same is the case for a document that is synced with iCloud into user's own iCloud storage. Similarly, user can also take a confidential document to send it out as an email attachment.

Averail provides multiple mechanisms to protect against these added risk vectors. As described herein, Averail mobile application provides a secure document container on the device that enforces policies and permissions around encryption, cross-domain routing, sharing across applications, and document collaboration. Any confidential document accessed using Averail application from enterprise on-premise information sources is subject to applicable policies. This covers the risk vectors around leak of documents from Averail application to email or third party cloud storage applications on the device.

Averail also uses MDM mechanisms to configure device (as per enterprise policies) settings for a) network proxy settings (preferably using split IP tunneling so that traffic to public or private network domains is relayed according to company policies), b) credentials/certificates for VPN-based access from device to enterprise information sources, and/or c) blocking of applications that are used for access to cloud storage resources—for example, access to iCloud can be turned off using iOS restrictions and Box/Dropbox applications can be blocked from being installed. The goal is to restrict device access to public cloud storage services, if so desired by an enterprise as per policies and compliance requirements.

Figure 30:
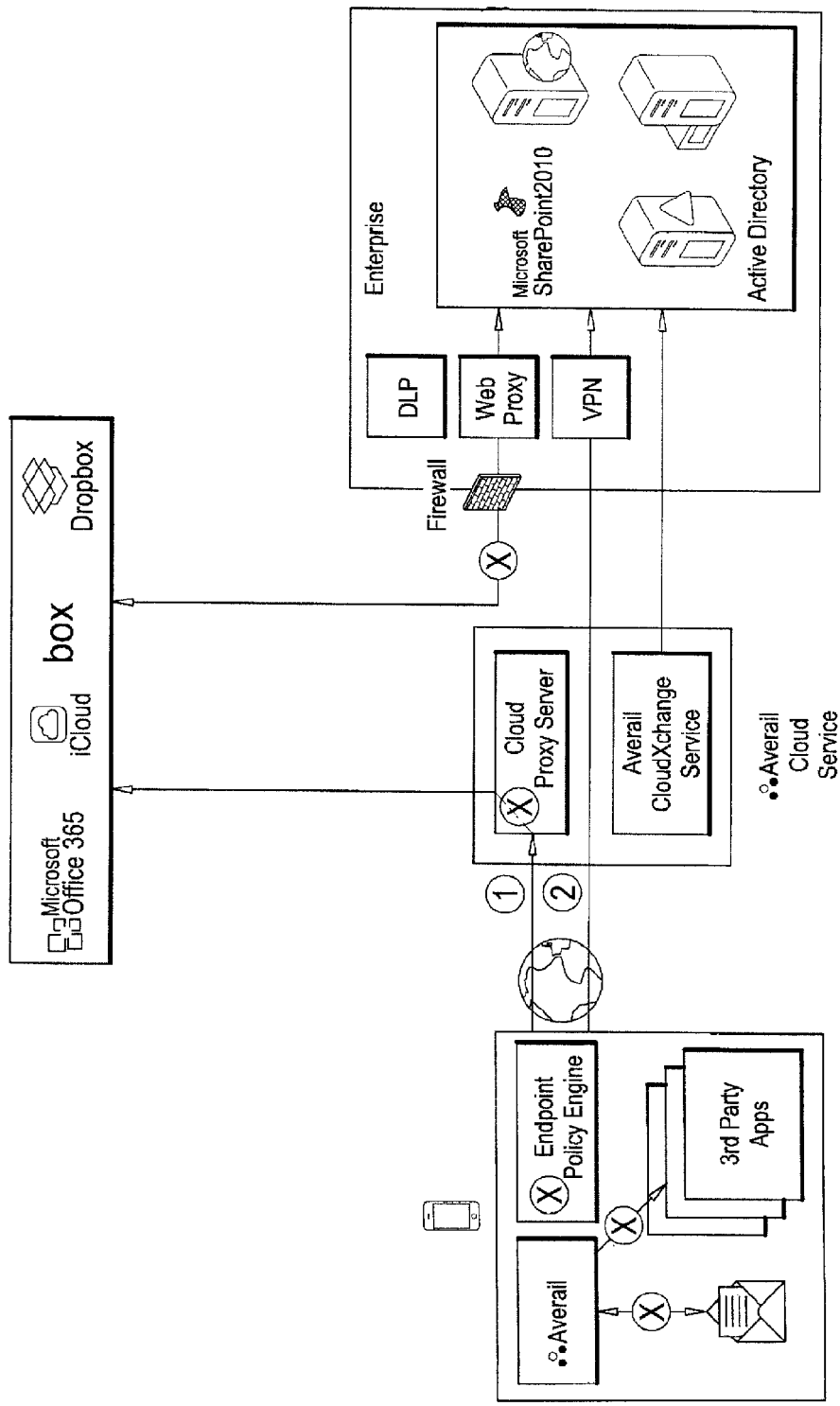
FIG. 30 shows a cloud web proxy service, under an embodiment.

Averail also hosts a cloud proxy service as seen in FIG. 30. This is a forward proxy for HTTP traffic and is integrated with CloudXchange service (specifically, policy manager, content forest manager services) for definition and enforcement of policies related to HTTP traffic bound to cloud storage services. The cloud proxy filters, intercepts and/or blocks HTTP GET/PUT traffic from devices to cloud storage services and specified domains while bypassing remaining traffic. The action on filtering and blocking is based on set of pre-defined rules and dynamic analysis of URLs, domains, and documents as part of HTTP traffic payload. HTTP/SSL traffic is by default tunneled except in cases (example: based on policies around destination IP address, hostname in server certificate) where it needs to be intercepted or blocked.

Averail service administrator for an enterprise can define policies to have HTTP traffic from Averail mobile application and all applications on device to be routed through Averail cloud proxy. This is done by setting network proxy settings to Averail cloud proxy via configuration profiles or MDM mechanisms.

Averail supports IRM by enabling persistent usage rights, policies and permissions to be defined and enforced at the document, library/folders or site levels. A rights managed document has these policies and permissions associated with it throughout the time validity and duration of the associated rights.

The core scenario behind IRM is to ensure that as document moves during its lifecycle across on-premise ECM/storage, third party apps, users/devices and cloud storage services, policy controls associated with the document remain with the document.

Averail supports IRM through Averail Rights Management Server (AvRMS) hosted on public cloud (as part of CloudXchange service) and Averail IRM client code bundled with Averail mobile application. The Averail IRM enables IRM functionality for cloud storage and ECM services that do not have their own IRM support.

Averail supports integration with SharePoint IRM by integrating Averail IRM client on the device with Active Directory Rights Management Server (AD RMS). An option is to even provide IRM for SharePoint as a value-added service for customers/users by hosting Averail's own instances of AD RMS on the compute Virtual Machines of the underlying public cloud platform.

Figure 31:
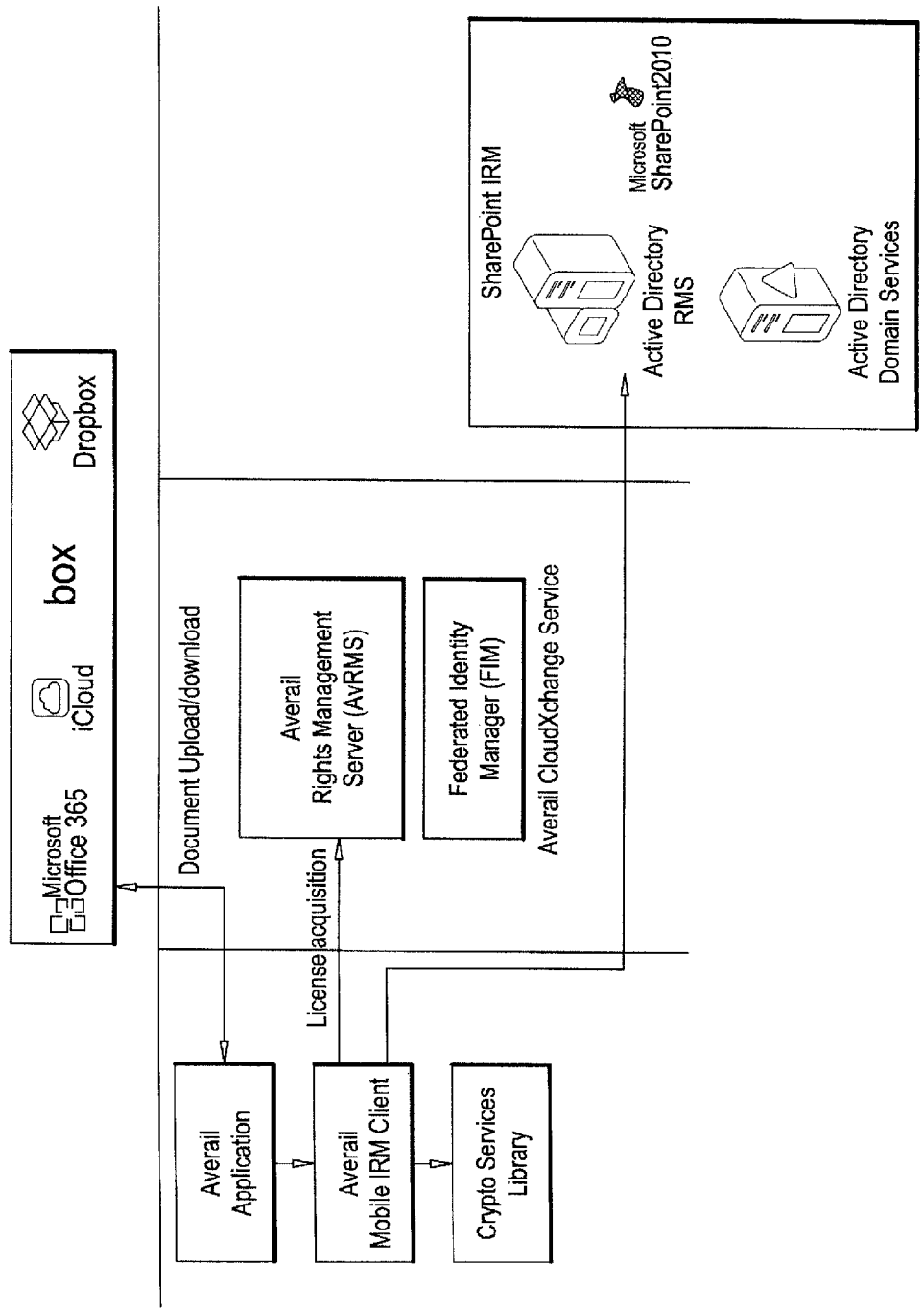
FIG. 31 shows an end-to-end view of IRM, under an embodiment.

FIG. 31 shows an end-to-end view of IRM, under an embodiment. AvRMS exposes APIs to Service Management console to enable IT/policy administrators to enable IRM at document library/folder levels. AvRMS also supports following functions:

Enrolling user, device and its IRM client with the AvRMS service by authenticating user identity with the Federated Identity Manager.

Setup of trust between Averail IRM client and AvRMS using certificates.

Issuing end-user IRM license (with usage rights and permissions) to the Averail IRM client.

Managing distribution of certs (used for encryption and decryption of rights managed document) to the Averail IRM client.

Averail Mobile IRM client performs as follows:

IRM client enrolls with Averail RMS service and sets up trust using certificate (specific to RMS service) that have been configured on the device through certificate distribution and configuration mechanism.

AvRMS validates the user identity with Federated Identity Management Model (FIM) prior to user/IRM client being able to create/read/upload/download rights-managed document.

User can create a rights-managed document using Averail mobile application UI. User can take an existing document and make it rights-managed. Alternatively, Averail mobile application can enforce policy controls (specified using Service Management console on document/library basis that require IRM to be enabled prior to sharing cross-domain or across applications) transparent to the user.

Averail IRM client creates an Averail license with associated information on usage rights (who can do what with the document), permissions and time validity/expiration of license.

Averail IRM client uses the crypto services on the device to encrypt the document. The key for encryption is either a) accessed from end-user license issued by AvRMS or b) distributed and configured on the device through certificate distribution and configuration mechanism.

Averail application uploads the encrypted document and IRM license to the target cloud storage service for sharing or cross-domain routing.

When a user accesses a rights-managed document using Averail Mobile application, Averail IRM client uses the Averail IRM license to get the end-user license from AvRMS service and enforces usage rights, permissions and policies on the encrypted document. Averail IRM client uses the crypto service and crypto key (from the end-user license) to decrypt the document. Note that Averail IRM-managed document can only be opened by Averail IRM-enabled mobile application from Averail or a 3$^{rd}$ party.

The components described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, HTTPs, FTP, SMTP, WAP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above. The elements and acts of the various embodiments described above can be combined to provide further embodiments. These and other changes can be made to the systems and methods in light of the above detailed description.

Embodiments described herein include a virtual file management system (VFMS) providing a user access to managed content on one or more mobile devices. The system comprises a plurality of storage domains that store the managed content distributively using one or more file systems. The system comprises at least one server hosting a data infrastructure that organizes the managed content into a virtual file system that maintains information of storage domain specific file system primitives for accessing corresponding portions of the managed content. The data infrastructure collects and maintains metadata of the plurality of storage domains and the one or more mobile devices. The data infrastructure comprises a policy definition and decision component that generates and maintains policies defining controls for permissible operations on the managed content with respect to the user on the one or more mobile devices. The permissible operations include the file system primitives. The system comprises a client application hosted on the one or more mobile devices. The client application is coupled to the data infrastructure and the plurality of storage domains and including an enforcement component. The enforcement component communicates with the policy definition and decision component to retrieve and enforce the policies by applying the controls on the one or more mobile devices. The client application retrieves information of the virtual file system from the data infrastructure and provides access to the managed content through an interface by processing data requests using the permissible operations, and processes data requests through one or more of direct communication with the plurality of storage domains and secure overlay communication with the plurality of storage domains through the data infrastructure. The client application exposes the permissible operations and the information of the virtual file system to one or more mobile applications that run on the one or more mobile devices and provides the access to the managed content through the interface.

Embodiments described herein include a virtual file management system (VFMS) providing a user access to managed content on one or more mobile devices, the system comprising: a plurality of storage domains that store the managed content distributively using 30 one or more file systems; at least one server hosting a data infrastructure that organizes the managed content into a virtual file system that maintains information of storage domain specific file system primitives for accessing corresponding portions of the managed content, the data infrastructure collecting and maintaining metadata of the plurality of storage domains and the one or more mobile devices, wherein the data infrastructure comprises a policy definition and decision component that generates and maintains policies defining controls for permissible operations on the managed content with respect to the user on the one or more mobile devices, the permissible operations including the file system primitives; a client application hosted on the one or more mobile devices; the client application coupled to the data infrastructure and the plurality of storage domains and including an enforcement component, wherein the enforcement component communicates with the policy definition and decision component to retrieve and enforce the policies by applying the controls on the one or more mobile devices, the client application retrieving information of the virtual file system from the data infrastructure and providing access to the managed content through an interface by processing data requests using the permissible operations, and processing data requests through one or more of direct communication with the plurality of storage domains and secure overlay communication with the plurality of storage domains through the data infrastructure, wherein the client application exposes the permissible operations and the information of the virtual tile system to one or more mobile applications that run on the one or more mobile devices and provides the access to the managed content through the interface.

The plurality of storage domains of an embodiment include one or more of shared storage of an enterprise and cloud based storage.

The shared storage of an enterprise of an embodiment includes enterprise content management systems including at least one of SharePoint, shared drives, and Active Directory, the shared drives including one or more of NFS, CIFS, and DFS based shared drives.

The cloud based storage of an embodiment includes one or more of iCloud, DropBox, and Box.

The client application of an embodiment comprises a native mobile application for the one or more mobile devices.

The client application of an embodiment includes a web based HTML5 application, wherein the one or more mobile devices includes a web browser client accessing the HTML5 application One or more mobile devices of an embodiment include a smartphone device and a tablet, wherein the smart phone device includes an iPhone device running iOS, an Android device running Android operating system and a Windows phone running Windows mobile operating system, wherein a tablet device includes a mobile tablet platform running the iOS, the Android 5 operating system or the Windows mobile operating system.

One or more file systems of an embodiment include a first file system and a second file system, wherein a content hierarchy of the first file system is different than the content hierarchy of the second file system.

The data infrastructure of an embodiment is one or more of a private and a public cloud based service.

The data infrastructure of an embodiment implements a pluggable mechanism to couple with the plurality of storage domains.

Coupling with the plurality of storage domains of an embodiment includes interfacing with the plurality of storage domains using one or more of a public interface and a protocol.

The public interface of an embodiment includes REST communications, SOAP communications and proprietary APIs, wherein the protocol includes WebDAV, CIFS and NFS.

Interfacing with the plurality of storage domains of an embodiment includes collecting the storage domain specific file system primitives, the data infrastructure mapping the storage domain specific file system primitives to corresponding content of the plurality of storage domains.

The information of the storage domain specific file system primitives of an embodiment includes a first and a second set of primitives, wherein the first set is different than the second set, wherein the storage domain specific file system primitives include read, write, delete, update, copy, and move.

Interfacing with the plurality of storage domains of an embodiment comprises collecting the metadata.

Organizing the managed content into a virtual file system of an embodiment comprises using the information of the storage domain specific file system primitives, information of the plurality of storage domains and the metadata.

The virtual file system of an embodiment provides virtual file system primitives including one or more of create, read, update, delete, rename, list, move, copy, get metadata, view, edit, annotate, copy and move across physical file systems, and open in specific applications for editing and viewing, wherein the plurality of storage domains comprise the physical file systems.

Metadata of an embodiment comprises at least one of an identity component, a content s metadata component, a device component, and a policy component.

The device component of an embodiment comprises information of mobile device configuration parameters of the one or more mobile devices, the mobile device configuration parameters including device specific policies and permissions in place for the one or more mobile devices.

Configuration parameters of an embodiment include device posture and configuration settings.

The device component of an embodiment incorporates a mobile device management policy from a third party service, the mobile device management policy specifying the configuration settings.

The mobile device management policy of an embodiment is defined for a set of enterprise devices, wherein the mobile device management policy is defined according to a role of an enterprise user.

The policy component of an embodiment comprises storage domain specific policies inherited from each of the plurality of storage domains, the storage domain specific policies including user and group level permissions and policies with respect to the managed content.

The identity component of an embodiment includes unique device identifiers for each of the one or more mobile devices.

The identity component of an embodiment includes storage domain identities including identity and credentials of the user for each of the plurality of storage domains, the identity and credentials of the user enabling authentication and authorization of the user for access to each of the plurality of storage domains.

The data infrastructure of an embodiment stores the identity and credentials only as needed to synchronize information of the content metadata component with the plurality of storage domains.

The identity component of an embodiment associates the storage domain identities and the device identifiers with a system user identity in the data infrastructure, wherein the system user identity is unique to each user.

The identity component of an embodiment associates the system user identity with an enterprise using an enterprise directory management system.

The identity component of an embodiment maintains a plurality of system user identities associated with the enterprise.

At least one of the plurality of storage domains of an embodiment include additional user and group associations, wherein the identity component associates the system user identify with the additional user and group associations.

Additional user and group associations of an embodiment include enterprise level associations including Active Directory distribution groups and security groups and cloud storage system accounts comprising Box and Dropbox accounts that are established by enterprises or groups of users.

The content metadata component of an embodiment includes storage domain metadata of the managed content stored on each of the plurality of storage domains.

Storage domain metadata of an embodiment includes name of files, creation date of files, owner of files, and corresponding storage domain content hierarchy, wherein the storage domain content hierarchy includes information of a file hierarchy.

Generating and maintaining the policies of an embodiment comprises the policy definition and decision component coupled to a management console configured to enable an administrator an ability to define additional policies using information of the metadata, the additional policies defining one or more additional controls for the permissible operations on the managed content.

Additional policies of an embodiment are defined for an enterprise, wherein the additional policies define the one or more additional controls for a user associated with the enterprise, wherein the user associated with the enterprise comprises the user of the one or more mobile devices.

Additional polices of an embodiment define the one or more additional controls for groups of users associated with the enterprise, wherein the groups of users comprise the user associated with the enterprise.

The administrator of an embodiment creates the groups of users associated with the enterprise using custom groups and standard groups, the groups of users including one or more of owners, members, visitors, viewers, on-premise employees, offsite employees, partners and customers.

Additional policies of an embodiment define the one or more additional controls for a specific mobile device, wherein the specific mobile device includes the one or more mobile devices.

Additional policies of an embodiment define the one or more additional controls for the plurality of storage domains.

Additional policies of an embodiment define the one or more additional controls for a portion of the managed content.

Additional policies of an embodiment include a second set of controls applicable to the specific mobile device, wherein the specific mobile device includes a configuration of operating system, operating system version and device type.

Additional policies of an embodiment include a third set of controls applicable to the user associated with the enterprise or the groups of users associated with the enterprise.

Maintaining and generating the policies of an embodiment include storing the additional policies, the device specific policies and permissions and the storage domain specific policies in a policy store of the data infrastructure.

Maintaining and generating the policies of an embodiment comprise algorithmically compiling at least one of the additional policies for the user associated with the enterprise accessing the portion of the managed content of the plurality of storage domains using the specific mobile device.

Compiling of an embodiment comprises retrieving and aggregating the one or more additional controls for the user and groups of users associated with the enterprise, the one or more additional controls for the portion of the managed content, the one or more additional controls for the plurality of storage domains, the one or more additional controls of the specific mobile device, the second set of controls, the third set of controls, the device specific policies and permissions and the storage domain specific policies.

The ability of the administrator to define the additional policies of an embodiment comprises establishing management policies of the enterprise to enforce security controls for the managed content.

Management policies of an embodiment include information management policies.

Management policies of an embodiment include file collaboration and sharing policies.

Management policies of an embodiment include compliance and auditing policies, mobile application specific policies, device management policies, and information rights policies.

Management policies of an embodiment include cross-domain routing of the managed content across the plurality of storage domains.

Management policies of an embodiment include synchronization policies.

Generating and maintaining the policies of an embodiment comprises defining the controls according to a most restrictive derivation, the most restrictive derivation comprising defining the most restrictive controls for the permissible operations on the managed content.

Retrieving the policies of an embodiment includes retrieving the policies when the user accesses the client application on the one or more mobile devices, the retrieving the policies including automatically retrieving changes to the policies.

The data infrastructure of an embodiment communicates with the one or more mobile devices to verify proper configuration of the one or more mobile devices, the proper configuration including the configuration settings of the mobile device management policy.

Verifying of an embodiment includes querying the one or more mobile devices for at least one of device name, iOS and build version, model name and number, capacity and space available, network information including current carrier network and phone number, compliance and security information including configuration profiles installed, certificates installed with expiry dates, list of restrictions enforced, hardware encryption capabilities and passcode present, applications installed including application ID, name, version, size, and application data size, and provisioning profiles installed with expiry date.

The system of an embodiment comprises the data infrastructure creating a configuration profile using information of the querying and communicating with the one or more mobile devices to configure settings of the one or more devices.

The settings of an embodiment include at least one of pre-configured sites and folders on the client application for access to the managed content based on user identity, group, permissions and policies, certificates used to setup trust between the client application and the data infrastructure, certificates and credentials used for access to the plurality of storage domains, and the generated and maintained policies.

Configuring the settings of an embodiment comprise at least one of granting, denying and revoking access to a portion of the managed content.

Configuring the settings of an embodiment comprises selective wipe of the portion of the managed content.

Configuring the settings of an embodiment comprises backup and restore of the portion of the managed content, the portion comprising one or more of sites, documents, libraries and folders associated with the managed content.

Configuring the settings of an embodiment includes blocking access of the user to the virtual file system.

Permissible operations of an embodiment include capabilities of a user to use the client application to at least one of view, edit, create, and manage content hierarchy of the managed content, wherein the content hierarchy includes one or more of document, libraries and folders.

Permissible operations of an embodiment include capabilities of a user to use the client application to at least one of view, edit, create, and manage at least one of the metadata of the managed content and a portion of the managed content.

Permissible operations of an embodiment include capabilities to export the portion of the managed content to a first application of the one or more mobile devices.

Permissible operations of an embodiment include capabilities to import content from a second application to the client application, wherein the managed content includes the imported content, wherein the one or more mobile applications include the first application and the second application.

Permissible operations of an embodiment include capabilities to share the portion of the managed content across the plurality of storage domains, wherein the sharing the portion of the managed content includes sharing directly using the client application and sharing indirectly using other applications including Chatter, SalesForce and Google Apps.

Permissible operations of an embodiment include capabilities to share the portion of the managed content across groups and users.

Permissible operations of an embodiment include cross-domain routing, the cross-domain routing comprising transferring the portion of the managed content from a first location to a second location, wherein the plurality of storage domains includes the first location and the second location, wherein the first location is different than the second location.

Permissible operations of an embodiment include storing the portion of the managed content locally on the one or more mobile devices.

Permissible operations of an embodiment include managing and tagging items for offline access.

Permissible operations of an embodiment include capability to subscribe to notifications or alerts for conditions and events relating to the managed content including one or more of sharing, workflow and system events.

Permissible operations of an embodiment comprise applying encryption to the managed content according to the policies, the applying the encryption including applying hardware encryption to the portion of the managed content that is locally cached, applying symmetric key encryption to the portion of the managed content stored in the local folders and applying master key based encryption in cooperation with the data infrastructure to at least a portion of the managed content, the at least a portion including one or more of the exported, shared and cross-domain routed portions of the managed content.

The data infrastructure of an embodiment tracks actions on the managed content, the actions including the permissible operations, the data infrastructure using the tracked actions to run audit logs, audit reports and analytics, wherein the audit logs, audit reports and analytics provide traceability and auditing of the actions.

The client application of an embodiment searches the managed content.

Searching of an embodiment includes a device local search, a remote search and a federated search across the plurality of storage domains.

The device local search of an embodiment comprises searching for items in a local content model, wherein the managed content includes the searched items, wherein the local content model includes one or more of local device domain information, local favorites and offline files and content models corresponding to the plurality of storage domains.

The device local search of an embodiment comprises retrieving identified items from a local cache or local content folder of the client application and issuing a GET request to retrieve the identified items from the plurality of storage domains when the device local search confirms absence of the identified items in the local cache or the local content folder.

The remote search of an embodiment comprises searching for items using the metadata.

The remote search of an embodiment comprises the data infrastructure exposing a REST search API to the client application, the remote search including the client application submitting input parameters to the REST search API.

Input parameters of an embodiment include query string and metadata fields to return in entity metadata, the metadata fields including one or more of URI for content access, a metadata entity id, and domain type.

Input parameters of an embodiment include type of query, number of entities to return, type of entities including one or more of lists, sites, folders and files, and search path.

The REST search API of an embodiment returns the metadata fields.

The remote search of an embodiment comprises retrieving identified items from the plurality of storage domains.

The remote search of an embodiment comprises the client application retrieving the identified items directly from the plurality of storage domains.

The remote search of an embodiment comprises the data infrastructure retrieving the identified items on behalf of the client application.

Retrieving the identified items on behalf of the client application of an embodiment comprises retrieving the identified items using connectors corresponding the plurality of storage domains.

Retrieving the identified items of an embodiment comprise retrieving the identified items using an inside out proxy of the data infrastructure.

The federated search of an embodiment comprises searching for the items across the plurality of storage domains.

The federated search of an embodiment comprises the client application performing search calls to the exposed APIs of the plurality of storage domains.

The federated search of an embodiment comprises the data infrastructure issuing search calls to the exposed APIs of the plurality of storage domains on behalf of the client application, the data infrastructure issuing the search calls on behalf of the client application comprising using connectors corresponding to the plurality of storage domains.

The searching of an embodiment comprises using an inside out proxy of the data infrastructure to issue search calls.

The searching of an embodiment comprises a global search.

The global search of an embodiment includes conducting the device local search, the remote search and the federated search.

The global search of an embodiment unions results of the device local search, the remote search and the federated search, wherein the global search presents the union-ed results together with corresponding location information of the plurality of storage domains.

The global search of an embodiment presents the results of the device local search, the remote search and the federated search incrementally.

Presenting the results of an embodiment incrementally comprises initially presenting the device local results and continuing the remote search and the federated search while presenting the device local results.

Presenting of the results of an embodiment incrementally comprises posting the results of the federated and the remote search with the results of the local search upon completion of the federated search and the remote search.

The enforcement component of the client application of an embodiment communicates with the policy definition and decision component using a secure file control protocol, wherein the secure file control protocol supports synchronization of the polices across the one or more mobile devices.

The secure file control protocol of an embodiment facilitates certificate-based trust between policy definition and decision component and the enforcement component.

The secure file control of an embodiment supports HTTPS based REST communications, the HTTPS based REST communications including GET, DELETE, PUT, and POST.

The secure file control protocol of an embodiment supports online and offline modes, the online mode comprising the enforcement component retrieving the policies from the policy definition and decision component using the HTTPS based REST communications, the offline mode comprising locally cached storage of the policies on the one or more mobile devices, the offline mode comprising the enforcement component retrieving the policies from the locally cached storage, wherein the locally cached polices are updated when the one or more mobile devices establishes communications with the policy definition and decision component using the secure file control protocol.

Exposing of the permissible operations and the information of the virtual file system of an embodiment comprises exposing a lightweight virtual file management system library (VFMS library) on the one or more mobile devices, the exposing the permissible operations and the information of the virtual file system comprising the one or more mobile applications integrating the lightweight VFMS library.

Exposing the permissible operations and the information of the virtual file system of an embodiment comprise the one or more mobile applications communicating with the data infrastructure using the lightweight VFMS library.

Communicating with the data infrastructure of an embodiment comprises communicating with the policy definition and decision component using the secure file control protocol to retrieve and enforce the policies by applying the controls on the one or more mobile devices.

Communicating with the data infrastructure of an embodiment comprises accessing the managed content using the interface.

The secure overlay communication with the plurality of storage domains through the data infrastructure of an embodiment comprises an inside out proxy system.

Embodiments described herein include a virtual file management system (VFMS) providing secure movement of managed content across a plurality of storage domains and one or more mobile devices. The system comprises a data infrastructure coupled to and collecting metadata of the plurality of storage domains and the one or more mobile devices. The plurality of storage domains distributively stores the managed content. The data infrastructure organizes the managed content into a virtual file system. The system comprises a client application running on the one or more mobile devices configured to retrieve and use the virtual file system to process a data request of a user. The data request comprises the transfer of a portion of the managed content from a source location to a target location. The target location comprises one or more of local storage of the one or more mobile devices and the plurality of storage domains. The data infrastructure comprises a policy definition and decision component that generates and maintains policies defining controls for encryption operations applied to the portion in connection with the transfer. The client application processes the data request using the virtual file system. The processing of the data request includes retrieving the policies and enforcing the policies by applying the controls on the one or more mobile devices. The controlled encryption operations include applying one or more of a file level encryption and a master key encryption. The master key encryption comprises the client application encrypting the portion on the one or more devices and interfacing with the data infrastructure using a client side library to place the encrypted portion in a container and to retrieve the encrypted portion from the container using one or more master keys maintained by the data infrastructure. The client application exposes the client side library to one or more mobile applications running on the one or more mobile devices. The one or more mobile applications use the client side library to apply the controlled encryption operations in accessing the container.

Embodiments described herein include a virtual file management system (VFMS) providing secure movement of managed content across a plurality of storage domains and one or more mobile devices, the VFMS comprising: a data infrastructure coupled to and collecting metadata of the plurality of storage domains and the one or more mobile devices, the plurality of storage domains distributively storing the managed content, the data infrastructure organizing the managed content into a virtual file system; a client application running on the one or more mobile devices configured to retrieve and use the virtual file system to process a data request of a user, the data request comprising the transfer of a portion of the managed content from a source location to a target location, the target location comprising one or more of local storage of the one or more mobile devices and the plurality of storage domains; the data infrastructure comprising a policy definition and decision component that generates and maintains policies defining controls for encryption operations applied to the portion in connection with the transfer; the client application processing the data request using the virtual file system, the processing the data request including retrieving the policies and enforcing the policies by applying the controls on the one or more mobile devices, the controlled encryption operations including applying one or more of a file level encryption and a master key encryption, the master key encryption comprising the client application encrypting the portion on the one or more devices and interfacing with the data infrastructure using a client side library to place the encrypted portion in a container and to retrieve the encrypted portion from the container using one or more master keys maintained by the data infrastructure, the client application exposing the client side library to one or more mobile applications running on the one or more mobile devices, the one or more mobile applications using the client side library to apply the controlled encryption operations in accessing the container.

The plurality of storage domains of an embodiment include one or more of shared storage of an enterprise and cloud based storage.

The shared storage of an enterprise of an embodiment includes enterprise content management systems including at least one of SharePoint, shared drives and Active Directory, wherein the shared drives include one or more of NFS, CIFS, and DFS based shared drives, wherein the cloud based storage includes one or more of iCloud, Dropbox, and Box.

The client application of an embodiment comprises a native mobile application for the one or more mobile devices.

The client application of an embodiment includes a web based HTML5 application, wherein the one or more mobile devices includes a web browser client accessing the HTML5 application One or more mobile devices of an embodiment include a smartphone device and a tablet, the smart phone device including an iPhone device running iOS, an Android device running Android operating system and a Windows phone running Windows mobile operating system, the tablet device including a mobile tablet platform running the iOS, the Android operating system or the Windows mobile operating system.

The plurality of storage domains of an embodiment include one or more file systems, the one or more file systems including a first file system and a second file system, wherein a content hierarchy of the first file system is different than the content hierarchy of the second file system, the one or more file systems including Windows based file systems, MacOS based file systems, Linux based file systems and Unix based file system.

The data infrastructure of an embodiment is one or more of a private and public cloud based service.

The data infrastructure of an embodiment interfacing with the plurality of storage domains using one or more of a public interface and a protocol, wherein the public interface includes REST communications, SOAP communications and proprietary APIs, wherein the protocol includes WebDAV, CIFS and NFS.

Interfacing with the plurality of storage domains of an embodiment includes collecting storage domain specific file system primitives for accessing corresponding portions of the managed content, the data infrastructure mapping the storage domain specific file system primitives to corresponding content of the plurality of storage domains.

Information of the storage domain specific file system primitives of an embodiment includes a first and a second set of primitives, wherein the first set is different than the second set, wherein the storage domain specific file system primitives include read, write, delete, update, copy, and move.

Organizing the managed content into a virtual file system of an embodiment comprises using information of the storage domain specific file system primitives, the plurality of storage domains and the metadata.

The virtual file system of an embodiment provides virtual file system primitives including one or more of create, read, update, delete, rename, list, move, copy, get metadata, view, edit, annotate, copy and move across physical file systems, and open in specific applications for editing/viewing, wherein the plurality of storage domains comprise the physical file systems.

Metadata of an embodiment comprises at least one of an identity component, a content metadata component, a device component, and a policy component.

The device component of an embodiment comprises information of mobile device configuration parameters of the one or more mobile devices, the mobile device configuration parameters including device specific policies and permissions in place for the one or more mobile devices.

The policy component of an embodiment comprises storage domain specific policies inherited from each of the plurality of storage domains, the storage domain specific policies including user and group level permissions and policies with respect to the managed content.

The identity component of an embodiment includes unique device identifiers for each of the one or more mobile devices and information of storage domain identities of the user for each of the plurality of storage domains, the identity component associating the storage domain identities and the device identifiers with a user identity.

The metadata component of an embodiment includes storage domain metadata of managed content stored on each of the plurality of storage domains, the storage domain metadata including name of files, creation date of files, owner of files, and corresponding storage domain content hierarchy.

Generating and maintaining the policies of an embodiment comprises the policy definition and decision component coupled to a management console that allows an administrator an ability to define additional policies using the metadata, the additional policies defining one or more additional controls for the encryption operations on the managed content.

Additional policies of an embodiment are defined for an enterprise.

Additional policies of an embodiment define the one or more additional controls for a user associated with the enterprise, wherein the user associated with the enterprise comprises the user of the one or more mobile devices.

Additional polices of an embodiment define the one or more additional controls for groups of users associated with the enterprise, wherein the groups of users comprise the user associated with the enterprise.

The administrator of an embodiment creates the groups of users using custom groups and standard groups, the groups of users including one or more of owners, members, visitors, viewers, on-premise employees, offsite employees, partners and customers.

Additional policies of an embodiment define the one or more additional controls for a specific mobile device, wherein the specific mobile device includes the one or more mobile devices.

Additional policies of an embodiment define the one or more additional controls for the plurality of storage domains.

Additional policies of an embodiment define the one or more additional controls for the portion of the managed content.

Additional policies of an embodiment include a second set of controls applicable to the specific mobile device, wherein the specific mobile device includes a configuration of operating system, operating system version and device type.

Additional policies of an embodiment include a third set of controls applicable to the user associated with the enterprise or the groups of users associated with the enterprise.

Generating and maintaining the policies of an embodiment includes storing the additional policies, the device specific policies and permissions and the storage domain specific policies in a policy store of the data infrastructure.

Generating and maintaining the policies of an embodiment comprises algorithmically compiling at least one of the additional policies for the user associated with the enterprise accessing the portion of the managed content of the plurality of storage domains using the specific mobile device.

The compiling of an embodiment comprises retrieving and aggregating the one or more additional controls for the user and groups of users associated with the enterprise, the one or s more additional controls for the portion of the managed content, the one or more controls for the plurality of storage domains, the one or more additional controls of the specific mobile device, the second set of controls, the third set of controls, the device specific policies and permissions and the storage domain specific policies.

File level encryption of an embodiment includes hardware encryption applied to the portion on the one or more mobile devices, wherein the portion comprises files stored in the temporary cache of the one or more mobile devices.

File level encryption of an embodiment includes local encryption applied to the portion on the one or more mobile devices, wherein the portion comprises files and documents stored in local folders on the device.

Local encryption of an embodiment comprises generating a symmetric key based on credentials of the user, the client application using the symmetric key to encrypt the portion, the client application storing the symmetric key in a mobile device operating system key chain.

Encrypting the portion of an embodiment comprises using symmetric key encryption, wherein the symmetric key encryption comprises encrypting the portion using a symmetric key.

Placing the encrypted portion in the container of an embodiment comprises sending the symmetric key to the data infrastructure, the sending the symmetric key to the data infrastructure comprising sending the key using a secure key distribution and management protocol.

Placing the encrypted portion in the container of an embodiment comprises the data infrastructure receiving and encrypting the symmetric key using a master key of the one or more master keys, the data infrastructure returning a master key encrypted symmetric key using the secure key distribution and management protocol and the client application placing the encrypted portion and the master key encrypted symmetric key in the container.

The container of an embodiment includes an envelope, the envelope comprising an .acxs data format, wherein the envelope includes one or more of a class of the master key and a length of the master key.

Retrieving the encrypted portion from the container of an embodiment comprises retrieving the master key encrypted symmetric key from the envelope and sending the master key encrypted symmetric key to the data infrastructure using the secure key distribution and management protocol.

Retrieving the encrypted portion from the container of an embodiment comprises the data infrastructure receiving the master key encrypted symmetric key and retrieving the symmetric key, the retrieving the symmetric key comprising the data infrastructure using the master key to decrypt the master key encrypted symmetric key.

Retrieving the encrypted portion from the container of an embodiment comprises returning the symmetric key to the client application using the secure key distribution and management protocol, the client application receiving the symmetric key and using the symmetric key to decrypt the encrypted portion.

The system of an embodiment comprises applying the encryption operations to the portion during the transfer, the encryption operations including encrypting and decrypting the portion.

The source location of an embodiment comprises one or more of local storage of the one or more mobile devices and the plurality of storage domains.

The transfer of an embodiment comprises decrypting the portion according to a format applied at the source location.

The format of an embodiment includes the file level encryption.

The format of an embodiment includes the master key encryption.

Decrypting the master key encryption of an embodiment comprises retrieving the portion from the container.

Encrypting the portion during the transfer of an embodiment includes using the file level encryption.

Encrypting the portion during the transfer of an embodiment includes using the master key encryption, the using the master key encryption comprising placing the encrypted portion in the container.

Encrypting the portion during the transfer of an embodiment uses the master key encryption comprises storing the container at the target location.

The client side library of an embodiment enables the client application to communicate with the data infrastructure, the communicating comprising issuing calls to the data infrastructure to one or more of retrieve information for applying at least one of the encrypted operations, retrieve the policies and enforce the policies.

The one or more mobile applications of an embodiment embed the client side library using a secure file exchange protocol to access the client side library.

Exposing the client side library of an embodiment includes exposing the client side library to additional devices and corresponding software platforms, the additional devices and corresponding software platforms embedding the client side library using the secure file exchange protocol to access the client side library.

One or more mobile applications of an embodiment use the client side library to retrieve information from the data infrastructure for accessing the container.

Accessing the container of an embodiment includes decrypting and viewing the encrypted portion.

One or more mobile applications of an embodiment include trusted applications and untrusted applications, the container restricting access to the trusted applications, wherein the trusted applications embed the client side library, the restricting the access including the client side library blocking communication of an untrusted application with the client side library.

The client application of an embodiment requests offline access to the container, and in response to the request the data infrastructure issuing special keys to the client application, wherein the special keys are valid for a predetermined amount of time.

The client application of an embodiment stores the special keys on the one or more mobile devices using a hardware security element operating system provided key chain, the client application issuing calls on the client side library to obtain information of the special keys for accessing the container.

Accessing the container of an embodiment comprises decrypting and viewing the encrypted portion.

The transfer of an embodiment comprises the transfer of the container from the client application to a trusted application of the one or more mobile applications, wherein the container comprises the encrypted portion, wherein after the transfer, a copy of the container resides in the sandboxed file system of the trusted application.

A secure file exchange module of the trusted application of an embodiment embeds the client side library by using a secure file exchange protocol to access the client side library.

Accessing the container of an embodiment comprising the secure file exchange module using the client side library to communicate with the data infrastructure and retrieve from the data infrastructure information for decrypting the encrypted portion in the container and viewing the portion.

The data infrastructure of an embodiment manages the one or more master keys on behalf of an enterprise customer.

The one or more master keys of an embodiment include one or more classes of master key.

The one or more classes of master keys of an embodiment correspond to one or more of a user, a group of users, a device group, a storage domain and the one or more mobile applications.

The data infrastructure of an embodiment disables client side library calls to the data infrastructure by disabling the corresponding class of master key associated with the one or more of a user, a group of users, a device group, a storage domain and the one or more mobile applications.

The enterprise of an embodiment creates the one or more classes, wherein the enterprise revokes the one or more classes.

The data infrastructure of an embodiment stores the one or more master keys in a secure lockbox, wherein the secure lockbox encrypts and decrypts the symmetric key using the one or more master keys.

The enterprise of an embodiment maintains the one or more keys on-premise or on pubic cloud using hardware security module.

The data infrastructure of an embodiment maintains an on-premise pluggability module that allows the secure lockbox to encrypt and decrypt the symmetric key using the one or more master keys from the on-premise or public cloud hardware security module.

The client application of an embodiment cooperates with the data infrastructure to track information of the controlled encrypted operations, the tracking the controlled encrypted operations includes tracking information of the data request to transfer the portion.

The information of the data request of an embodiment includes information of the user, information of the source location and information of the controlled encrypted operations.

The client application of an embodiment cooperates with the data infrastructure to associate a trusted file stamp with the information of the data request and stamping the portion with the trusted file stamp.

The trusted file stamp of an embodiment visually encodes the information of the data request using one or more of a color and a symbol.

Users interact with the trusted file stamp of an embodiment to obtain the information of the data request.

Tracking the controlled encrypted operations of an embodiment include tracking a series of data requests associated with the portion, the series of data requests comprising the data request.

Embodiments described herein include a virtual file management system (VFMS) providing a user access to managed content on one or more mobile devices. The system comprises a plurality of storage domains that store the managed content distributively using one or more file systems. The system comprises at least one server hosting a data infrastructure that organizes the managed content into a virtual file system that maintains information of storage domain specific file system primitives for accessing corresponding portions of the managed content. The data infrastructure collects and maintains metadata of the plurality of storage domains and the one or more mobile devices. The data infrastructure comprises a policy definition and decision component that generates and maintains policies defining controls for permissible operations on the managed content with respect to the user on the one or more mobile devices. The permissible operations include the file system primitives. The generating and maintaining the policies includes combining native policies associated with the plurality of storage domains and the one or more mobile devices with additional policies. The system comprises a client application hosted on the one or more mobile devices. The client application is coupled to the data infrastructure and the plurality of storage domains and includes an enforcement component. The enforcement component communicates with the policy definition and decision component to retrieve and enforce the policies by applying the controls on the one or more mobile devices. The client application retrieves information of the virtual file system from the data infrastructure and provides access to the managed content through an interface by processing data requests using the permissible operations. The client application exposes the permissible operations and the information of the virtual file system to one or more mobile applications that run on the one or more mobile devices and provides the access to the managed content through the interface. The exposing of the permissible operations and the information of the virtual file system to the one or more mobile applications includes the one or more mobile applications retrieving and enforcing the policies.

Embodiments described herein include a virtual file management system (VFMS) providing a user access to managed content on one or more mobile devices, the system comprising: a plurality of storage domains that store the managed content distributively using one or more file systems; at least one server hosting a data infrastructure that organizes the managed content into a virtual file system that maintains information of storage domain specific file system primitives for accessing corresponding portions of the managed content, the data infrastructure collecting and maintaining metadata of the plurality of storage domains and the one or more mobile devices, wherein the data infrastructure comprises a policy definition and decision component that generates and maintains policies defining controls for permissible operations on the managed content with respect to the user on the one or more mobile devices, the permissible operations including the file system primitives, wherein the generating and maintaining the policies includes combining native policies associated with the plurality of storage domains and the one or more mobile devices with additional policies; a client application hosted on the one or more mobile devices; the client application coupled to the data infrastructure and the plurality of storage domains and including an enforcement component, wherein the enforcement component communicates with the policy definition and decision component to retrieve and enforce the policies by applying the controls on the one or more mobile devices, the client application retrieving information of the virtual file system from the data infrastructure and providing access to the managed content through an interface by processing data requests using the permissible operations, wherein the client application exposes the permissible operations and the information of the virtual file system to one or more mobile applications that run on the one or more mobile devices and provides the access to the managed content through the interface, the exposing the permissible operations and the information of the virtual file system to the one or more mobile applications including the one or more mobile applications retrieving and enforcing the polices.

The plurality of storage domains of an embodiment include one or more of shared storage of an enterprise and cloud based storage.

A shared storage of an enterprise of an embodiment includes enterprise content management systems including at least one of SharePoint, shared drives, and Active Directory, wherein the shared drives include one or more of NFS, CIFS, and DFS based shared drives, wherein the cloud based storage includes one or more of iCloud, DropBox, and Box.

The client application of an embodiment comprises a native mobile application for the one or more mobile devices.

One or more file systems of an embodiment include a first file system and a second file system, wherein a content hierarchy of the first file system is different than the content hierarchy of the second file system.

The data infrastructure of an embodiment is one or more of a private and public cloud based service.

The data infrastructure of an embodiment implements a pluggable mechanism to couple with the plurality of storage domains, wherein the coupling with the plurality of storage domains includes interfacing with the plurality of storage domains using one or more of a public interface and a protocol.

Interfacing with the plurality of storage domains of an embodiment includes collecting the storage domain specific file system primitives, the data infrastructure mapping the storage domain specific file system primitives to corresponding content of the plurality of storage domains.

Information of the storage domain specific file system primitives of an embodiment includes a first and a second set of primitives, wherein the first set is different than the second set, wherein the storage domain specific file system primitives include read, write, delete, update, copy, and move.

Interfacing with the plurality of storage domains of an embodiment comprises collecting the metadata.

Organizing the managed content into a virtual file system of an embodiment comprises using the information of the storage domain specific file system primitives, information of the one or more storage domains and the metadata.

The virtual file system providing virtual file system primitives of an embodiment includes one or more of create, read, update, delete, rename, list, move, copy, get metadata, view, edit, annotate, copy and move across physical file systems, and open in specific applications for editing/viewing, wherein the plurality of storage domains comprise the physical file systems.

Metadata of an embodiment comprises at least one of an identity component, a content metadata component, a device component, and a policy component.

The device component of an embodiment comprises information of mobile device configuration parameters of the one or more mobile devices, the mobile device configuration parameters including device specific policies and permissions in place for the one or more mobile devices, wherein the native policies include the device specific policies and permissions.

The policy component of an embodiment comprises storage domain specific policies inherited from each of the plurality of storage domains, the storage domain specific policies including user and group level permissions and policies with respect to the managed content, wherein the native policies include the storage domain specific policies.

The identity component of an embodiment includes unique device identifiers for each of the one or more mobile devices and identity and credentials of the user for each of the plurality of storage domains, the data infrastructure storing the identity and credentials only as needed to synchronize information of the content metadata component with the plurality of storage domains.

The identity component of an embodiment associates the storage domain identities and the device identifiers with a system user identity.

The content metadata component of an embodiment includes storage domain metadata of the managed content stored on each of the plurality of storage domains, wherein the storage domain metadata includes name of files, creation date of files, owner of files and corresponding storage domain content hierarchy.

Generating and maintaining the policies of an embodiment comprises the policy definition and decision component coupled to a management console configured to allow an administrator an ability to define additional policies using information of the metadata, the additional policies defining one or more additional controls for the permissible operations on the managed content.

Additional policies of an embodiment are defined for an enterprise, wherein the additional policies define the one or more additional controls for a user associated with the enterprise, wherein the user associated with the enterprise comprises the user of the one or more mobile devices.

Additional polices of an embodiment define the one or more additional controls for groups of users associated with the enterprise.

Groups of users of an embodiment comprise the user associated with the enterprise.

The administrator of an embodiment creates the groups of users using custom groups and standard groups, the groups of users including one or more of owners, members, visitors, viewers, employees, offsite employees, partners and customers.

Additional policies of an embodiment define the one or more additional controls for a specific mobile device, wherein the specific mobile device includes the one or more mobile devices.

Additional policies of an embodiment define the one or more additional controls for the plurality of storage domains.

Additional policies of an embodiment define the one or more additional controls for a portion of the managed content.

Additional policies of an embodiment include a second set of controls applicable to the specific mobile device, wherein the specific mobile device includes a configuration of operating system, operating system version and device type.

Additional policies of an embodiment include a third set of controls applicable to the user associated with the enterprise or the groups of users associated with the enterprise.

Generating and maintaining the policies of an embodiment includes storing the additional policies, the device specific policies and permissions and the storage domain specific policies in a policy store of the data infrastructure.

Generating and maintaining the additional policies of an embodiment comprises algorithmically compiling at least one of the additional policies for the user associated with the enterprise accessing the portion of the managed content of the plurality of storage domains using the specific mobile device.

The compiling of an embodiment comprises retrieving and aggregating the one or more additional controls for the user and groups of users associated with the enterprise, the one or more additional controls for the portion of the managed content, the one or more additional controls for the plurality of storage domains, the one or more additional controls of the specific mobile device, the second set of controls, the third set of controls, the device specific policies and permissions and the storage domain specific policies.

Generating and maintaining the policies of an embodiment comprises defining the controls according to a most restrictive derivation, the most restrictive derivation comprising defining the most restrictive controls for the permissible operations on the managed content.

Retrieving the policies of an embodiment includes retrieving the policies when the user accesses the client application on the one or more mobile devices, the retrieving the policies including automatically retrieving changes to the policies.

A policy of the policies of an embodiment represents a set of persistent rules associated with a content entity to govern and control actions on that entity, the policy including one or more of policy rules, the actions, policy item value, capability, policy definition entity and policy enforced entity.

Policy rules of an embodiment include a logical collection of the rules and the actions associated with the policy item value.

The policy item value of an embodiment includes a policy specification associated with the policy rules.

The capability of an embodiment includes software or device level functionality required for enforcing the policy rules.

The policy definition entity of an embodiment includes the content entity on which the policy is defined including one or more of groups and users, device of the one or more mobile devices, an application, storage domains of the plurality of storage domains, and a portion of the managed content including site and subsite, folder, document library, list, and document, wherein the groups and users comprise the user.

A policy enforced entity of an embodiment includes the content entity on which the actions corresponding to the policy are applied and enforced.

Policy rules of an embodiment include device local encryption rules, the device local encryption rules specifying the portion to be encrypted when stored locally on the device either on cache or device local storage, wherein the device local encryption includes software encryption, wherein the device local encryption rules comprise enforcing the software encryption prior to downloading of the portion locally to the device and blocking the download if the portion cannot be encrypted.

Policy rules of an embodiment include hardware encryption rules, the hardware encryption rules specifying hardware encryption and corresponding secure storage for the portion when stored locally on the device, wherein the hardware encryption rules comprise enforcing the hardware encryption prior to downloading of the portion locally to the device and blocking the download if the portion cannot be encrypted, wherein the capability includes support for hardware encryption on the device.

Policy rules of an embodiment include access to cloud storage rules, the access to cloud storage rules indicating whether the user and the device can add and configure cloud storage domains on the client application, wherein the storage domains include the cloud storage domains.

Policy rules of an embodiment include requiring encryption on cloud storage rules, the requiring encryption on cloud storage rules specifying encrypting the portion on the device prior to uploading the portion to cloud storage and specifying storing the portion in an encrypted form on the cloud storage.

Policy rules of an embodiment include offline access rules, the offline access rules specifying whether the document can be tagged for offline access in a disconnected mode of the device and stored locally on the device, wherein the offline access rules are enforced when the user chooses an action to mark the document for offline access on the device.

Policy rules of an embodiment include local caching rules, the local caching rules determining whether the portion can be stored in local cache of the device after being downloaded onto the device, wherein local caching of the client application is disabled if local caching is disabled at level of the device, the client application deleting the downloaded portion after the client application exits out of an active user session when the local caching is disabled.

Policy rules of an embodiment include export rules for exporting the portion from the client application to other applications on the device, the export rules determining whether the portion can be exported to the other applications using a content export protocol as supported by an operating system of the device, wherein the export rules are enforced when the user interacts with the export protocol of the device.

Policy rules of an embodiment include audit log rules, wherein the audit log rules indicate audit log to be maintained by the data infrastructure for every action on the content entity and the policy enforced entity.

The audit log rules of an embodiment are enforced on every action performed on the content entity and the policy enforced entity.

Policy rules of an embodiment include sharing via cloud storage rules, wherein the sharing via cloud storage rules specify mechanisms allowed for sharing of the portion via cloud storage, wherein the sharing via cloud storage rules are enforced when the user chooses a share option on the device for sharing the portion via the cloud storage.

Policy rules of an embodiment include viewers and editors rules, wherein the viewers and editors rules restrict the viewers and the editors that can be used on the device to view the portion, wherein the viewers and editors rules are enforced when the user interacts with an access protocol on the device to export the portion for viewing or editing using the viewers or the editors.

Policy rules of an embodiment include document classification rules, wherein the document classification rules include classifying the portion as public, confidential, proprietary, legal hold, or records management, wherein the document classification rules define additional rules that restrict actions on the portion according to the document classification.

Policy rules of an embodiment include document expiration rules, the document expiration rules specifying a time limit after which the document expires and is deleted from all applications including offline and cached document locations managed by the client application and the data infrastructure.

Policy rules of an embodiment include network usage rules, wherein the network usage rules place at least one restriction on the device and the client application including an upper limit on downloads to the device while on cellular, prohibiting the sending of audit reports from the device while on cellular, synchronizing with the data infrastructure only on cellular, and prohibiting downloading or synchronization when the device is roaming.

Policy rules of an embodiment include cache expiration rules, the cache expiration rules specifying that local cache of the client application expires and is cleaned after the user closes the client application and ends an active session.

Policy rules of an embodiment include autodiscovery of storage domain rules, wherein the autodiscovery rules indicate auto-discovery and setup of the storage domains for the user when the user starts the client application.

Policy rules of an embodiment include document size limitation rules, wherein the document size limitation rules place upper limit on size of the document downloaded to the device.

Policy rules of an embodiment include document media type rules, wherein the document media type rules specify document media types supported for a specific combination of the customer, the device and the user and blocking the download of non-specified document media types.

Policy rules of an embodiment include restriction on access to enterprise storage domain including SharePoint if cloud storage applications including Dropbox and Box exist on the device, wherein the storage domains comprise the enterprise storage domains and the cloud storage domains.

Policy rules of an embodiment include virtual private network (VPN) on demand rules, wherein the VPN on demand rules control setup of VPN policy and settings prior to access of the device to enterprise storage domains, wherein the storage domains include the enterprise storage domains.

Policy rules of an embodiment include device restriction rules, wherein the device restriction rules restrict the device from access to enterprise storage domains based on one or more of settings of the device including iOS and build number, model name and number, device capacity and space available, current carrier network, subscriber carrier network, data roaming on or off, hardware encryption capabilities, passcode present, certificates installed with expiry dates, list of restrictions enforced, applications installed, provisioning profiles installed with expiry date, and web proxy settings, wherein the storage domains include the enterprise storage domains.

Policy rules of an embodiment include policy compliance rules, wherein the policy compliance rules restrict the device from access to enterprise storage domains if the device fails to pass mobile device management level policy compliance of an enterprise, wherein the storage domains include enterprise storage domains.

Policy rules of an embodiment include domain joined rules, the domain joined rules blocking access of the client application to enterprise storage domains if the device is not domain joined to enterprise Active Directory infrastructure, wherein the storage domains include the enterprise storage domains.

Policy rules of an embodiment include location rules restricting access of the user to the portion based on a designated location of the device, the restricting including blocking access to the portion when client application determines that the device is at a location other than the designated location and blocking access to the portion when the client application cannot determine the location.

Policy rules of an embodiment include time based rules restricting access of the user to the portion to a period of time.

The enforcement component of the client application of an embodiment communicates with the policy definition and decision component using a secure file control protocol, wherein the secure file control protocol facilitates certificate-based trust between policy definition and decision component and enforcement component.

Secure file control of an embodiment supports HTTPS based communications, wherein the HTTPS based REST style communications include GET, DELETE, PUT, and POST.

The secure file control protocol of an embodiment supports online and offline modes, the online mode comprising the enforcement component retrieving the policies from the policy definition and decision component using the HTTPS based REST communications, the offline mode comprising locally cached storage of the policies on the one or more mobile devices, the enforcement component retrieving the policies from the locally cached storage.

Locally cached polices of an embodiment are updated when the one or more mobile devices establishes communications with the policy definition and decision component using the secure file control protocol.

The secure file control protocol of an embodiment supports synchronization of the policies across the one or more mobile devices.

Exposing the permissible operations and the information of the virtual file system of an embodiment comprises exposing a lightweight virtual file management system library (VFMS library) on the one or more mobile devices.

Exposing the permissible operations and the information of the virtual file system of an embodiment comprises the one or more mobile applications integrating the lightweight VFMS library.

Exposing the permissible operations and the information of the virtual file system of an embodiment comprises the one or more mobile applications communicating with the data infrastructure using the lightweight VFMS library, the communicating with the data infrastructure comprising one or more of retrieving and enforcing the policies and accessing the managed content using the interface.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
aggregating managed content from a plurality of storage domains into a virtual file system that maintains information relating to a plurality of sets of operations with respect to content stored in each of at least a subset of the plurality of storage domains, wherein the plurality of sets of operations respectively correspond to at least one of the plurality of storage domains; and
providing, to a client application on a mobile device, information comprising the virtual file system and one or more policies that apply to the managed content, wherein at least one of the one or more policies indicates one or more operations permitted to be performed with respect to the managed content, and the client application is configured to provide access to the managed content in the virtual file system based at least in part on the one or more policies, including by allowing the one or more permitted operations to be performed with respect to the managed content using one or more of the plurality of sets of operations corresponding to the at least one of the plurality of storage domains associated with the managed content.

2. The method of claim 1, wherein the plurality of storage domains include at least an enterprise storage domain and a cloud based storage domain.

3. The method of claim 1, wherein:
the plurality of storage domains include at least a first storage domain and a second storage domain; and
a first set of operations associated with the first storage domain is different from a second set of operations associated with of the second storage domain.

4. The method of claim 1, wherein:
the plurality of storage domains include at least a first storage domain and a second storage domain; and
a first file system hierarchy of the first storage domain is different from a second file system hierarchy of the second storage domain.

5. The method of claim 1, further comprising:
determining the one or more policies that apply to the managed content.

6. The method of claim 5, wherein the one or more policies are determined based at least in part on a role of a user of the mobile device.

7. The method of claim 5, wherein determining the one or more policies comprises combining storage domain specific policies with device management policies associated with the mobile device.

8. The method of claim 1, wherein at least a subset of the one or more policies include domain-specific policies each associated with one or more of the plurality of storage domains.

9. The method of claim 1, wherein the one or more policies include user and group level permissions with respect to the managed content.

10. The method of claim 1, wherein the client application is configured to provide access to the managed content through secure overlay communication with the plurality of storage domains.

11. The method of claim 1, wherein aggregating the managed content includes mapping the corresponding one or more of the sets of operations to content stored in the plurality of storage domains.

12. The method of claim 1, wherein the client application is configured to provide access to the managed content by processing data requests using the permitted operations.

13. The method of claim 1, wherein the client application is configured to provide access to the managed content by exposing the permissible operations and the information comprising the virtual file system to an application included on the mobile device.

14. A system, comprising:
a processor; and
a memory coupled with the processor, wherein the memory is configured to provide the processor with instructions which when executed cause the processor to:
aggregate managed content from a plurality of storage domains into a virtual file system that maintains information relating to a plurality of sets of operations with respect to content stored in each of at least a subset of the plurality of storage domains, wherein the plurality of sets of operations respectively correspond to at least one of the plurality of storage domains; and
provide, to a client application on a mobile device, information comprising the virtual file system and one or more policies that apply to the managed content, wherein at least one of the one or more policies indicates one or more operations permitted to be performed with respect to the managed content, and the client application is configured to provide access to the managed content in the virtual file system based at least in part on the one or more policies, including by allowing the one or more permitted operations to be performed with respect to the managed content using one or more of the plurality of sets of operations corresponding to the at least one of the plurality of storage domains associated with the managed content.

15. The system of claim 14, wherein the storage domains include at least an enterprise storage domain and a cloud based storage domain.

16. The system of claim 14, wherein the processor is configured to aggregate the managed content at least in part by mapping the corresponding one or more of the sets of operations to content stored in the plurality of storage domains.

17. The system of claim 14, wherein:
the plurality of storage domains include at least a first storage domain and a second storage domain; and
a first set of operations associated with the first storage domain is different from a second set of operations associated with of the second storage domain.

18. The system of claim 14, wherein:
the plurality of storage domains include at least a first storage domain and a second storage domain; and
a first file system hierarchy of the first storage domain is different from a second file system hierarchy of the second storage domain.

19. A computer program product, the computer program product being embodied in a tangible non-transitory computer readable storage medium and comprising computer instructions for:
aggregating managed content from a plurality of storage domains into a virtual file system that maintains information relating to a plurality of sets of operations with respect to content stored in each of at least a subset of the plurality of storage domains, wherein the plurality of sets of operations respectively correspond to at least one of the plurality of storage domains; and providing, to a client application on a mobile device, information comprising the virtual file system and one or more policies that apply to the managed content, wherein at least one of the one or more policies indicates one or more operations permitted to be performed with respect to the managed content, and the client application is configured to provide access to the managed content in the virtual file system based at least in part on the one or more policies, including by allowing the one or more permitted operations to be performed with respect to the managed content using one or more of the plurality of sets of operations corresponding to the at least one of the plurality of storage domains associated with the managed content.

20. The computer program product of claim 19, wherein the plurality of storage domains include at least an enterprise storage domain and a cloud based storage domain.

21. The computer program product of claim 19, wherein the computer program further comprises instructions for determining the one or more policies that apply to the managed content, wherein the determining the one or more policies comprises combining storage domain specific policies with device management policies associated with the mobile device.

* * * * *